(12) United States Patent
Kamitakahara et al.

(10) Patent No.: US 12,292,552 B2
(45) Date of Patent: May 6, 2025

(54) PROJECTION LENS SYSTEM AND IMAGE PROJECTION APPARATUS

(71) Applicants: Takashi Kamitakahara, Tokyo (JP); Ken Shirasaki, Tokyo (JP); Mutsumi Tanifuji, Tokyo (JP); Hayato Yoshida, Tokyo (JP)

(72) Inventors: Takashi Kamitakahara, Tokyo (JP); Ken Shirasaki, Tokyo (JP); Mutsumi Tanifuji, Tokyo (JP); Hayato Yoshida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 574 days.

(21) Appl. No.: 17/637,453

(22) PCT Filed: Oct. 28, 2020

(86) PCT No.: PCT/IB2020/060067
§ 371 (c)(1),
(2) Date: Feb. 23, 2022

(87) PCT Pub. No.: WO2021/099865
PCT Pub. Date: May 27, 2021

(65) Prior Publication Data
US 2022/0276472 A1 Sep. 1, 2022

(30) Foreign Application Priority Data
Nov. 18, 2019 (JP) ................................. 2019-207843

(51) Int. Cl.
*G02B 13/16* (2006.01)
*G02B 9/08* (2006.01)

(52) U.S. Cl.
CPC ............... *G02B 13/16* (2013.01); *G02B 9/08* (2013.01)

(58) Field of Classification Search
CPC .......... G02B 13/16; G02B 9/08; G02B 13/22; G02B 17/0852; H04N 9/3141; H04N 9/317
See application file for complete search history.

(56) References Cited

U.S. PATENT DOCUMENTS

| 9,983,402 B1 * | 5/2018 | Jackson ............... H04N 9/3152 |
| 2002/0008918 A1 * | 1/2002 | Hirata .................... G02B 13/06 359/759 |

(Continued)

FOREIGN PATENT DOCUMENTS

| CN | 201075146 Y | 6/2008 |
| CN | 101251710 A | 8/2008 |

(Continued)

OTHER PUBLICATIONS

Office Action issued Sep. 26, 2023 in Chinese Patent Application No. 202080079532.2, 12 pages.

(Continued)

*Primary Examiner* — Mustak Choudhury
(74) *Attorney, Agent, or Firm* — XSENSUS LLP

(57) ABSTRACT

A projection lens system (G1, G2) includes a front group (G1) disposed on a projection-plane (SC) side, a rear group (G2) disposed on a display-surface (SF) side of an image display element inclined with reference to the projection plane (SC), and an aperture stop (S) disposed on the display-surface (SF) side with reference to the front group (G1). The rear-group optical axis is tilted on the shared plane at a tilt angle ξ with reference to the display-surface normal. In projection lens system (G1, G2), when the amount of shift Δ is zero, the tilt angle ξ satisfies a conditional expression 0<ξ/ξs<1, where ξs denotes a tilt angle when Scheimpflug principle is satisfied with reference to the display surface (SF) and the projection plane (SC).

20 Claims, 46 Drawing Sheets

(56) References Cited

U.S. PATENT DOCUMENTS

| | | | | |
|---|---|---|---|---|
| 2002/0191281 | A1* | 12/2002 | Osa | G02B 21/086 |
| | | | | 359/368 |
| 2006/0285079 | A1 | 12/2006 | Wada | |
| 2007/0013876 | A1* | 1/2007 | Agatsuma | G02B 13/06 |
| | | | | 353/70 |
| 2009/0059185 | A1* | 3/2009 | Hisada | G02B 17/0852 |
| | | | | 353/98 |
| 2018/0003964 | A1* | 1/2018 | Tatsuno | G03B 21/147 |
| 2019/0219905 | A1 | 7/2019 | Nishikawa | |

FOREIGN PATENT DOCUMENTS

| | | |
|---|---|---|
| CN | 105607403 A | 5/2016 |
| CN | 205720850 U | 11/2016 |
| CN | 106773048 A | 5/2017 |
| CN | 108449587 A | 8/2018 |
| JP | H09-203881 A | 8/1997 |
| JP | 2005-128487 A | 5/2005 |
| JP | 2007-163547 | 6/2007 |
| JP | 2012-118547 A | 6/2012 |
| JP | 2012-186612 A | 9/2012 |
| JP | 2013-003297 | 1/2013 |
| JP | 2013003297 A * | 1/2013 |
| JP | 2016-230346 | 12/2015 |
| JP | 2016-080748 A | 5/2016 |
| JP | 2016-099439 | 5/2016 |
| JP | 2018-004817 | 1/2018 |
| JP | 2018-004889 | 1/2018 |
| JP | 2018-005253 | 1/2018 |
| JP | 2018-132565 | 8/2018 |

OTHER PUBLICATIONS

Office Action issued Jul. 30, 2024 in Japanese Patent Application No. 2020-189565, 6 pages.

Office Action issued Aug. 8, 2024 in Chinese Patent Application No. 202080079532.2, 4 pages.

* cited by examiner

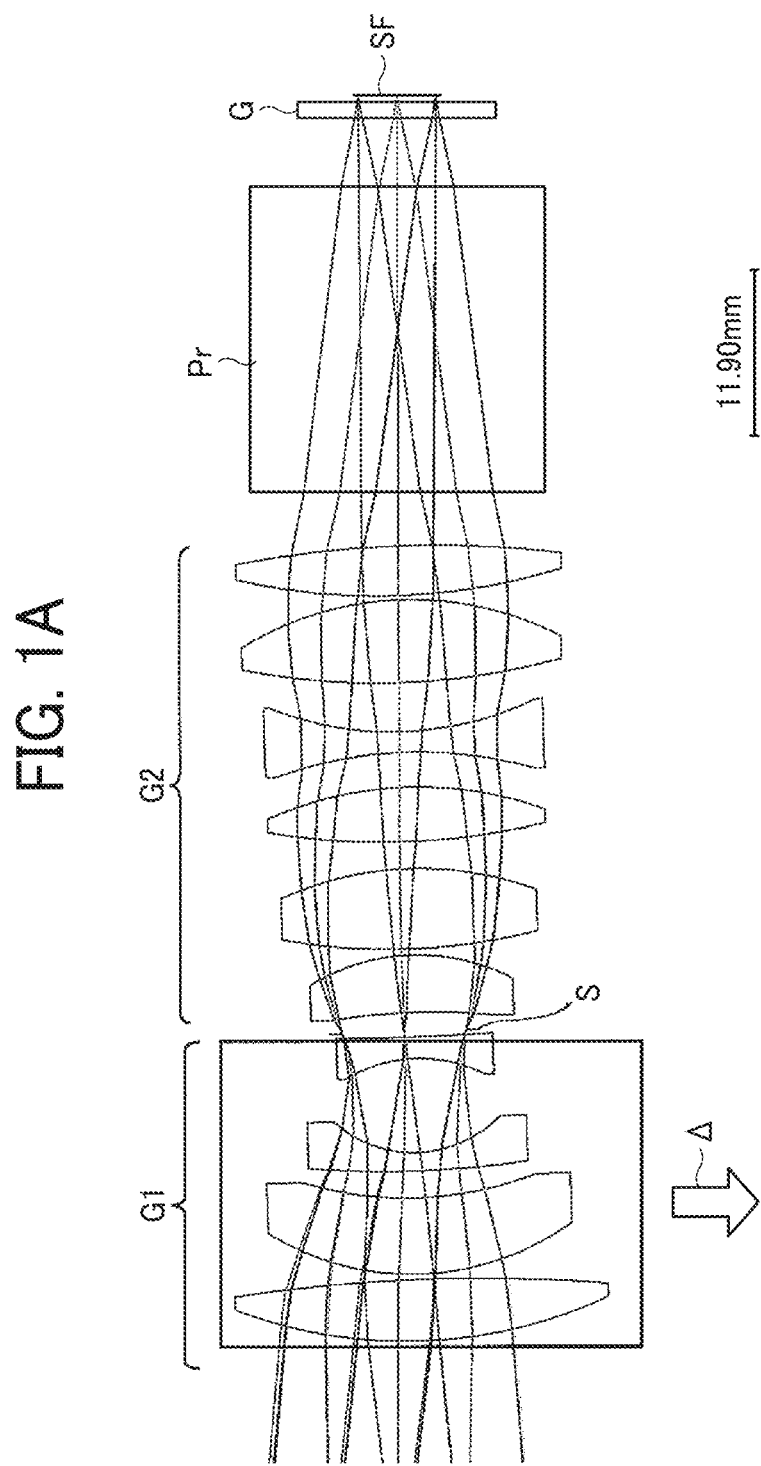

FIG. 2

| TYPE | R | d | REFRACTIVE INDEX | ABBE NUMBER | EFFECTIVE DIAMETER |
|---|---|---|---|---|---|
| SPHERICAL | ∞ | 294.4 | | | |
| SPHERICAL | ∞ | 0 | | | 27.89 |
| SPHERICAL | ∞ | 0 | | | 27.86 |
| SPHERICAL | ∞ | 0 | | | 27.95 |
| SPHERICAL | 42.149 | 4.454 | 1.618 | 63.4 | 26.90 |
| SPHERICAL | -144.572 | 0.392 | | | 25.98 |
| SPHERICAL | 23.776 | 5.526 | 1.806 | 33.3 | 21.86 |
| SPHERICAL | 31.409 | 1.945 | | | 17.42 |
| SPHERICAL | 84.086 | 1.330 | 1.517 | 64.2 | 15.67 |
| SPHERICAL | 10.303 | 6.804 | | | 12.56 |
| SPHERICAL | -12.688 | 1.574 | 1.850 | 30.0 | 10.65 |
| SPHERICAL | 301.158 | 0.386 | | | 11.31 |
| SPHERICAL | ∞ | 0.000 | | | 11.25 |
| SPHERICAL | ∞ | 1.375 | | | 9.93 |
| SPHERICAL | -57.641 | 4.155 | 1.806 | 33.3 | 12.53 |
| SPHERICAL | -18.208 | 0.442 | | | 14.68 |
| SPHERICAL | 52.040 | 5.815 | 1.497 | 81.6 | 16.70 |
| SPHERICAL | -29.691 | 1.949 | | | 18.31 |
| SPHERICAL | 60.474 | 3.950 | 1.497 | 81.6 | 19.70 |
| SPHERICAL | -32.622 | 2.526 | | | 19.87 |
| SPHERICAL | -36.952 | 1.500 | 1.640 | 34.5 | 19.43 |
| SPHERICAL | 29.053 | 3.545 | | | 19.96 |
| SPHERICAL | 61.428 | 6.000 | 1.497 | 81.6 | 22.07 |
| SPHERICAL | -28.403 | 0.304 | | | 22.96 |
| SPHERICAL | 55.033 | 3.584 | 1.729 | 54.7 | 23.33 |
| SPHERICAL | -92.625 | 0.000 | | | 23.12 |
| SPHERICAL | ∞ | 0.000 | | | 22.82 |
| SPHERICAL | ∞ | 0.000 | | | 22.79 |
| SPHERICAL | ∞ | 0.000 | | | 22.79 |
| SPHERICAL | ∞ | 3.922 | | | 22.79 |
| SPHERICAL | ∞ | 22.000 | 1.589 | 61.1 | 21.19 |
| SPHERICAL | ∞ | 5.035 | | | 15.78 |
| SPHERICAL | ∞ | 0.000 | | | 13.86 |
| SPHERICAL | ∞ | 1.100 | 1.595 | 67.7 | 13.86 |
| SPHERICAL | ∞ | 0.515 | | | 13.59 |
| SPHERICAL | ∞ | 0.000 | | | 13.42 |
| SPHERICAL | ∞ | 0.000 | | | 13.42 |

FIG. 7

| TYPE | R | d | REFRACTIVE INDEX | ABBE NUMBER | EFFECTIVE DIAMETER |
|---|---|---|---|---|---|
| SPHERICAL | ∞ | 297.629 | | | |
| SPHERICAL | ∞ | 0.000 | | | 25.96 |
| SPHERICAL | ∞ | 0.000 | | | 25.88 |
| SPHERICAL | ∞ | 0.000 | | | 25.97 |
| SPHERICAL | 42.505 | 4.177 | 1.618 | 63.4 | 25.12 |
| SPHERICAL | −112.160 | 0.300 | | | 24.29 |
| SPHERICAL | 23.650 | 5.520 | 1.806 | 33.3 | 20.67 |
| SPHERICAL | 29.255 | 2.074 | | | 16.25 |
| SPHERICAL | 264.960 | 1.300 | 1.517 | 64.2 | 14.79 |
| SPHERICAL | 11.072 | 5.415 | | | 12.38 |
| SPHERICAL | −13.052 | 1.647 | 1.850 | 30.0 | 11.39 |
| SPHERICAL | 305.000 | 0.362 | | | 12.20 |
| SPHERICAL | ∞ | 0.000 | | | 12.14 |
| SPHERICAL | ∞ | 1.409 | | | 10.65 |
| SPHERICAL | −55.559 | 4.073 | 1.806 | 33.3 | 13.42 |
| SPHERICAL | −18.104 | 0.326 | | | 15.50 |
| SPHERICAL | 48.432 | 4.348 | 1.497 | 81.6 | 17.47 |
| SPHERICAL | −29.100 | 4.698 | | | 18.33 |
| SPHERICAL | 61.850 | 4.093 | 1.497 | 81.6 | 20.42 |
| SPHERICAL | −33.027 | 2.942 | | | 20.55 |
| SPHERICAL | −35.398 | 1.500 | 1.640 | 34.5 | 19.90 |
| SPHERICAL | 29.300 | 2.863 | | | 20.41 |
| SPHERICAL | 56.949 | 7.568 | 1.497 | 81.6 | 21.97 |
| SPHERICAL | −29.650 | 0.300 | | | 23.32 |
| SPHERICAL | 74.653 | 3.594 | 1.729 | 54.7 | 23.60 |
| SPHERICAL | −67.023 | 0.000 | | | 23.47 |
| SPHERICAL | ∞ | 0.000 | | | 23.05 |
| SPHERICAL | ∞ | 0.000 | | | 23.04 |
| SPHERICAL | ∞ | 0.000 | | | 23.04 |
| SPHERICAL | ∞ | 3.901 | | | 23.04 |
| SPHERICAL | ∞ | 22.000 | 1.589 | 61.1 | 21.41 |
| SPHERICAL | ∞ | 5.035 | | | 15.84 |
| SPHERICAL | ∞ | 0.000 | | | 13.87 |
| SPHERICAL | ∞ | 1.100 | 1.595 | 67.7 | 13.87 |
| SPHERICAL | ∞ | 0.515 | | | 13.60 |
| SPHERICAL | ∞ | 0.000 | | | 13.42 |
| SPHERICAL | ∞ | 0.000 | | | 13.42 |

FIG. 12

| TYPE | R | d | REFRACTIVE INDEX | ABBE NUMBER | EFFECTIVE DIAMETER |
|---|---|---|---|---|---|
| SPHERICAL | ∞ | 291.000 | | | |
| SPHERICAL | ∞ | 0.000 | | | 26.582 |
| SPHERICAL | ∞ | 0.000 | | | 26.582 |
| SPHERICAL | ∞ | 0.000 | | | 25.756 |
| SPHERICAL | 30.197 | 4.420 | 1.804 | 46.5 | 24.930 |
| SPHERICAL | −1167.314 | 0.300 | | | 23.988 |
| SPHERICAL | 32.181 | 7.009 | 1.847 | 23.8 | 21.441 |
| SPHERICAL | 48.276 | 1.710 | | | 15.987 |
| SPHERICAL | −588.025 | 1.300 | 1.847 | 23.8 | 14.355 |
| SPHERICAL | 19.686 | 2.593 | | | 12.696 |
| SPHERICAL | ∞ | 0.000 | | | 13.658 |
| SPHERICAL | −26.158 | 1.300 | 1.571 | 50.8 | 14.250 |
| SPHERICAL | 20.737 | 2.188 | | | 13.811 |
| SPHERICAL | ∞ | 1.188 | | | 11.508 |
| SPHERICAL | −148.357 | 5.614 | 1.595 | 67.7 | 14.907 |
| SPHERICAL | −26.034 | 2.437 | | | 17.292 |
| SPHERICAL | 24.495 | 7.320 | 1.497 | 81.6 | 20.402 |
| SPHERICAL | −24.473 | 5.284 | | | 20.724 |
| SPHERICAL | −17.545 | 1.500 | 1.548 | 45.8 | 19.292 |
| SPHERICAL | 34.332 | 3.251 | | | 20.938 |
| SPHERICAL | 283.385 | 5.661 | 1.497 | 81.6 | 22.593 |
| SPHERICAL | −20.516 | 0.300 | | | 23.522 |
| SPHERICAL | 39.085 | 4.620 | 1.595 | 67.7 | 24.404 |
| SPHERICAL | −76.093 | 0.000 | | | 24.143 |
| SPHERICAL | ∞ | 0.000 | | | 23.679 |
| SPHERICAL | ∞ | 0.000 | | | 23.679 |
| SPHERICAL | ∞ | 1.631 | | | 23.679 |
| SPHERICAL | ∞ | 20.000 | 1.589 | 61.1 | 22.979 |
| SPHERICAL | ∞ | 6.000 | | | 17.743 |
| SPHERICAL | ∞ | 0.000 | | | 15.283 |
| SPHERICAL | ∞ | 1.100 | 1.518 | 58.9 | 15.283 |
| SPHERICAL | ∞ | 3.950 | | | 14.995 |
| SPHERICAL | ∞ | 0.000 | | | 13.429 |
| SPHERICAL | ∞ | 0.011 | | | 13.425 |

FIG. 17A

| TYPE | R | d | REFRACTIVE INDEX | ABBE NUMBER | EFFECTIVE DIAMETER |
|---|---|---|---|---|---|
| SPHERICAL | ∞ | 291.000 | | | |
| SPHERICAL | ∞ | 0.000 | | | 25.66 |
| SPHERICAL | ∞ | 0.000 | | | 25.66 |
| SPHERICAL | ∞ | 0.000 | | | 24.35 |
| SPHERICAL | 30.638 | 3.843 | 1.816 | 46.6 | 23.61 |
| SPHERICAL | 481.242 | 0.300 | | | 22.74 |
| SPHERICAL | 28.737 | 6.046 | 1.883 | 40.8 | 20.62 |
| SPHERICAL | 45.201 | 1.564 | | | 16.26 |
| SPHERICAL | 159.969 | 1.300 | 1.755 | 27.5 | 14.75 |
| SPHERICAL | 17.298 | 2.256 | | | 12.92 |
| SPHERICAL | ∞ | 0.000 | | | 14.42 |
| SPHERICAL | -32.532 | 1.300 | 1.517 | 52.4 | 14.98 |
| SPHERICAL | 19.217 | 2.369 | | | 14.23 |
| SPHERICAL | ∞ | 1.492 | | | 11.65 |
| SPHERICAL | -58.086 | 7.374 | 1.804 | 46.5 | 15.04 |
| SPHERICAL | -33.016 | 1.346 | | | 18.32 |
| SPHERICAL | 23.140 | 6.493 | 1.497 | 81.6 | 20.73 |
| SPHERICAL | -29.639 | 7.453 | | | 20.73 |
| SPHERICAL | -17.264 | 1.300 | 1.654 | 39.7 | 18.95 |
| SPHERICAL | 39.036 | 1.925 | | | 20.89 |
| SPHERICAL | -559.431 | 3.458 | 1.497 | 81.6 | 21.35 |
| SPHERICAL | -33.271 | 0.300 | | | 22.51 |
| ASPHERICAL | 42.428 | 7.840 | 1.595 | 67.7 | 25.46 |
| ASPHERICAL | -20.347 | 0.000 | | | 25.86 |
| SPHERICAL | ∞ | 0.000 | | | 23.89 |
| SPHERICAL | ∞ | 0.000 | | | 23.89 |
| SPHERICAL | ∞ | 1.660 | | | 23.89 |
| SPHERICAL | ∞ | 20.000 | 1.589 | 61.1 | 23.17 |
| SPHERICAL | ∞ | 6.000 | | | 17.84 |
| SPHERICAL | ∞ | 0.000 | | | 15.32 |
| SPHERICAL | ∞ | 1.100 | 1.518 | 58.9 | 15.32 |
| SPHERICAL | ∞ | 3.950 | | | 15.03 |
| SPHERICAL | ∞ | 0.000 | | | 13.42 |
| SPHERICAL | ∞ | 0.011 | | | 13.42 |

FIG. 17B

| r | 42.428 | -20.347 |
|---|---|---|
| k | 0 | 0 |
| $\alpha 1$ | 0.000000E+00 | 0.000000E+00 |
| $\alpha 2$ | -4.547277E-06 | 1.704794E-05 |
| $\alpha 3$ | -1.235693E-08 | 1.103243E-09 |
| $\alpha 4$ | 6.754378E-11 | 8.246955E-11 |
| $\alpha 5$ | -1.612472E-13 | -6.051000E-14 |

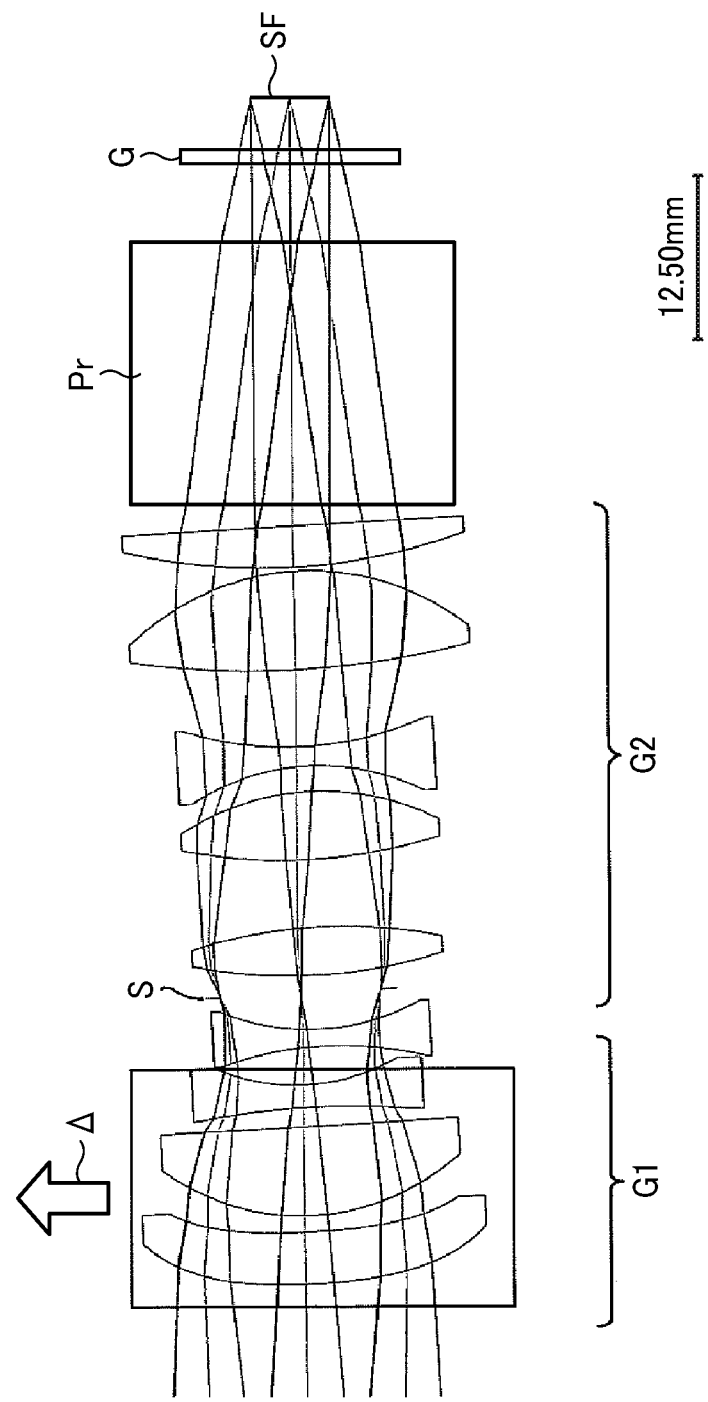

FIG. 22A

| TYPE | R | d | REFRACTIVE INDEX | ABBE NUMBER | EFFECTIVE DIAMETER |
|---|---|---|---|---|---|
| SPHERICAL | ∞ | 291 | | | |
| SPHERICAL | ∞ | 0 | | | 26.71 |
| SPHERICAL | ∞ | 0 | | | 26.71 |
| SPHERICAL | ∞ | 0 | | | 25.48 |
| ASPHERICAL | 51.550 | 4.000 | 1.537 | 56.5 | 24.65 |
| ASPHERICAL | 64.438 | 1.242 | | | 22.52 |
| SPHERICAL | 19.290 | 6.794 | 1.871 | 40.7 | 21.38 |
| SPHERICAL | 1005.884 | 1.488 | | | 18.39 |
| SPHERICAL | −66.118 | 1.733 | 1.689 | 31.1 | 16.51 |
| SPHERICAL | 16.739 | 2.894 | | | 13.73 |
| SPHERICAL | ∞ | 0.000 | | | 15.21 |
| SPHERICAL | −29.692 | 1.300 | 1.532 | 48.8 | 15.78 |
| SPHERICAL | 19.021 | 2.804 | | | 15.32 |
| SPHERICAL | ∞ | 1.331 | | | 12.77 |
| SPHERICAL | 41.896 | 3.669 | 1.871 | 40.7 | 17.82 |
| SPHERICAL | −42.384 | 5.197 | | | 18.20 |
| SPHERICAL | 43.564 | 5.187 | 1.497 | 81.5 | 18.62 |
| SPHERICAL | −21.455 | 1.955 | | | 18.44 |
| SPHERICAL | −19.483 | 1.500 | 1.689 | 31.1 | 17.40 |
| SPHERICAL | 28.391 | 5.907 | | | 18.27 |
| SPHERICAL | 72.130 | 7.527 | 1.497 | 81.5 | 23.01 |
| SPHERICAL | −21.177 | 0.300 | | | 24.23 |
| ASPHERICAL | 48.618 | 3.162 | 1.852 | 40.8 | 24.17 |
| ASPHERICAL | −11270.661 | 0.000 | | | 23.78 |
| SPHERICAL | ∞ | 0.000 | | | 23.82 |
| SPHERICAL | ∞ | 0.000 | | | 23.82 |
| SPHERICAL | ∞ | 1.633 | | | 23.82 |
| SPHERICAL | ∞ | 20.000 | 1.589 | 61.1 | 23.11 |
| SPHERICAL | ∞ | 6.000 | | | 17.81 |
| SPHERICAL | ∞ | 0.000 | | | 15.31 |
| SPHERICAL | ∞ | 1.100 | 1.518 | 58.9 | 15.31 |
| SPHERICAL | ∞ | 3.950 | | | 15.01 |
| SPHERICAL | ∞ | 0.000 | | | 13.44 |
| SPHERICAL | ∞ | 0.011 | | | 13.45 |

FIG. 22B

| r | 51.550 | 64.438 |
|---|---|---|
| k | 9.353464E+00 | 0.000000E+00 |
| $\alpha 1$ | 0.000000E+00 | 0.000000E+00 |
| $\alpha 2$ | 3.310557E−05 | 4.587023E−05 |
| $\alpha 3$ | −4.953080E−09 | 4.746879E−09 |
| $\alpha 4$ | 2.570245E−10 | 5.639903E−10 |

FIG. 27

| TYPE | R | d | REFRAC-TIVE INDEX | ABBE NUMBER | EFFECTIVE DIAMETER |
|---|---|---|---|---|---|
| SPHERICAL | ∞ | 291 | | | |
| SPHERICAL | ∞ | 0 | | | 27.55 |
| SPHERICAL | ∞ | 0 | | | 27.55 |
| SPHERICAL | 32.895 | 4.599 | 1.804 | 46.5 | 26.81 |
| SPHERICAL | -581.794 | 0.300 | | | 25.96 |
| SPHERICAL | 24.894 | 3.990 | 1.847 | 23.8 | 22.49 |
| SPHERICAL | 25.265 | 3.083 | | | 19.13 |
| SPHERICAL | -239.450 | 1.300 | 1.583 | 36.9 | 17.80 |
| SPHERICAL | 13.925 | 5.127 | | | 15.29 |
| SPHERICAL | -16.498 | 1.300 | 1.701 | 30.2 | 14.99 |
| SPHERICAL | 119.864 | 1.266 | | | 15.92 |
| SPHERICAL | ∞ | 1.000 | | | 13.63 |
| SPHERICAL | ∞ | 0.000 | | | 17.40 |
| SPHERICAL | -130.891 | 3.153 | 1.839 | 39.3 | 17.08 |
| SPHERICAL | -22.021 | 0.300 | | | 18.02 |
| SPHERICAL | 28.939 | 5.042 | 1.497 | 81.6 | 19.71 |
| SPHERICAL | -38.146 | 12.555 | | | 19.77 |
| SPHERICAL | -33.552 | 1.500 | 1.607 | 34.1 | 20.50 |
| SPHERICAL | 28.416 | 3.446 | | | 19.86 |
| SPHERICAL | 48.143 | 6.080 | 1.497 | 81.6 | 22.82 |
| SPHERICAL | -25.018 | 0.300 | | | 23.54 |
| SPHERICAL | 53.231 | 3.625 | 1.804 | 46.5 | 24.03 |
| SPHERICAL | -121.998 | 0.000 | | | 23.81 |
| SPHERICAL | ∞ | 0.000 | | | 23.56 |
| SPHERICAL | ∞ | 0.000 | | | 23.57 |
| SPHERICAL | ∞ | 0.000 | | | 23.57 |
| SPHERICAL | ∞ | 1.642 | | | 23.57 |
| SPHERICAL | ∞ | 20.000 | 1.589 | 61.1 | 22.87 |
| SPHERICAL | ∞ | 6.000 | | | 17.68 |
| SPHERICAL | ∞ | 0.000 | | | 15.24 |
| SPHERICAL | ∞ | 1.100 | 1.518 | 58.9 | 15.24 |
| SPHERICAL | ∞ | 3.950 | | | 14.96 |
| SPHERICAL | ∞ | 0.000 | | | 13.42 |
| SPHERICAL | ∞ | 0.011 | | | 13.42 |

FIG. 31A

| EXAMPLE | MAGNIFYING POWER | FOCAL LENGTH (mm) | FRONT-GROUP FOCAL LENGTH (mm) | REAR-GROUP FOCAL LENGTH (mm) | AMOUNT OF PROJECTION TILT (deg.) |
|---|---|---|---|---|---|
| 1 | 11.702 | 27.336 | −20.026 | 18.855 | 1.83 |
| 2 | 10.969 | 29.229 | −20.164 | 20.592 | 2.01 |
| 3 | 8.193 | 38.404 | 95.297 | 22.930 | 3.00 |
| 4 | 8.221 | 38.139 | 77.374 | 25.221 | 3.04 |
| 5 | 8.219 | 38.224 | 109.745 | 25.004 | 3.05 |
| 6 | 8.229 | 38.193 | −29.575 | 25.842 | 2.63 |

FIG. 31B

| EXAMPLE | SHIFT OF PROJECTION LENS (mm) | AMOUNT OF FRONT-GROUP SHIFT (mm) | AMOUNT OF REAR-GROUP SHIFT (mm) | 2ND AND 3RD CONDITIONAL EXPRESSIONS |
|---|---|---|---|---|
| 1 | 0.03 | −0.11 | 0.00 | 0.00020 |
| 2 | 0.11 | −0.12 | 0.00 | 0.00020 |
| 3 | 0.00 | 1.46 | 0.00 | 0.00040 |
| 4 | 0.00 | 1.36 | 0.00 | 0.00046 |
| 5 | 0.00 | 1.40 | 0.00 | 0.00033 |
| 6 | 0.00 | 0.00 | 0.13 | 0.00013 |

PROJECTION LENS SYSTEM AND IMAGE PROJECTION APPARATUS

CROSS-REFERENCE TO RELATED APPLICATION

The present application is based on PCT filing PCT/IB2020/060067, filed Oct. 28, 2020, and claims priority to Japanese Application No. 2019-207843 filed on Nov. 18, 2019, the entire contents of each are incorporated herein by reference.

TECHNICAL FIELD

Embodiments of the present disclosure relate to a projection lens system and an image projection apparatus.

BACKGROUND ART

Image projection apparatuses that use a projection lens system to project an image, which is displayed on the display surface of an image display element such as a digital micromirror device (DMD), a liquid crystal panel, and a light-emitting element array, on a projection plane such as a screen as a projection image are known in the art and implemented as various kinds of projectors.

Currently, heads-up displays (HUD) are commercialized in which such an image projection apparatus as above is provided for a mobile object such as a vehicle and, for example, a concave mirror is used to form an image displayed on a screen as a virtual image to be observed.

In projectors or HUDs, there are many cases in which the display surface of an image display element and the projection plane (screen) are not parallel to each other. As optical conditions for achieving a projection image that is well focused on the projection plane when the display surface and the projection plane (screen) are not parallel to each other as above, so-called Scheimpflug principle is known in the art (see, for example, PTL 1).

The Scheimpflug principle is the conditions for the principal plane, the display surface, and the projection plane (screen) of a projection lens system to intersect with each other so as to share a single straight line. Note that the principal plane of a projection lens system includes a principal plane on the incident side and a principal plane on the light exiting side. The principal plane that applies to the Scheimpflug principle is a principal plane on the incident side, i.e., the principal plane on the display-surface side.

In the Scheimpflug principle, the following equation is satisfied.

$$a/\tan \theta A = b/\tan \theta B$$

In this equation, $\theta A$ denotes the angle that the principal plane of a projection lens system forms with the display surface, and $\theta B$ denotes the angle that the principal plane forms with the projection plane. Moreover, a and b denote the distance to an object and the distance to an image on the optical axis of the projection lens system, respectively.

According to the above equation, the image-forming magnification power m on the optical axis can be expressed as "b/a" or "tan $\theta B$/tan $\theta A$." Accordingly, if the tilt angle $\theta B$ of the screen with reference to the principal plane of a projection lens system is given as a design condition, the tilt angle $\theta A$ of the display surface with reference to the principal plane can be expressed in an equation given below based on "tan $\theta A$=(tan $\theta B$)/m."

$$\theta A = \arctan\{(\tan \theta B)/m\}$$

Due to the above assumptions, the angle that the optical axis of the projection lens system forms with the display surface and the projection plane can be determined.

As described above, the Scheimpflug principle may be satisfied to obtain a well-focused projection image on the projection plane that is not parallel to the display surface.

If the tilt angle that the optical axis of the projection lens system forms with the display surface is slightly changed with reference to the Scheimpflug principle, the coma aberration significantly deteriorates on a projected image. However, the characteristics of the spherical aberration and astigmatism are almost unchanged compared with the spherical aberration and astigmatism when the Scheimpflug principle is perfectly satisfied.

CITATION LIST

Patent Literature

PTL 1

Japanese Patent Application Publication No. 2007-163547

SUMMARY OF INVENTION

Technical Problem

In view of the above circumstances, the present disclosure aims at achieving a projection lens system with which various kinds of aberrations other than the coma aberration are well controlled with reference to the display surface and the projection plane that are not parallel to each other and the coma aberration can efficiently be corrected.

Solution to Problem

A projection lens system includes a front group disposed on a projection-plane side, a rear group disposed on a display-surface side of an image display element inclined with reference to the projection plane, and an aperture stop disposed on the display-surface side with reference to the front group. The front group has a front-group optical axis, and the rear group has a rear-group optical axis parallel to the front-group optical axis. The front-group optical axis and the rear-group optical axis are shifted by an amount of shift Δ relative to each other, in a direction perpendicular to the front-group optical axis and the rear-group optical axis. The front-group optical axis and the rear-group optical axis are on a shared plane shared by a display-surface normal assumed on the display surface and a projection-plane normal line assumed on the projection plane to intersect with the display-surface normal. The rear-group optical axis is tilted on the shared plane at a tilt angle with reference to the display-surface normal. In projection lens system, when the amount of shift Δ is zero, the tilt angle satisfies a conditional expression 0<ξ/ξs<1, where ξs denotes a tilt angle when Scheimpflug principle is satisfied with reference to the display surface and the projection plane.

Advantageous Effects of Invention

According to one aspect of the present disclosure, a projection lens system can be achieved with which various kinds of aberrations other than the coma aberration are well controlled with reference to the display surface and the projection plane that are not parallel to each other and the coma aberration can efficiently be corrected.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 1A and 1B illustrate a lens configuration of a projection lens system according to a first example of the present disclosure.

FIG. 2 depicts the data of the projection lens system of FIG. 1A.

FIG. 7 depicts the data of the projection lens system of FIG. 6.

FIG. 12 depicts the data of the projection lens system of FIG. 11.

FIG. 17A and FIG. 17B depict the data of the projection lens system of FIG. 16.

FIG. 21 is a diagram illustrating a lens configuration of a projection lens system according to a fifth example of the present disclosure.

FIG. 22A and FIG. 22B depict the data of the projection lens system of FIG. 21.

FIG. 27 depicts the data of the projection lens system of FIG. 26.

FIG. 31A and FIG. 31B depict the optical data according to first to sixth examples of the present disclosure.

DESCRIPTION OF EMBODIMENTS

Figure 1B:
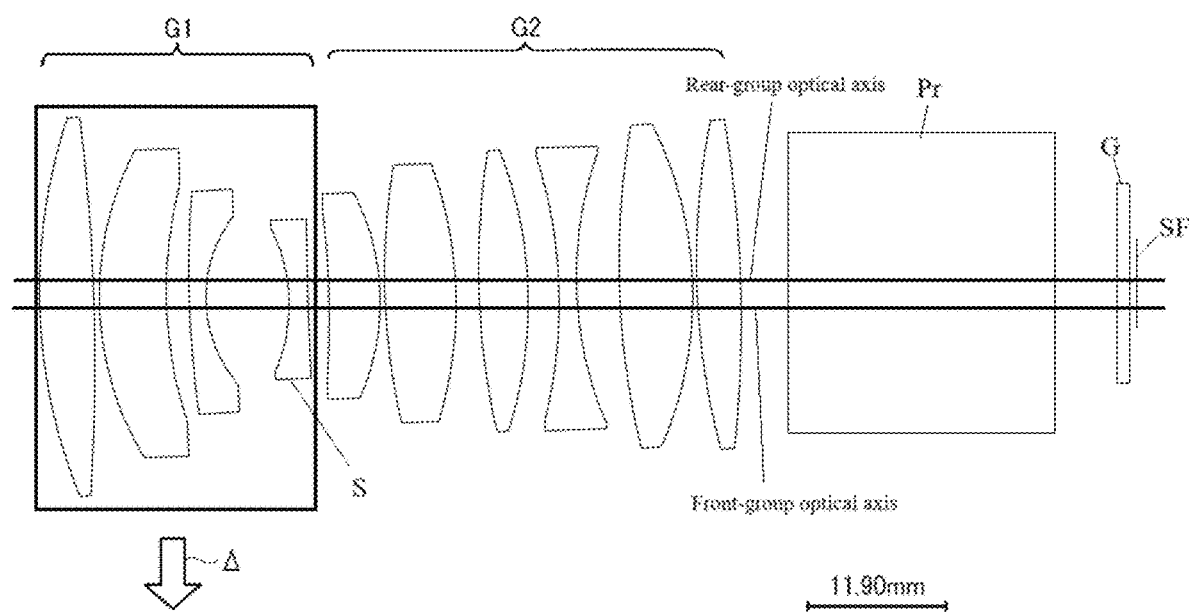

A projection plane and a display surface that are not parallel to each other are arranged, and a projection lens system has a front group and a rear group in the order listed from the from the projection-plane side toward the display-surface side. An aperture stop is arranged on the display-surface side with reference to the front group in the projection lens system. Moreover, in the projection lens system, the optical axis of the front group is referred to as a front-group optical axis, and the optical axis of the rear group is referred to as a rear-group optical axis. The front-group optical axis and the rear-group optical axis are made parallel to each other and are relatively shifted from each other in a direction perpendicular to these optical axes. Due to such a configuration, the deterioration due to coma aberration can effectively be improved.

The relative amount of shift between the front-group optical axis and the rear-group optical axis is referred to as an amount of shift Δ in the following description.

The front-group optical axis and the rear-group optical axis are shifted from each other, but these front-group optical axis and rear-group optical axis are parallel to each other.

The rear-group optical axis is tilted at a tilt angle with respect to the display surface SF. As the front-group optical axis is parallel to the rear-group optical axis, as a matter of course, the front-group optical axis is also tilted at a tilt angle with respect to the display surface SF.

Although the display surface and the projection plane (screen) are not parallel to each other, normal lines are assumed on the display surface and the projection plane, and a normal line that is assumed on the display surface is referred to as a display-surface normal in the following description. Among a plurality of normal lines assumed on the projection plane, a normal line that intersects with a display-surface normal is referred to as a projection-plane normal in the following description.

A plane that is shared by a display-surface normal and a projection-plane normal that intersect with each other is referred to as a shared plane in the following description. In other words, both a display-surface normal and a projection-plane normal are on such a shared plane. The front-group optical axis and the rear-group optical axis are shifted and tilted as described above on such a shared plane.

When it is assumed that the amount of shift Δ is zero, the mutual shift between the front-group optical axis and the rear-group optical axis ceases, and the front-group optical axis and the rear-group optical axis are in a line and form a same straight line. The optical axis of the front-group optical axis and the rear-group optical axis when the front-group optical axis and the rear-group optical axis form a same straight line as described above is referred to as a shared optical axis.

The tilt angle of the optical axis when a lens system where the front-group optical axis and the rear-group optical axis together forms a shared optical axis satisfies the Scheimpflug principle as described above with reference to the display surface and the projection plane is referred to as s in the following description.

The above tilt angles and s satisfy a first conditional expression given below.

$$0 < \xi/\xi s < 1$$

In other words, in the projection lens system according to examples or embodiments of the present disclosure where the front-group optical axis and the rear-group optical axis are shifted from each other, the amount of tilt ξ of the rear-group optical axis is smaller than the tilt angle ξs that satisfies the Scheimpflug principle when the amount of shift is zero.

As described above, in the projection lens system according to the examples and embodiments of the present disclosure, an aperture stop is arranged on the display-surface side with reference to the front group. However, no limitation is indicated thereby, and the aperture stop may be arranged between the front group and the rear group, or may be arranged within the rear group.

The aperture stop is arranged between the front group and the rear group such that the front group and the rear group are separated from each other. When the aperture stop is arranged within the rear group, at least one of the multiple lenses that together configure the rear group is arranged on the front-group side with reference to the aperture stop.

When a DMD is used as the image display element, the display surface is a group of minute specular surfaces. As such a group of minute specular surfaces that together configure a display image are inclined, light is reflected by such a group of inclined minute specular surfaces, and such reflected light forms image light (i.e., the light flux that is incident on a projection lens system and then forms a projection image).

In the above configuration, the inclination that is required for a minute specular surface may exceed the possible tilt angle of a minute specular surface depending on the tilt angle between the display surface and the projection plane. In such a configuration, the display surface may be inclined to form a bias angle for the tilt angle of the minute specular surface. Accordingly, the Scheimpflug principle can be satisfied. However, in such a configuration, the display surface of a DMD is irradiated with the illumination light and some of the illumination light that is reflected by the display surface of the DMD (such light reflected by the display surface may be referred to as flat light in the following description) may be incident on a projection lens system, and as such illumination light that is incident on the projection lens system interferes with the image light that is formed by a group of minute specular surfaces inclined according to an image to be displayed, the contrast of a projection image that is projected onto a projection plane may deteriorate. When a bias angle is formed as above, the orientation of the projection plane need to be adjusted in order to satisfy the Scheimpflug principle, and layout problems may occur.

As the projection lens system according to the examples and embodiments of the present disclosure is used, the above bias angle can be made zero. Due to such a configuration, the image light can be prevented from being interfered by some of the flat light.

The aperture stop can be shifted on a shared plane in a direction perpendicular to the rear-group optical axis or the front-group optical axis, independently of the shifting of the front group and the rear group. As the aperture stop is shifted as above, the deterioration of f number due to the shifting and tilting of a front-group optical axis and a rear-group optical axis can effectively be compensated.

As described above, the projection lens system according to examples or embodiments of the present disclosure is configured by two groups of lenses including the front group and the rear group. However, the refractive power of these groups of the front group and rear group may be either positive or negative as desired as long as the condition that the refractive power of the entire group is positive is satisfied.

In other words, the refractive power of the front group and the rear group may be determined in one of the following three combinations, i.e., "positive and positive," "positive and negative," and "negative and positive."

In view of the above combinations, it is desired that the front group have a positive or negative refractive power and the rear group have a positive refractive power.

In the projection lens system according to the examples and embodiments of the present disclosure, an image that is displayed on the display surface of an image display element is projected as a projection image on the projection plane that is inclined with reference to the display surface. For this reason, such a projection lens system needs to be designed based on the premise that the display surface and the projection plane (screen) are not parallel to each other.

When a projection lens system is to be designed, the relative positions of the projection lens system and the display surface or the projection plane need to be determined. Such relative positions are set with reference to the projection plane and the display surface.

The shifting and tilting of a front-group optical axis and a rear-group optical axis are described below with reference to FIG. 32A, FIG. 32B, FIG. 32C, FIG. 32D, and FIG. 32E.

FIG. 32A, FIG. 32B, FIG. 32C, FIG. 32D, and FIG. 32E are schematic diagrams each illustrating the shifting and tilting of a front-group optical axis and a rear-group optical axis, according to examples or embodiments of the present disclosure. In FIG. 32A, FIG. 32B, FIG. 32C, FIG. 32D, and FIG. 32E, a projection plane (screen) SC and a display surface SF are illustrated. A straight line SL that connects the center of the projection plane SC and the center of the display surface SF is referred to as a reference line in the following description.

The front group and the rear group are referred to as a front group G1 and a rear group G2, respectively.

Figure 32A:
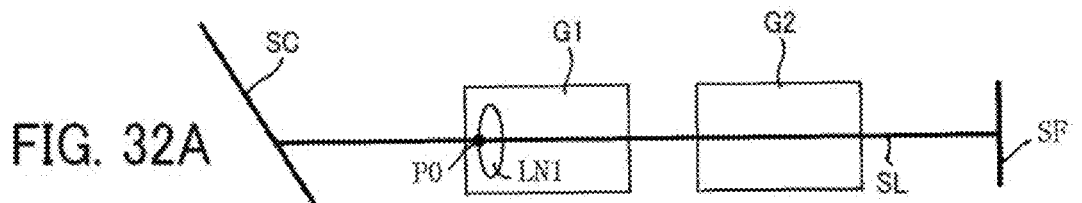
FIG. 32A, FIG. 32B, FIG. 32C, FIG. 32D, and FIG. 32E are diagrams each illustrating the tilting and shifting of the optical axes of a front lens group and a rear lens group, according to examples or embodiments of the present disclosure.

FIG. 32A illustrates a non-shifted state. In such a non-shifted state, the optical axes of the front group G1 and the rear group G2 are not shifted from each other. These optical axes match one another, and form a common optical axis that matches a reference line SL.

Figure 32B:
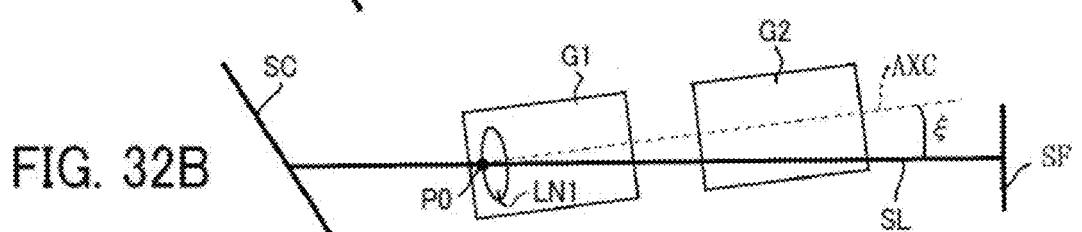

FIG. 32B illustrates a state in which a common optical axis AXC is rotated in a counterclockwise direction from a non-shifted state, and such a state is referred to as a tilt-reference state in the following description. When the state is shifted from a non-shifted state to a tilt-reference state, the common optical axis AXC is rotated around a point of intersection P0 of the reference line SL and a lens LN1 of the front group G1 on the projection-plane SC side.

ξ in FIG. 32B indicates the tilt angle.

Figure 32C:
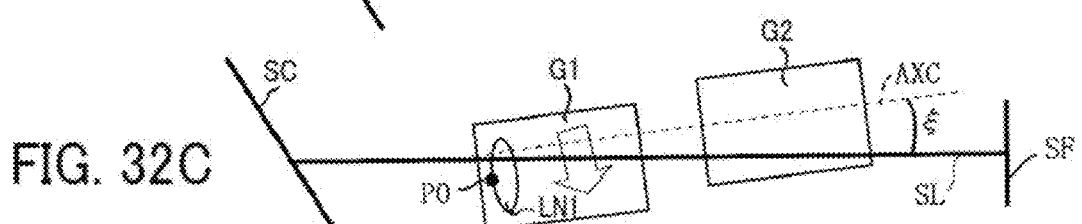

FIG. 32C indicates a state in which the front group G1 is shifted downward in a direction perpendicular to the optical axis of the rear-group optical axis, with reference to a tilt-reference state as illustrated in FIG. 32B. This amount of shift is referred to as an amount of shift Δ in the following description.

The direction of shifting of the front group G1 as illustrated in FIG. 32C is not limited to downward but may be upward.

Figure 32D:
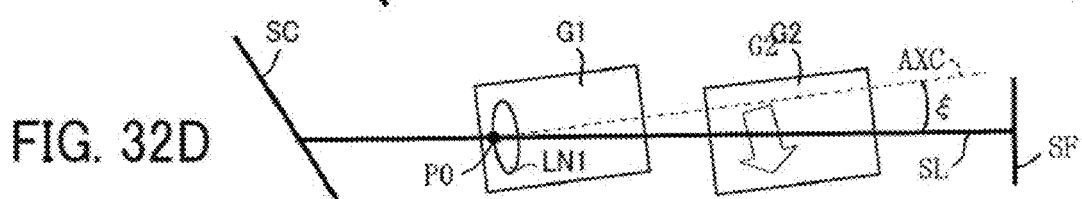

FIG. 32D indicates a state in which the rear group G2 is shifted downward in a direction perpendicular to the optical axis of the front group G1, with reference to a tilt-reference state as illustrated in FIG. 32B. Also in this configuration, the amount of shift of the rear group G2 is referred to as an amount of shift Δ.

The direction of shifting of the rear group G2 as illustrated in FIG. 32D is not limited to downward but may be upward.

Figure 32E:

FIG. 32E illustrates a state in which the front group G1 and the rear group G2 are shifted upward as a whole from the state as illustrated in FIG. 32C, according to embodiments of the present disclosure.

The direction of shifting of the front group G1 and the rear group G2 as a whole as illustrated in FIG. 32E is not limited to upward but may be downward.

The case as illustrated in FIG. 32C in which the front group G1 is shifted with reference to a tilt-reference state as illustrated in FIG. 32B is referred to as a first case in the following description.

The case as illustrated in FIG. 32D in which the rear group G2 is shifted with reference to a tilt-reference state as illustrated in FIG. 32B is referred to as a second case in the following description.

Further, FIG. 32E illustrates a state in which the entire projection lens system that includes the front group G1 and the rear group G2 is shifted in a direction perpendicular to the front-group optical axis, where the tilt angle ξ and the amount of shift Δ are maintained at the same degrees, with reference to the states of the first and second cases in which the front group G1 or the rear group G2 is shifted as illustrated in FIG. 32C and FIG. 32D. This case as illustrated in FIG. 32E is referred to as a third case in the following description. The direction of shifting as a whole is not limited to the upper side of FIG. 32E, but may be the lower side of FIG. 32E.

When the front-group optical axis is shifted by an amount of shift Δ1 with reference to the rear-group optical axis in the first or third case, it is desired that the second conditional expression given below be satisfied. In the second conditional expression, f1 denotes the focal length of the front group G1, Δ1 denotes the amount of shift of the front-group optical axis, and f denotes the focal length of all the groups.

$$0.000047 \ (/\text{mm}) < |\Delta 1/f1|/f < 0.001 \ (/\text{mm})$$

When the rear-group optical axis is shifted in the second or third case by an amount of shift Δ2 with reference to the front-group optical axis, it is desired that the third conditional expression given below be satisfied. In the third conditional expression, f2 denotes the focal length of the rear group G2, Δ2 denotes the amount of shift of the rear-group optical axis, and f denotes the focal length of all the groups.

$$0.000047 \ (/\text{mm}) < |\Delta 2/f2|/f < 0.001 \ (/\text{mm})$$

Both the above-mentioned second and third conditional expressions relate to an arrangement for correcting coma aberration. In both of the second and third conditional expressions, an arrangement for correcting coma aberration due to the shifting of a group to be shifted tends to be insufficient when the value in the middle goes below a lower limit, and on the contrary, an arrangement for correcting coma aberration due to the shifting of a group to be shifted tends to be excessive when the value in the middle exceeds a upper limit.

Preferably, the lower limit of the third conditional expression and the fourth conditional expression is 0.00007 mm. More preferably, the lower limit of the third conditional expression and the fourth conditional expression is 0.0001 mm. Preferably, the upper limit of the third conditional expression and the fourth conditional expression is 0.0007 mm. More preferably, the upper limit of the third conditional expression and the fourth conditional expression is 0.0005 mm.

The projection lens system according to the examples and embodiments of the present disclosure includes a plurality of lenses, and at least one of such multiple lenses may be an aspherical lens. With the adoption of such an aspherical lens, the performance of the projection lens system can be improved. Such an aspherical lens may be configured by a plastic lens or a lens molded of glass.

When two or more lenses of the projection lens system are aspherical lenses, some of these aspherical lenses may be configured by a lens molded of glass, and the rest of these aspherical lenses may be configured by a plastic lens.

Lenses molded of glass are insusceptible to environmental changes such as changes in temperature and humidity, and plastic lenses can be manufactured at low cost.

As a matter of course, all the lenses of the projection lens system may be configured by glass lens or plastic lens, and some of the lenses of the projection lens system may be configured by a combination of glass lens or plastic lens.

Such a projection lens system as described above may be used as a projection lens system of an image projection apparatus that uses a projection lens system to project an image that is displayed on the display surface of an image display element as a projection image on the projection plane that is inclined in one direction with reference to the display surface.

For example, a digital micromirror device (DMD), liquid crystal panel, and a light-emitting element array may be used as the image display element of such an image projection apparatus. However, when a DMD is used as an image display element, a prism that guides the illumination light to the display surface of the DMD may be arranged between the DMD and the rear group.

In such a configuration, the object-light incident plane of the prism that faces the display surface can be arranged so as to be parallel to the display surface.

Alternatively, the display-surface normal may be tilted on the shared plane with reference to the object-light incident plane of the prism.

By so doing, some of the tilt angle of the rear-group optical axis of the projection lens system can be borne by the tilt of the display surface, and the design requirement of the projection lens system can be made less strict or less demanding.

As a matter of course, the image projection apparatus according to examples or embodiments of the present disclosure may be configured and used as a projector. However, no limitation is indicated thereby, and the image projection apparatus according to examples or embodiments of the present disclosure may be provided for a mobile object such as a vehicle and may be configured and used as a heads-up display (HUD) that uses, for example, a concave mirror to form an image displayed on a screen as a virtual image to be observed.

Concrete six examples of a projection lens system are given below.

First Example

FIGS. 1A and 1B illustrate a configuration or structure of a projection lens system on a shared plane, according to a first example of the present disclosure.

In FIGS. 1A and 1B, the left side indicates the projection-plane side, and the right side indicates the display-surface side.

In the first example of the present disclosure, it is assumed that a DMD is used as the image display element, and the DMD has a planar display surface SF and a cover glass G to protect the display surface SF. The same applies to the second to sixth examples of the present disclosure as will be described below.

In FIG. 1 FIGS. 1A and 1B, a front group G1, a rear group G2, and an aperture stop S are illustrated. Moreover, a prism Pr is illustrated that is arranged between the rear group G2 and the display surface SF to guide the illumination light. The prism Pr is a rectangular prism, and the object-light incident plane of the prism that faces the display surface SF faces the display surface SF and is parallel to the display surface SF.

The front group G1 includes four lenses of a double-convex lens, a positive meniscus lens, a negative meniscus lens, and a double-concave lens that are arranged in this order listed from the projection-plane side toward the display-surface side, and has a negative refractive power. The front group G1 as a whole in the present example is shifted by the amount of shift 4 to the lower side of FIGS. 1A and 1B in a direction perpendicular to the front-group optical axis.

When the amount of shift is described with reference to FIGS. 1A and 1B, a direction toward the upper side of FIGS. 1A and 1B is referred to as a positive direction and indicated by a sign "+," and a direction toward the lower side of FIGS. 1A and 1B is referred to as a negative direction and indicated by a sign "−."

The same applies to the other examples given below.

The rear group G2 includes six lenses of a positive meniscus lens, a double-convex lens, a double-convex lens, a double-concave lens, a double-convex lens, and a double-convex lens that are arranged in this order listed from the projection-plane side toward the display-surface side, and has a positive refractive power.

An aperture stop S is arranged between the front group G1 and the rear group G2 such that the front group G1 and the rear group G2 are separated from each other.

The amount of shift in the front group G1 can be calculated by an equation given below.

$$\Delta = -0.11 \text{ millimeters (mm)}$$

The optical axis of the rear group G2 is tilted at a tilt angle $\xi$ ($\xi=1.83$) with respect to the display surface SF in a counterclockwise direction. The aperture stop S in the present example is shifted to the upper side of FIGS. 1A and 1B by +0.66 millimeters (mm) with reference to the rear-group optical axis.

The entire projection lens system that includes the front group G1 and the rear group G2 is shifted to the upper side of FIGS. 1A and 1B by +0.032 mm on a shared plane. In other words, the first example of the present disclosure falls under the third cases as described above.

FIG. 2 depicts the data of the projection lens system according to the first example of the present disclosure.

More specifically, FIG. 2 depicts the data of the lenses from the projection-plane side toward the display-surface (SF) side, and the items of data of these lenses are listed from top to bottom.

"TYPE" in the left column of the table of FIG. 2 indicates the type of optical surface of an element such as a projection plane, an aperture stop, a prism plane, a cover glass, and a display surface, and "SPHERICAL" indicates a spherical surface. Moreover, R indicates the radius of curvature of an optical surface, and d indicates the surface spacing with a neighboring optical surface.

Figure 3A:
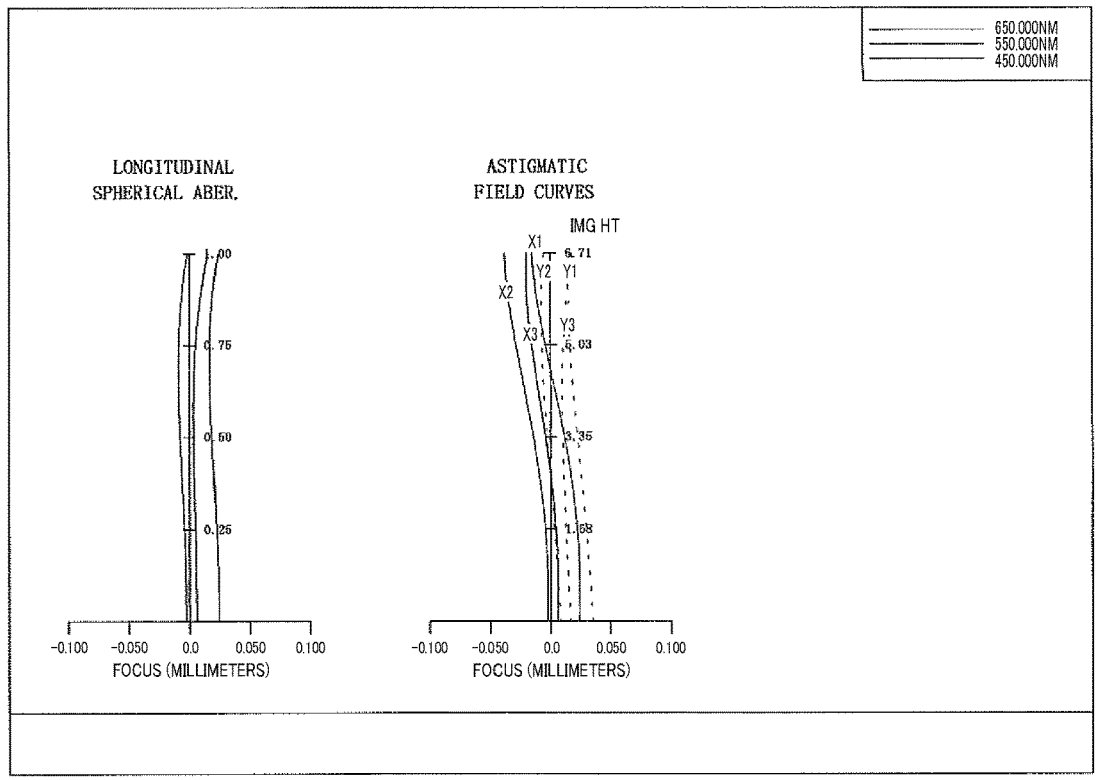
FIG. 3A and FIG. 3B are diagrams illustrating the spherical aberration and astigmatism of a lens system according to the first example of the present disclosure and a control sample of the first example, respectively.
Figure 3B:
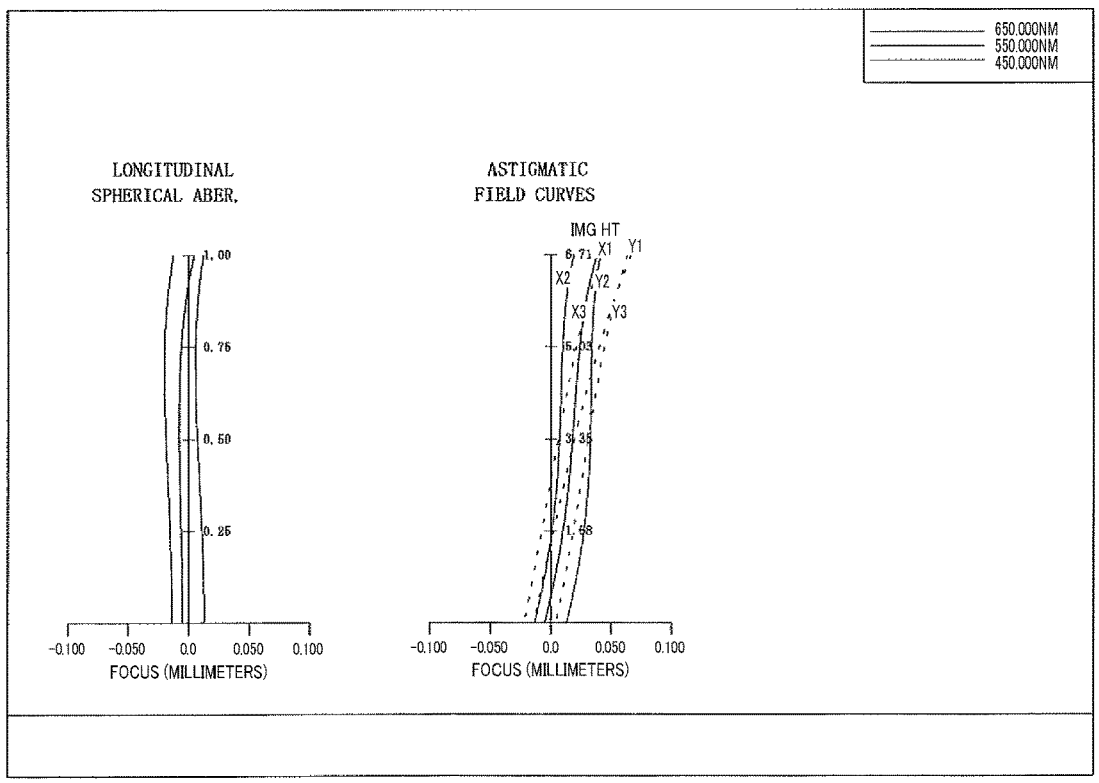

FIG. 3A and FIG. 3B are diagrams illustrating the spherical aberration and astigmatism of a lens system according to the first example of the present disclosure and a control sample of the first example, respectively.

In other words, FIG. 3A illustrates the aberrations in the first example of the present disclosure, and FIG. 3B illustrates the aberrations of a lens system according to the control sample of the first example of the present disclosure.

In the lens system according to the control sample of the first example of the present disclosure, the amount of shift Δ is zero compared with the first example. Moreover, the lens system according to the control sample of the first example of the present disclosure is in a tilt-reference state as described above with reference to FIG. 32B. The same applies to the other examples given below.

In the lens system according to the control sample of the first example of the present disclosure, the amount of shift Δ is zero. Due to such a configuration, the front group G1 and the rear group G2 have a common optical axis, and the tilt angle is equivalent to the tilt angle in the first example of the present disclosure.

As apparent from the comparison between the aberrations in the first example of the present disclosure as illustrated in FIG. 3A and the aberrations of a lens system according to the control sample of the first example of the present disclosure as illustrated in FIG. 3B, the performance that relates to the spherical aberration and astigmatism is substantially equivalent to each other between the first example of the present disclosure and the control sample of the first example.

Figure 4A:
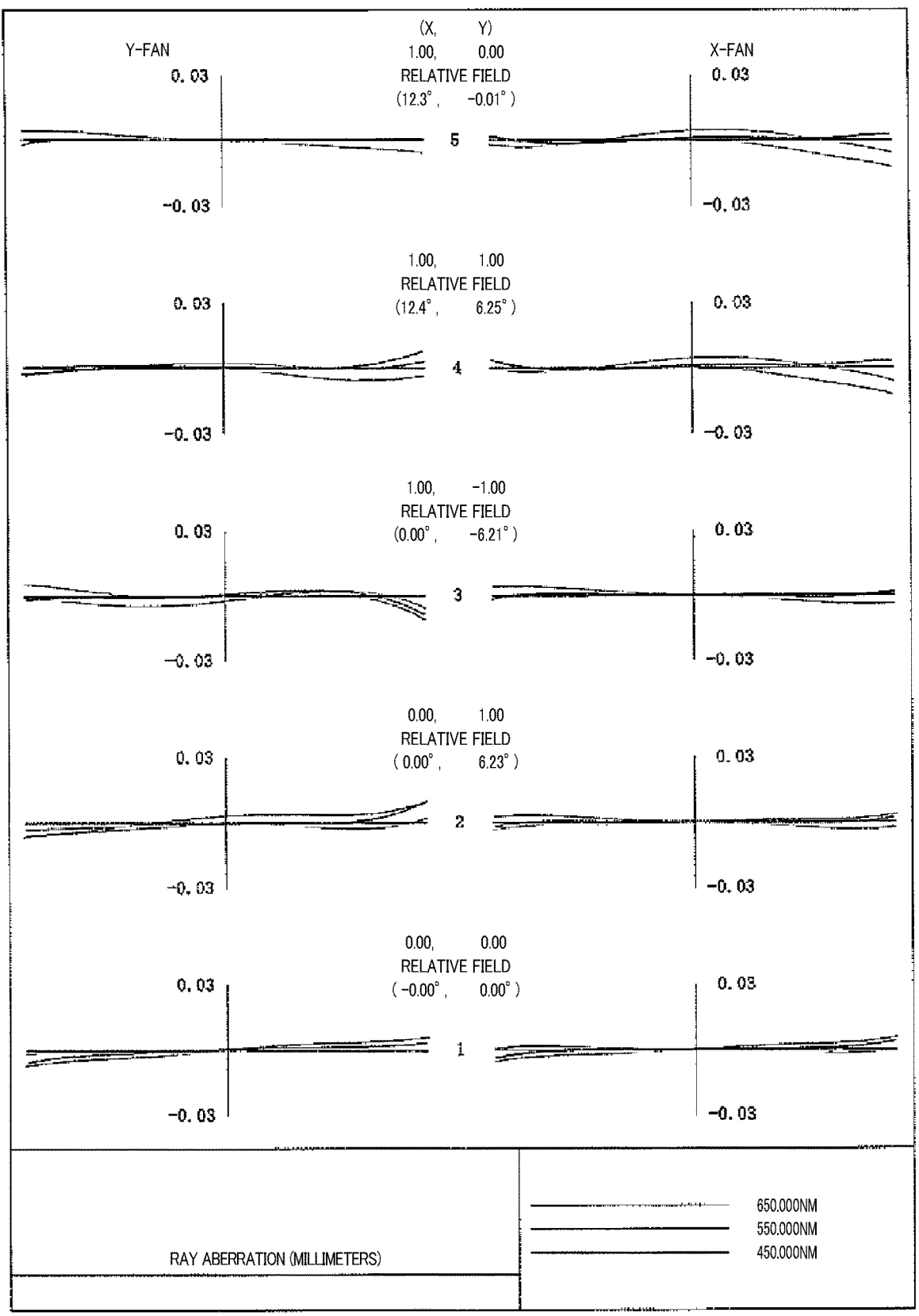
FIG. 4A and FIG. 4B are diagrams each illustrating the lateral aberrations of a lens system according to the first example of the present disclosure.
Figure 4B:
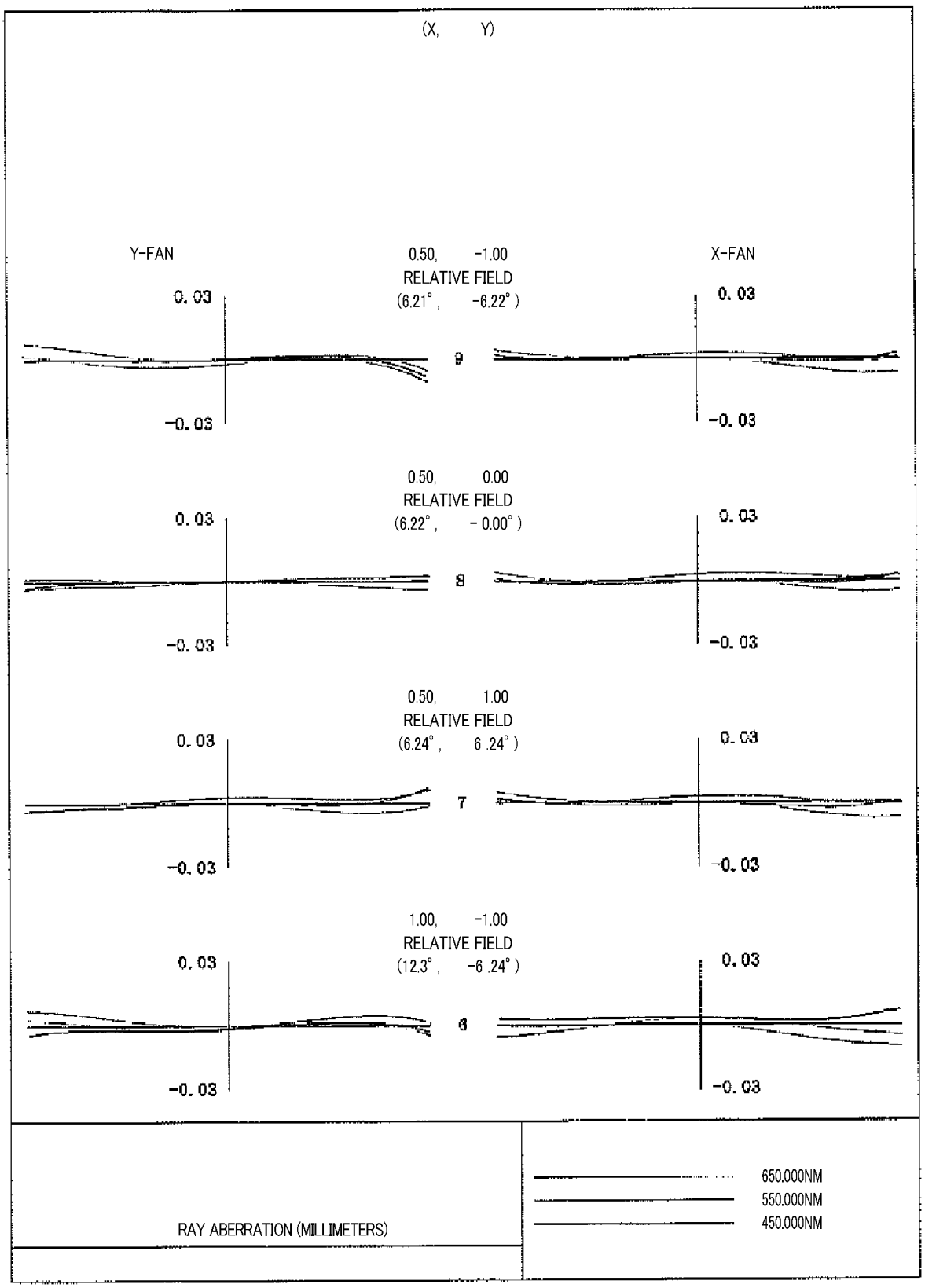

FIG. 4A and FIG. 4B are diagrams illustrating the ray aberrations of a lens system according to the first example of the present disclosure.

Figure 5A:
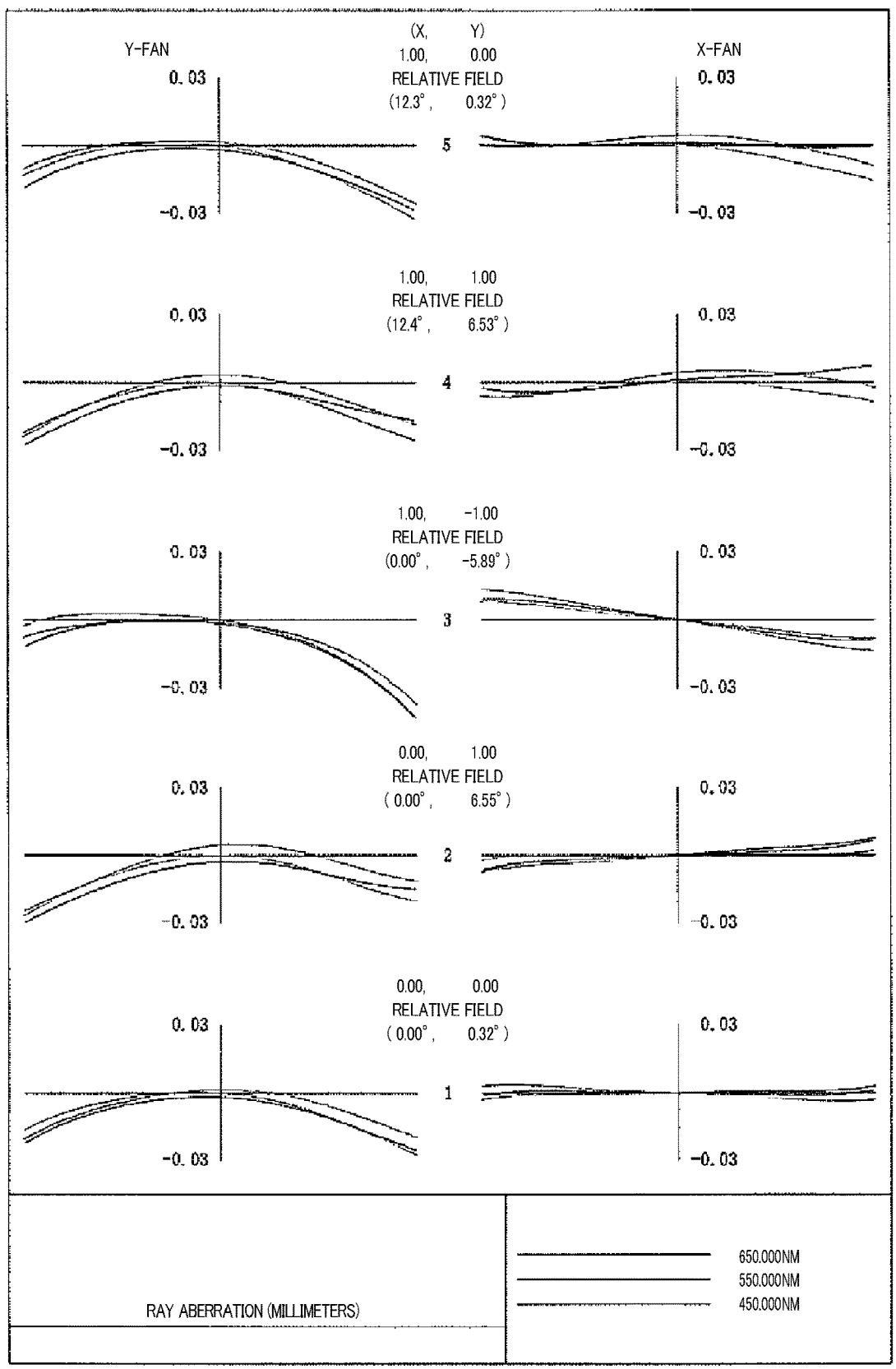
FIG. 5A and FIG. 5B are diagrams each illustrating the lateral aberrations of a lens system according to a control sample of the first example of the present disclosure.
Figure 5B:
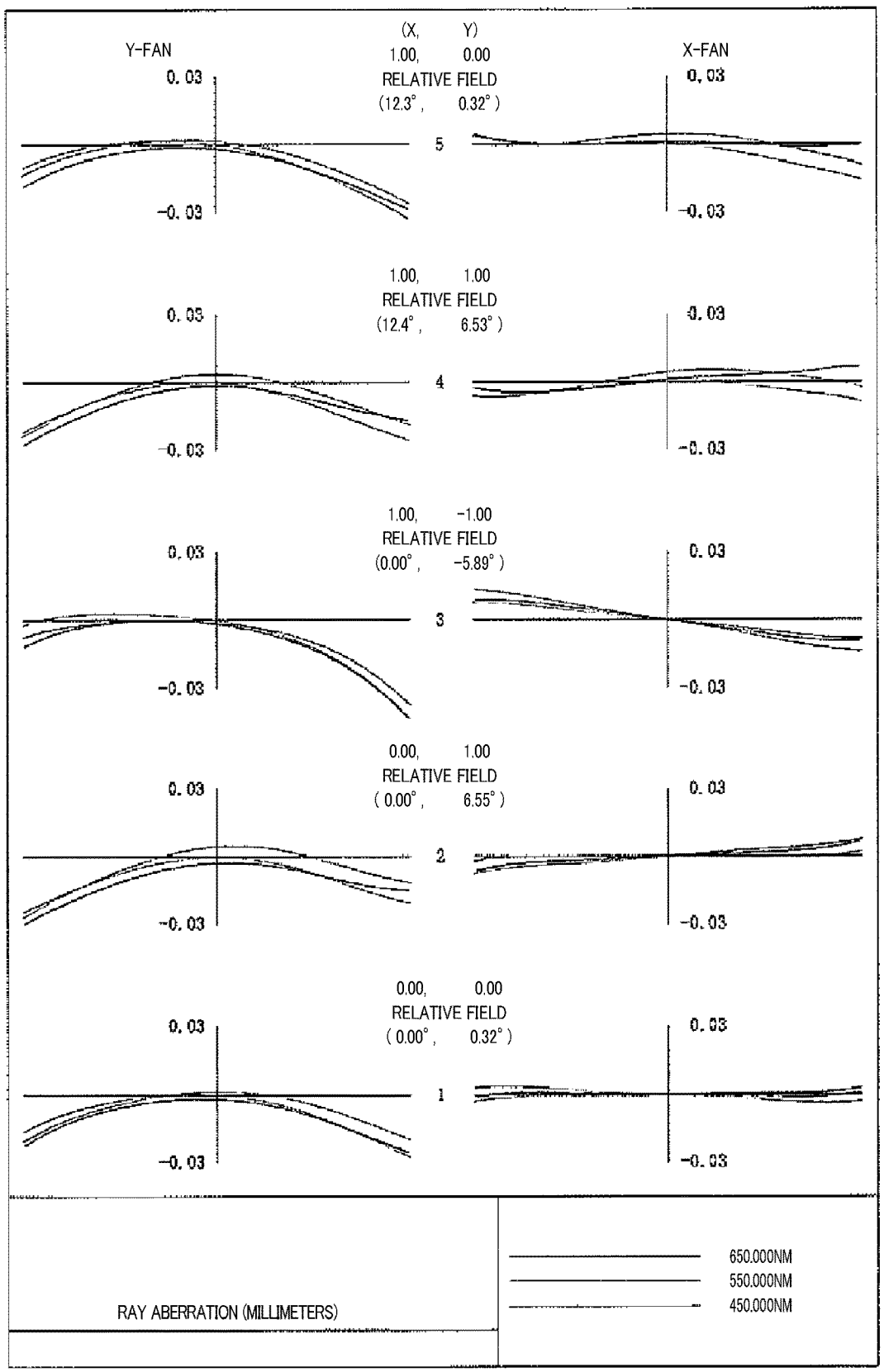

FIG. 5A and FIG. 5B are diagrams each illustrating the lateral aberrations of a lens system according to a control sample of the first example of the present disclosure.

As is apparent from the comparison of the lateral aberration in FIG. 4A and FIG. 4B with the lateral aberration in FIG. 5A and FIG. 5B, coma aberrations in the projection lens system according to the first example of the present disclosure are effectively reduced and improved in compared with the lens system according to the control sample of the first example of the present disclosure.

As described above, in the first example of the present disclosure, the tilt angle $\xi$ of the optical axis of the rear group G2 with respect to the display surface SF is 1.83 degrees.

The tilt angle $\xi s$ at which the lens system according to the control sample of the first example of the present disclosure satisfies the Scheimpflug principle can be obtained as follows. As the tilt angle $\theta B$ of the screen is 27 degrees and the image-forming magnification power m is 11.702, these values are applied to the above-mentioned equation given below. $\theta A = \arctan\{(\tan \theta B)/m\}$ As a result, the tilt angle $\xi s$ is obtained as follows.

$\theta A = \xi s = 2.493$

Accordingly, the parameter $\xi/\xi s$ in the first conditional expression is determined as follows.

$1.83/2.493 = 0.74$

Second Example

Figure 6:
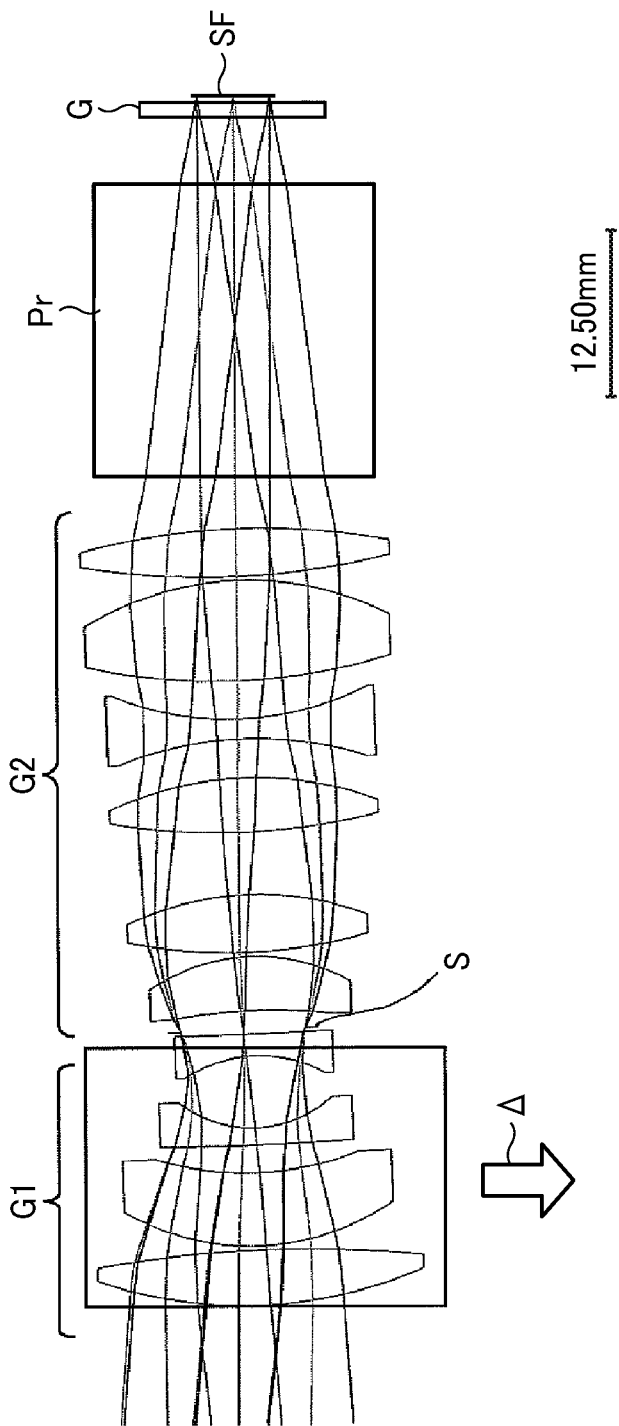
FIG. 6 is a diagram illustrating a lens configuration of a projection lens system according to a second example of the present disclosure.

FIG. 6 is a diagram illustrating the configuration or structure of a projection lens system on a shared plane, according to a second example of the present disclosure, in a similar manner to FIGS. 1A and 1B. For purposes of simplification, like reference signs are given to elements similar to those illustrated in FIGS. 1A and 1B as long as no confusion is expected.

The prism Pr is a rectangular prism, and the object-light incident plane of the prism that faces the display surface SF faces the display surface SF and is parallel to the display surface SF.

The front group G1 includes four lenses of a double-convex lens, a positive meniscus lens, a negative meniscus lens, and a double-concave lens that are arranged in this order listed from the projection-plane side toward the display-surface side, and has a negative refractive power. The front group G1 as a whole in the present example is shifted by +0.12 mm (=amount of shift Δ) to the lower side of FIG. 6 in a direction perpendicular to the front-group optical axis.

The rear group G2 includes six lenses of a positive meniscus lens, a double-convex lens, a double-convex lens, a double-concave lens, a double-convex lens, and a double-convex lens that are arranged in this order listed from the projection-plane side toward the display-surface side, and has a positive refractive power.

The aperture stop S is arranged between the front group G1 and the rear group G2 such that the front group G1 and the rear group G2 are separated from each other.

The optical axis of the rear group G2 is tilted at a tilt angle $\xi$ ($\xi = 2.01$) with respect to the display surface SF in a counterclockwise direction. The aperture stop S in the present example is shifted to the upper side of FIG. 6 by +0.74 mm with reference to the rear-group optical axis.

In other words, the second example of the present disclosure also falls under the third cases as described above.

FIG. 7 depicts the data of the projection lens system according to the second example of the present disclosure, in a similar manner to FIG. 2.

Figure 8A:
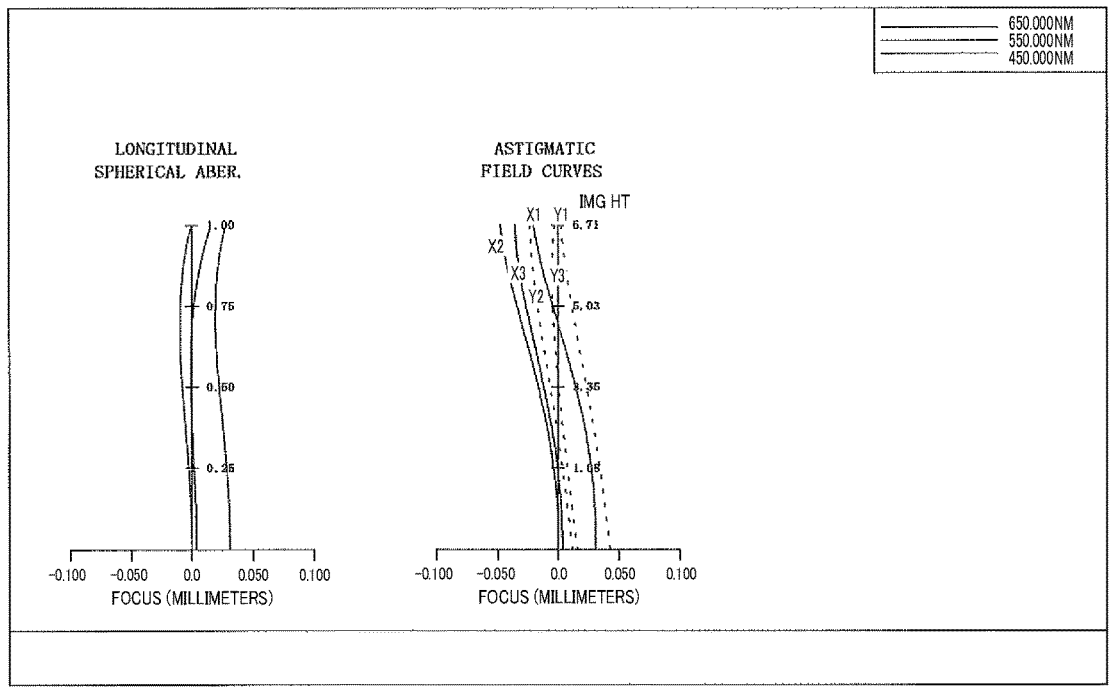
FIG. 8A and FIG. 8B are diagrams illustrating the spherical aberration and astigmatism of a lens system according to the second example of the present disclosure and a control sample of the second example, respectively.
Figure 8B:
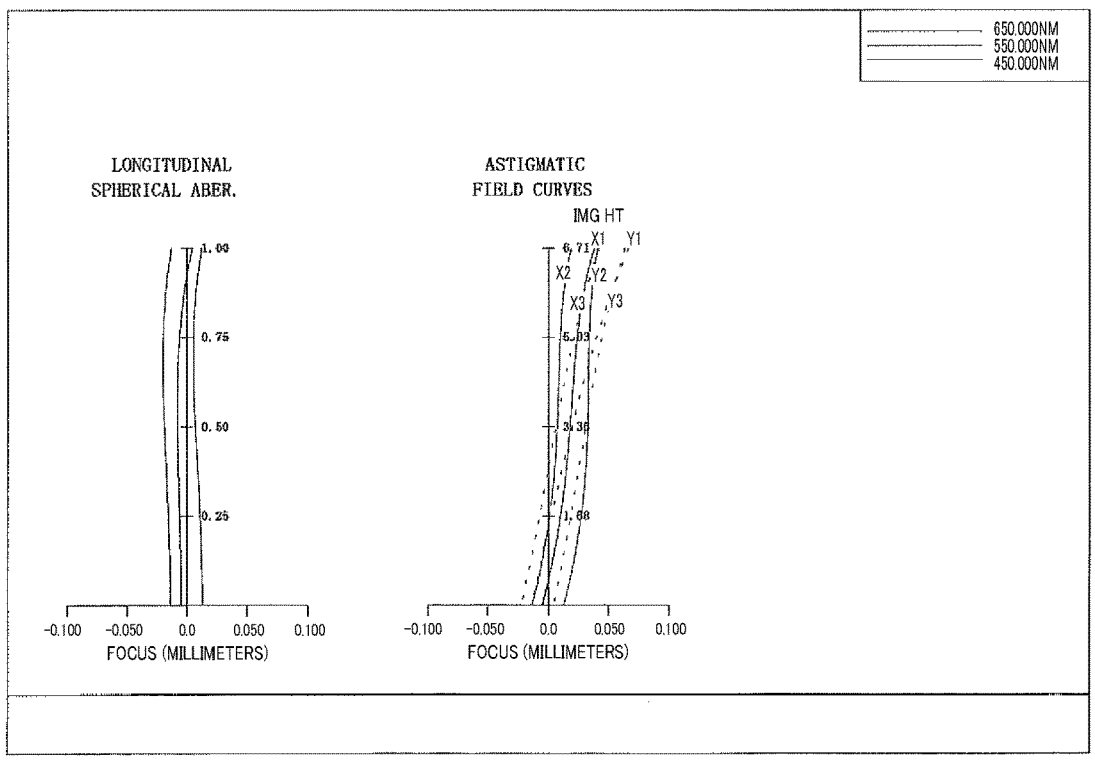

FIG. 8A and FIG. 8B are diagrams illustrating the spherical aberration and astigmatism of a lens system according to the second example of the present disclosure and a control sample of the second example, respectively.

In other words, FIG. 8A illustrates the aberrations in the second example of the present disclosure, and FIG. 8B illustrates the aberrations of a lens system according to the control sample of the second example of the present disclosure.

The amount of tilt of a common optical axis AXC of the front group G1 and the rear group G2 in the lens system according to the control sample of the second example of the present disclosure is equivalent to the amount of tilt in the first example of the present disclosure.

As apparent from the comparison between the aberrations in the second example of the present disclosure as illustrated in FIG. 8A and the aberrations of a lens system according to the control sample of the second example of the present disclosure as illustrated in FIG. 8B, the performance that relates to the spherical aberration and astigmatism is substantially equivalent to each other between the second example of the present disclosure and the control sample of the second example.

Figure 9A:
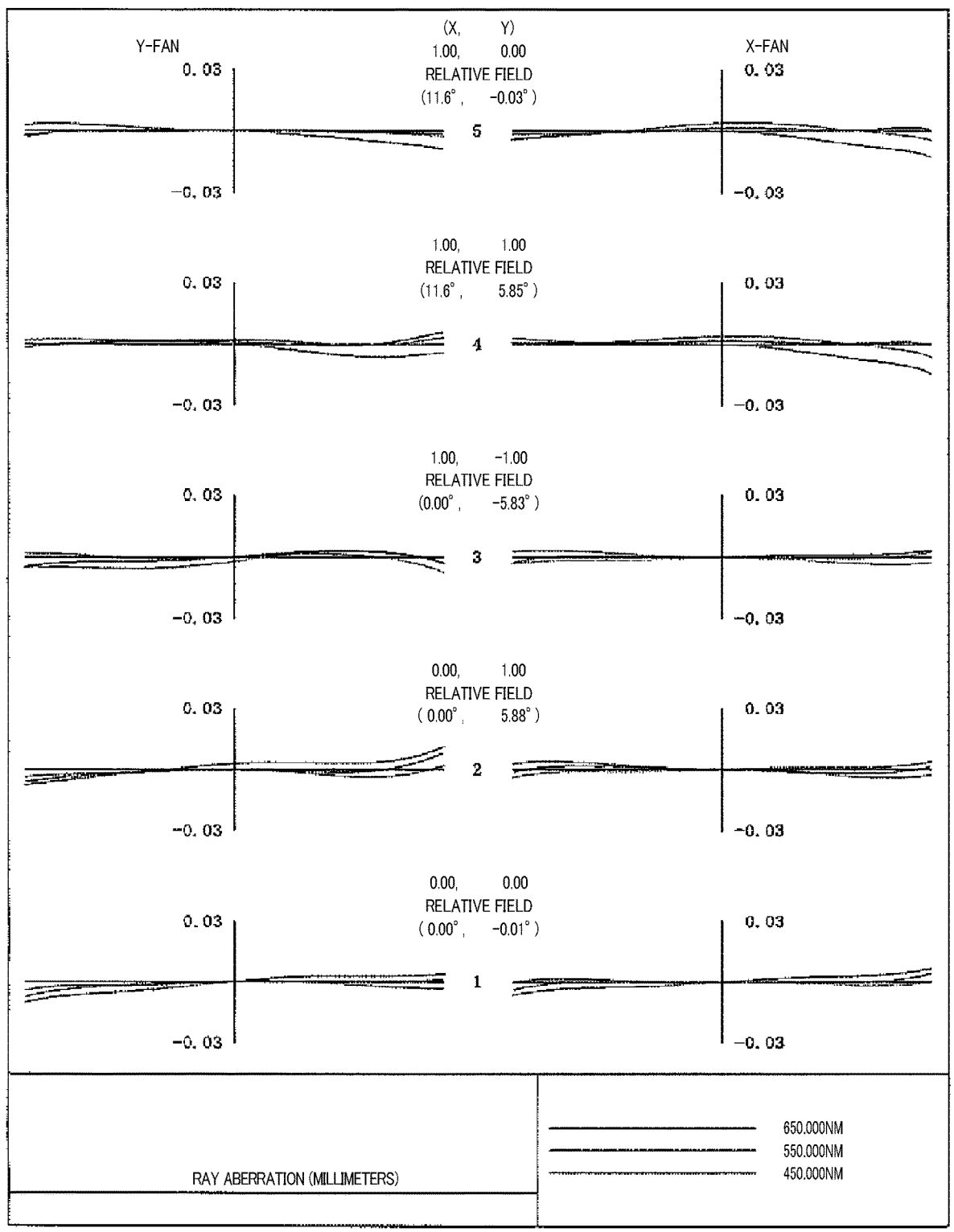
FIG. 9A and FIG. 9B are diagrams each illustrating the lateral aberrations of a lens system according to the second example of the present disclosure.
Figure 9B:
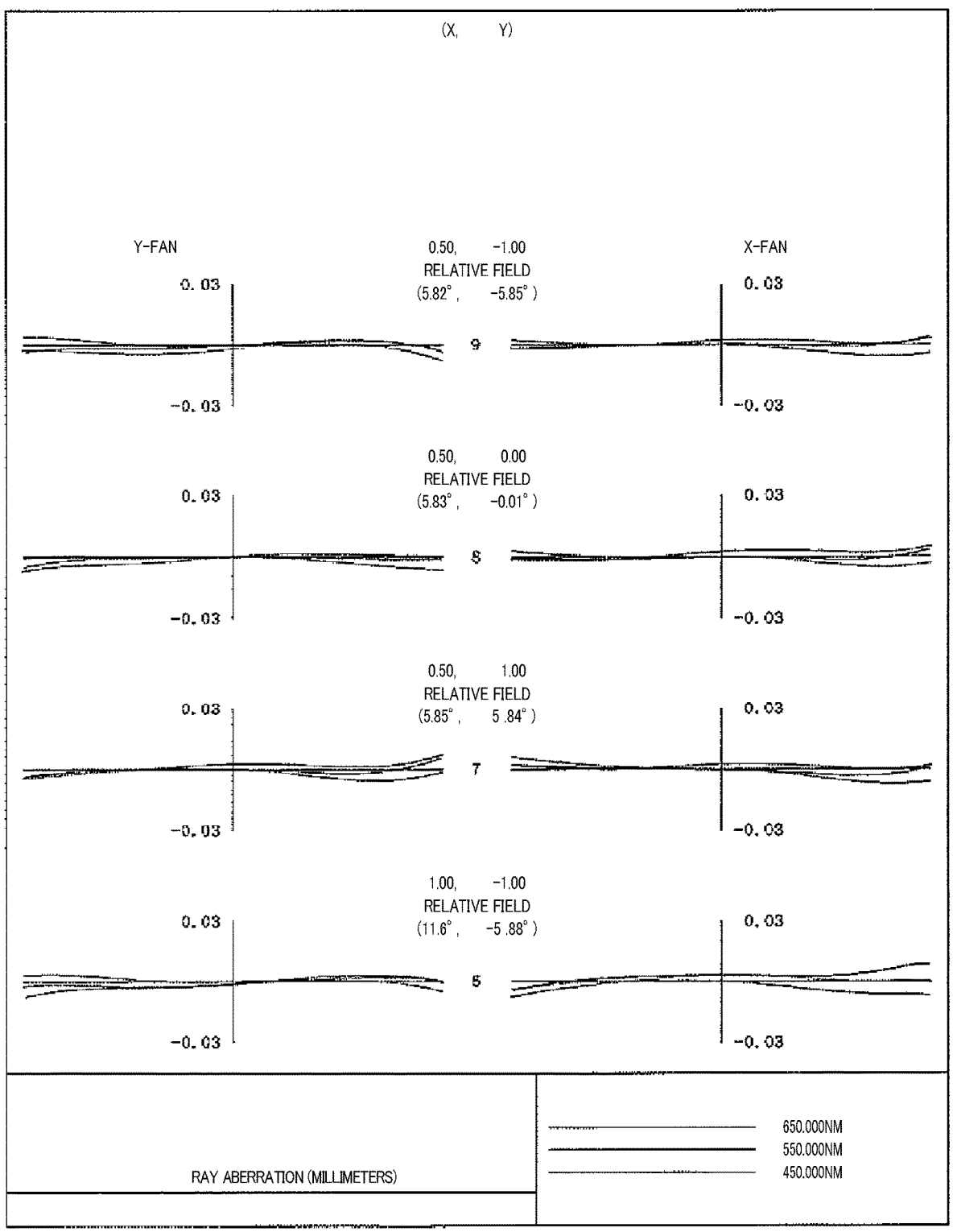

FIG. 9A and FIG. 9B are diagrams illustrating the ray aberrations of a lens system according to the second example of the present disclosure.

Figure 10A:
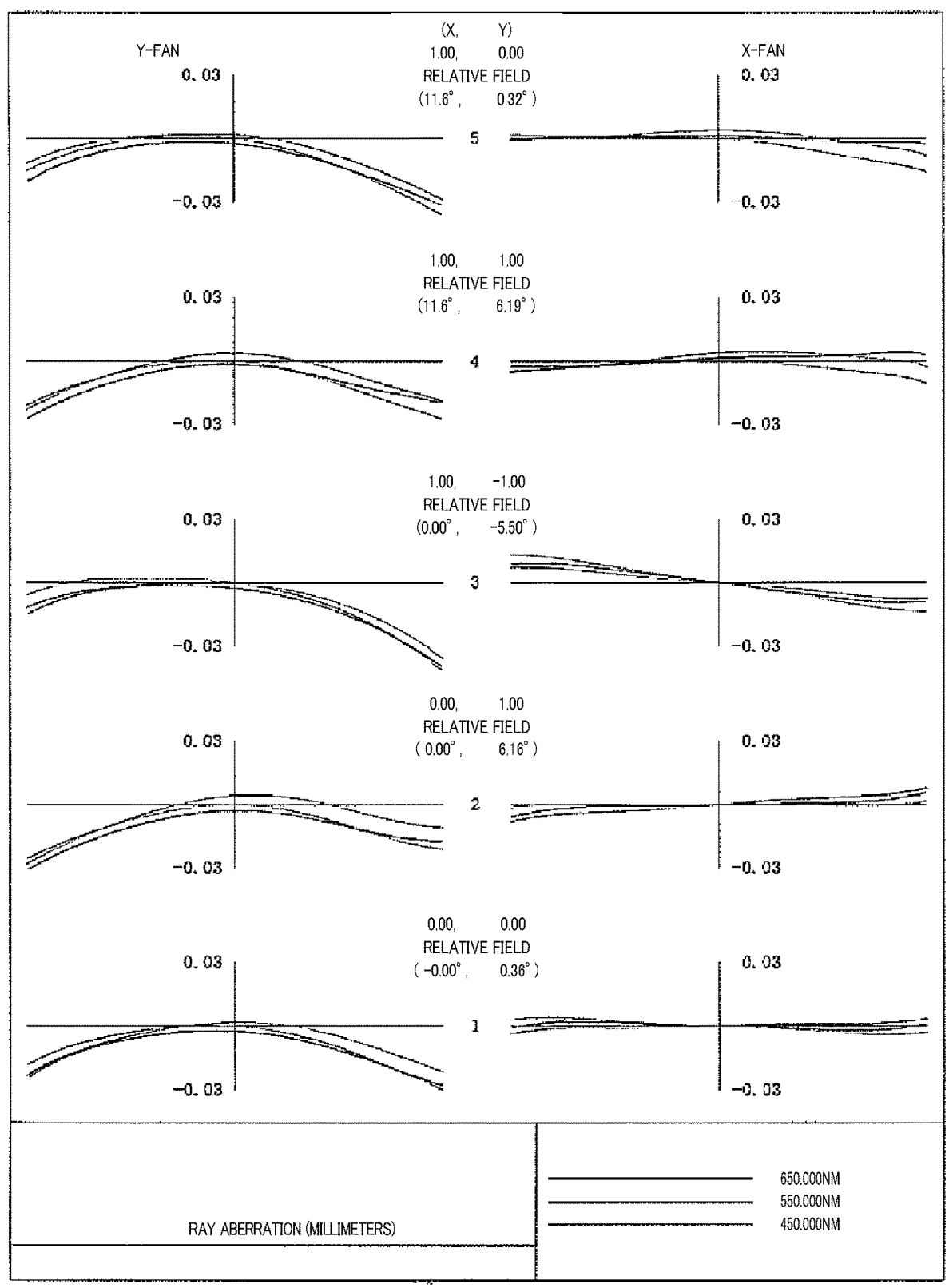
FIG. 10A and FIG. 10B are diagrams each illustrating the lateral aberrations of a lens system according to a control sample of the second example of the present disclosure.
Figure 10B:
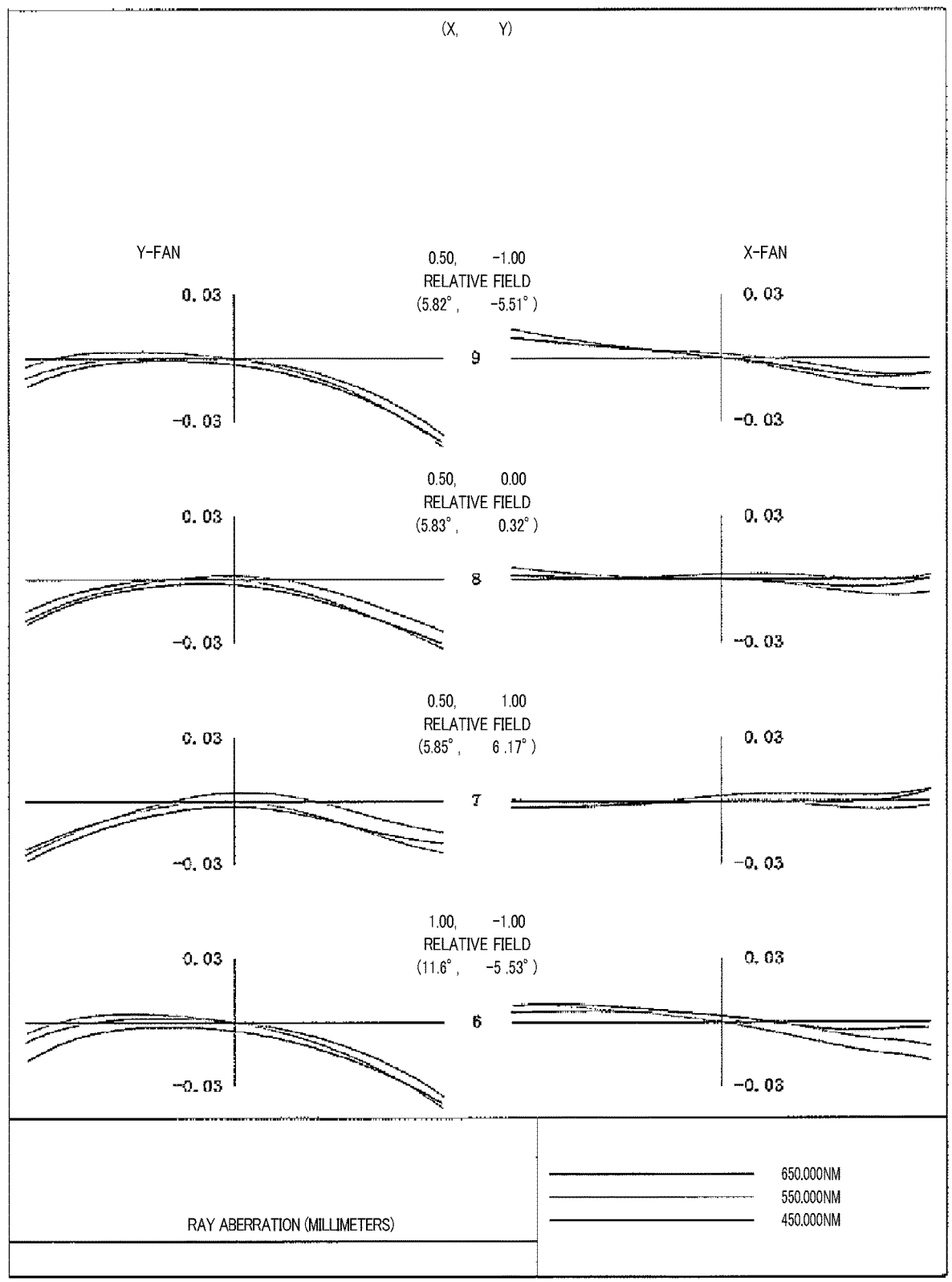

FIG. 10A and FIG. 10B are diagrams each illustrating the lateral aberrations of a lens system according to a control sample of the second example of the present disclosure.

As is apparent from the comparison of the lateral aberration in FIG. 9A and FIG. 9B with the lateral aberration in FIG. 10A and FIG. 10B, coma aberrations in the projection lens system according to the second example of the present disclosure are effectively reduced and improved compared with the lens system according to the control sample of the first example of the present disclosure.

As described above, in the second example of the present disclosure, the tilt angle $\xi$ of the optical axis of the rear group G2 with respect to the display surface SF is 2.01 degrees.

The tilt angle $\xi s$ at which the lens system according to the control sample of the first example of the present disclosure satisfies the Scheimpflug principle can be obtained as follows. The tilt angle $\theta B$ of the screen is 27 degrees, and the image-forming magnification power m is 10.969. As a result, the tilt angle $\xi s$ is obtained as follows.

$\theta A = \xi s = 2.660$

Accordingly, the parameter $\xi/\xi s$ in the first conditional expression is determined as follows.

$2.01/2.660 = 0.76$

Third Example

Figure 11:
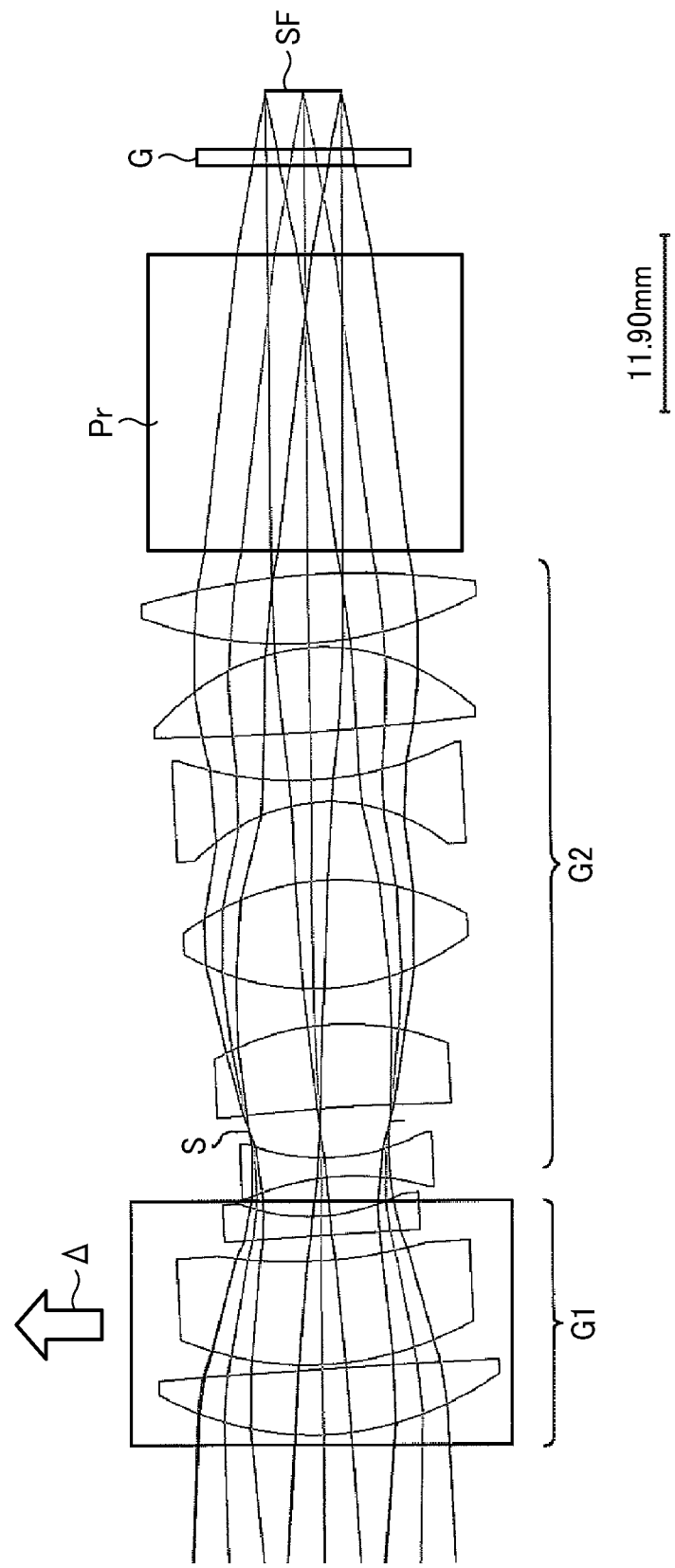
FIG. 11 is a diagram illustrating a lens configuration of a projection lens system according to a third example of the present disclosure.

FIG. 11 is a diagram illustrating the configuration or structure of a projection lens system on a shared plane, according to a third example of the present disclosure.

The prism Pr is a rectangular prism, and the object-light incident plane of the prism that faces the display surface SF faces the display surface SF and is parallel to the display surface SF.

The front group G1 includes three lenses of a double-convex lens, a positive meniscus lens, and a double-concave lens that are arranged in this order listed from the projection-plane side toward the display-surface side, and has a positive refractive power. The front group G1 as a whole in the present example is shifted by +1.46 mm (=amount of shift Δ) to the upper side of FIG. 11 in a direction perpendicular to the front-group optical axis.

The rear group G2 includes six lenses of a double-concave lens, a positive meniscus lens, a double-convex lens, another double-concave lens, another double-convex lens, and another double-convex lens that are arranged in this order listed from the projection-plane side toward the display-surface side, and has a positive refractive power. The aperture stop S is arranged between the first double-concave lens and the first positive meniscus lens.

The optical axis of the rear group G2 is tilted at a tilt angle $\xi$ ($\xi$=3.00) with respect to the display surface SF in a counterclockwise direction. The aperture stop S in the present example is shifted to the upper side of FIG. 11 by +1.28 mm with reference to the rear-group optical axis.

In other words, the third example of the present disclosure falls under the first cases as described above.

FIG. 12 depicts the data of the projection lens system according to the third example of the present disclosure, in a similar manner to FIG. 2.

Figure 13A:
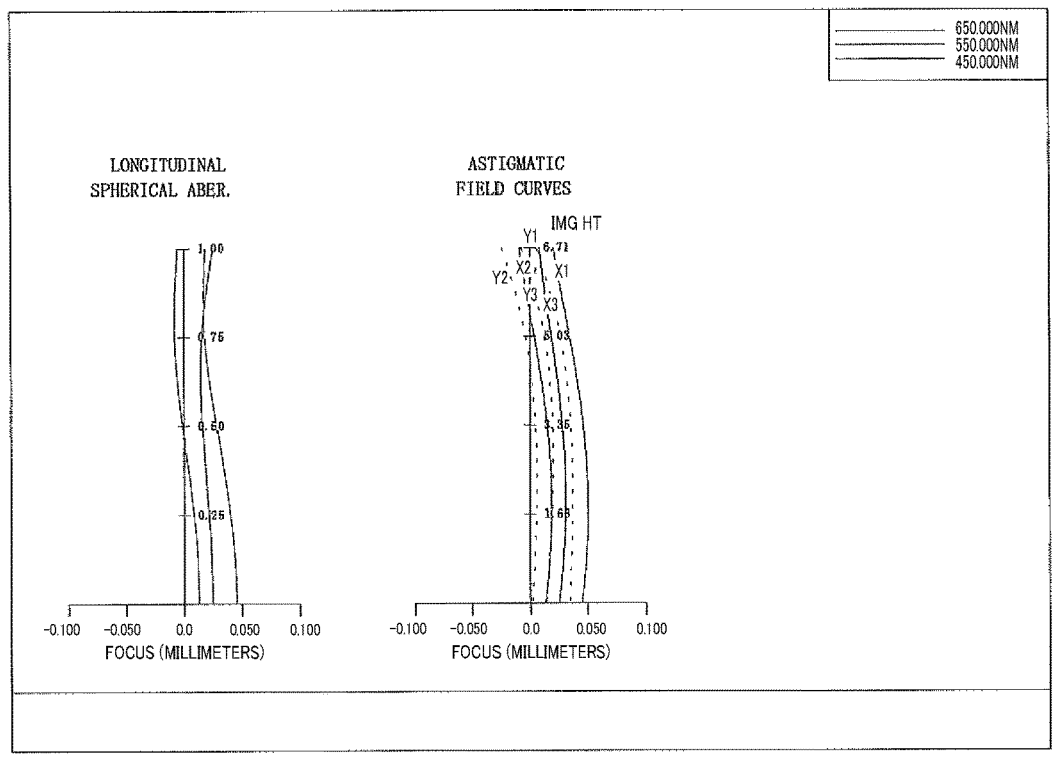
FIG. 13A and FIG. 13B are diagrams illustrating the spherical aberration and astigmatism of a lens system according to the third example of the present disclosure and a control sample of the third example, respectively.
Figure 13B:
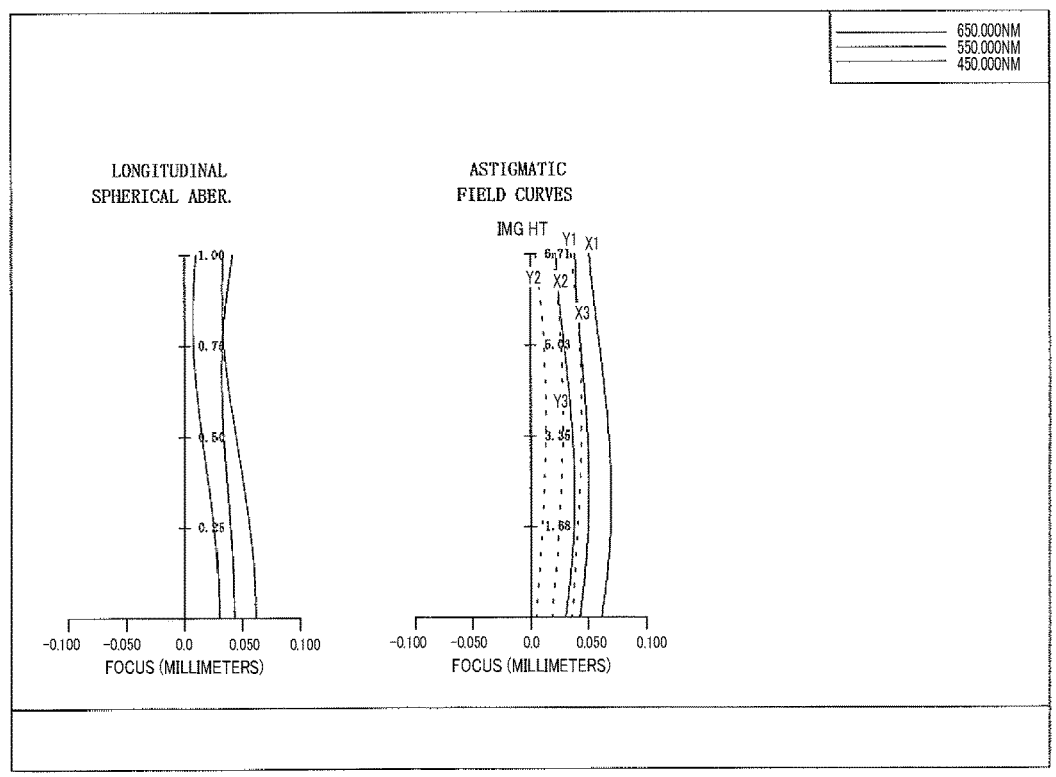

FIG. 13A and FIG. 13B are diagrams illustrating the spherical aberration and astigmatism of a lens system according to the third example of the present disclosure and a control sample of the third example, respectively.

In other words, FIG. 13A illustrates the aberrations in the third example of the present disclosure, and FIG. 13B illustrates the aberrations of a lens system according to the control sample of the third example of the present disclosure.

The amount of tilt in the lens system according to the control sample of the third example of the present disclosure is equivalent to the amount of tilt in the third example of the present disclosure.

As apparent from the comparison between the aberrations in the third example of the present disclosure as illustrated in FIG. 13A and the aberrations of a lens system according to the control sample of the third example of the present disclosure as illustrated in FIG. 13B, the performance that relates to the spherical aberration and astigmatism is substantially equivalent to each other between the third example of the present disclosure and the control sample of the third example.

Figure 14A:
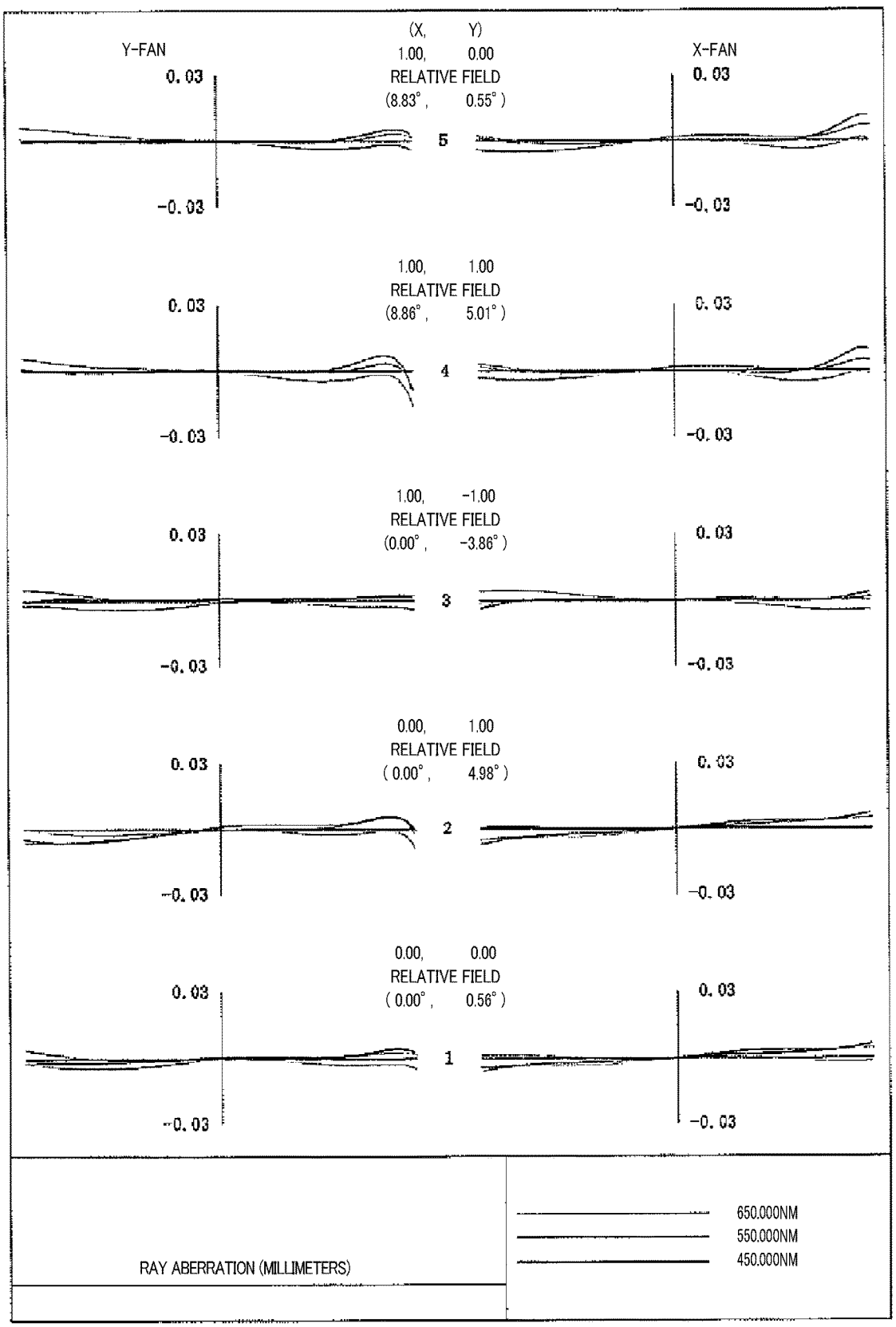
FIG. 14A and FIG. 14B are diagrams each illustrating the lateral aberrations of a lens system according to the third example of the present disclosure.
Figure 14B:
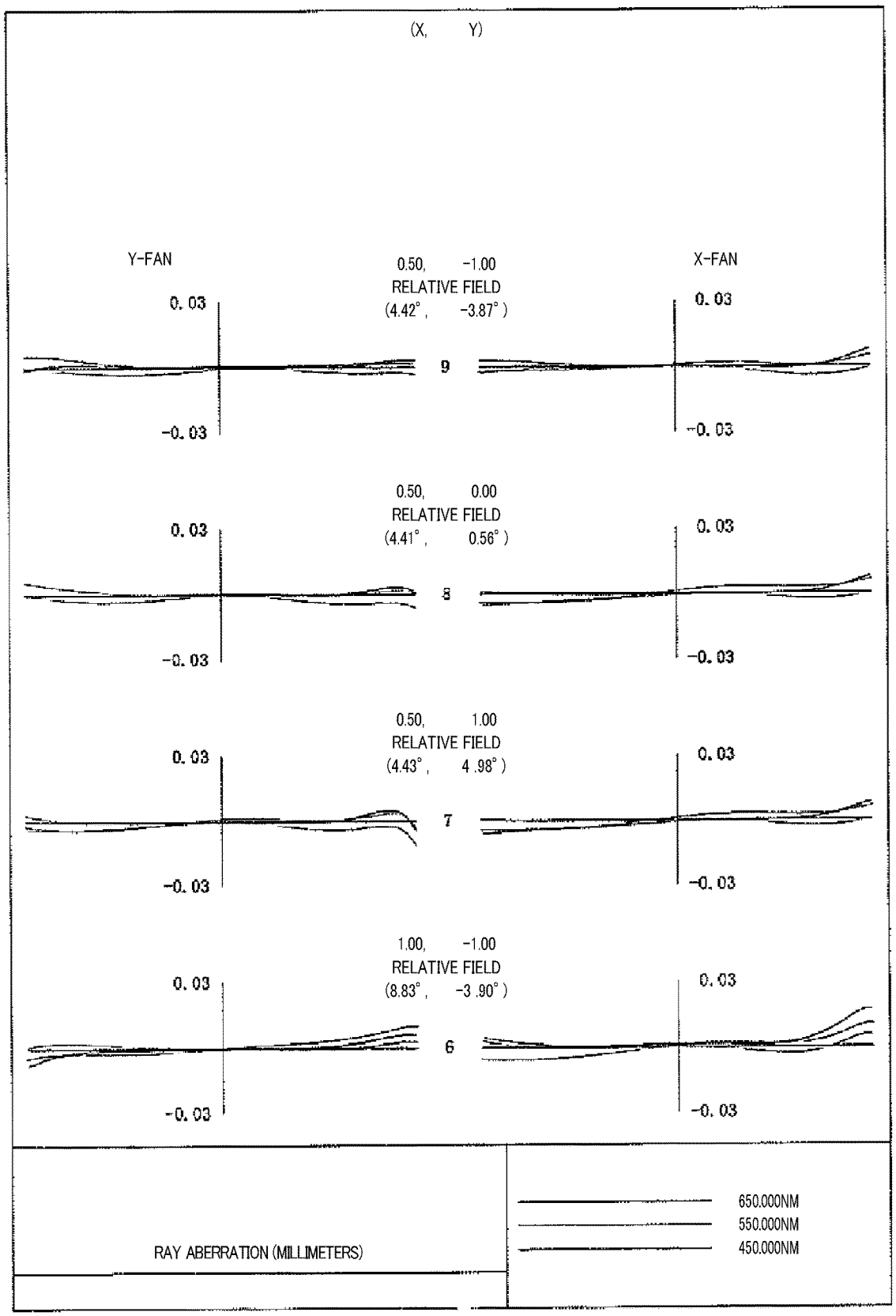
Figure 15A:
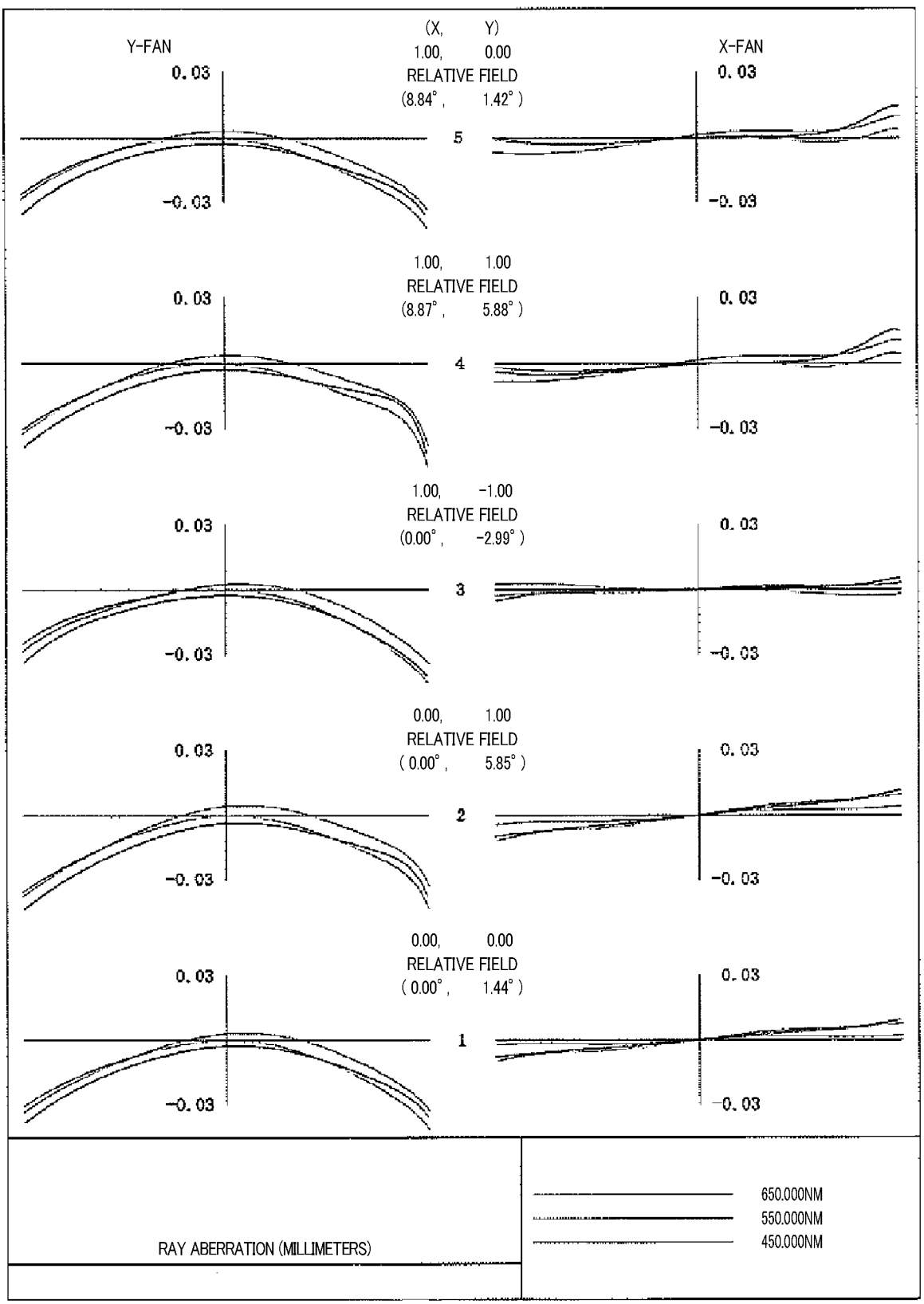
FIG. 15A and FIG. 15B are diagrams each illustrating the lateral aberrations of a lens system according to a control sample of the third example of the present disclosure.
Figure 15B:
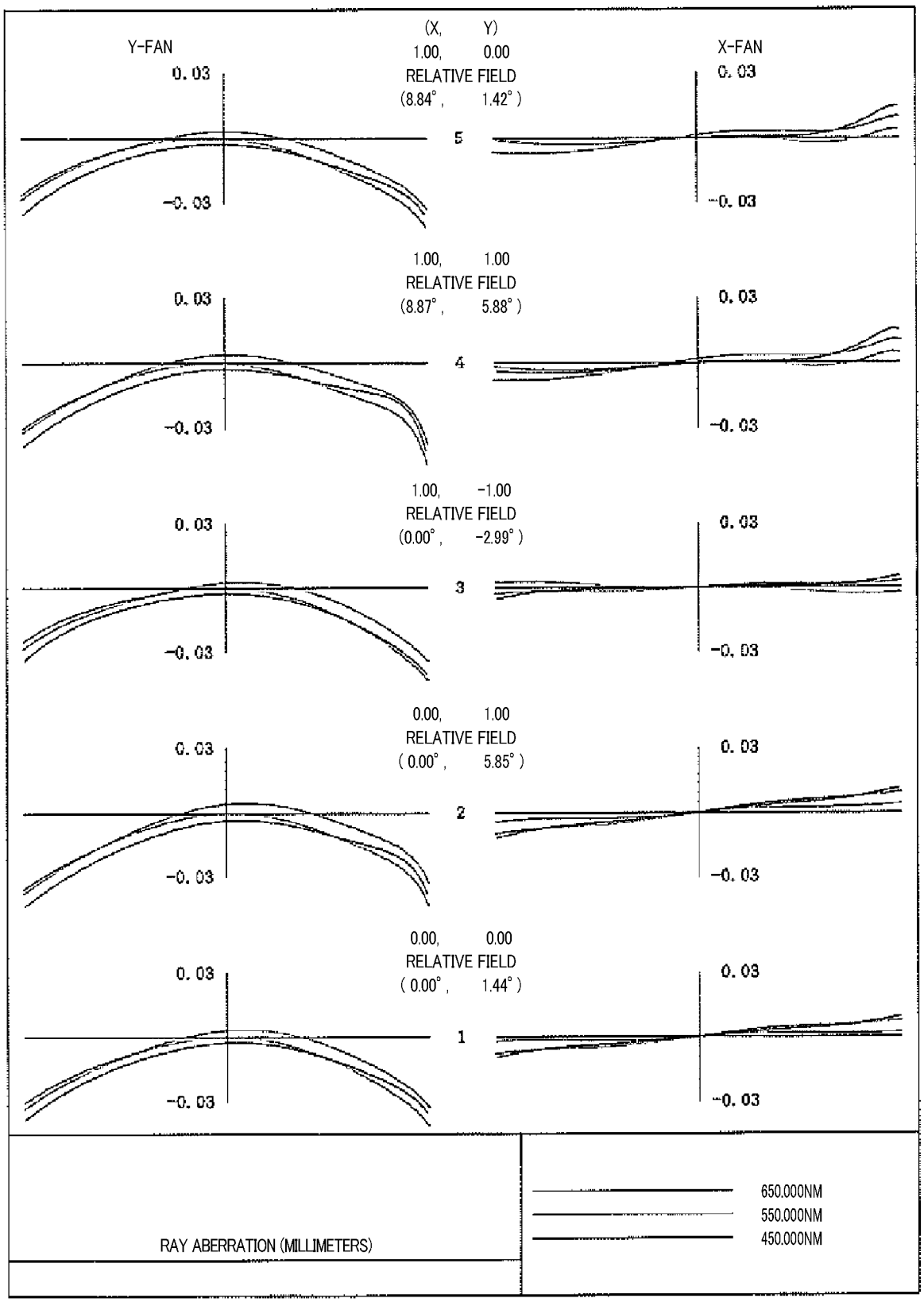

FIG. 14A and FIG. 14B are diagrams illustrating the ray aberrations of a lens system according to the third example of the present disclosure. FIG. 15A and FIG. 15B are diagrams each illustrating the lateral aberrations of a lens system according to a control sample of the third example of the present disclosure.

As is apparent from the comparison of the lateral aberration in FIG. 14A and FIG. 14B with the lateral aberration in FIG. 15A and FIG. 15B, coma aberrations in the projection lens system according to the third example of the present disclosure are effectively reduced and improved compared with the lens system according to the control sample of the third example of the present disclosure.

As described above, in the third example of the present disclosure, the tilt angle $\xi$ of the optical axis of the rear group G2 with respect to the display surface SF is 3.00 degrees.

The tilt angle $\xi s$ at which the lens system according to the control sample of the first example of the present disclosure satisfies the Scheimpflug principle can be obtained as follows. The tilt angle θB of the screen is 27 degrees, and the image-forming magnification power m is 8.193. As a result, the tilt angle $\xi s$ is obtained as follows.

$$\theta A = \xi s = 3.559$$

Accordingly, the parameter $\xi/\xi s$ in the first conditional expression is determined as follows.

$$3.00/3.559 = 0.84$$

Fourth Example

Figure 16:
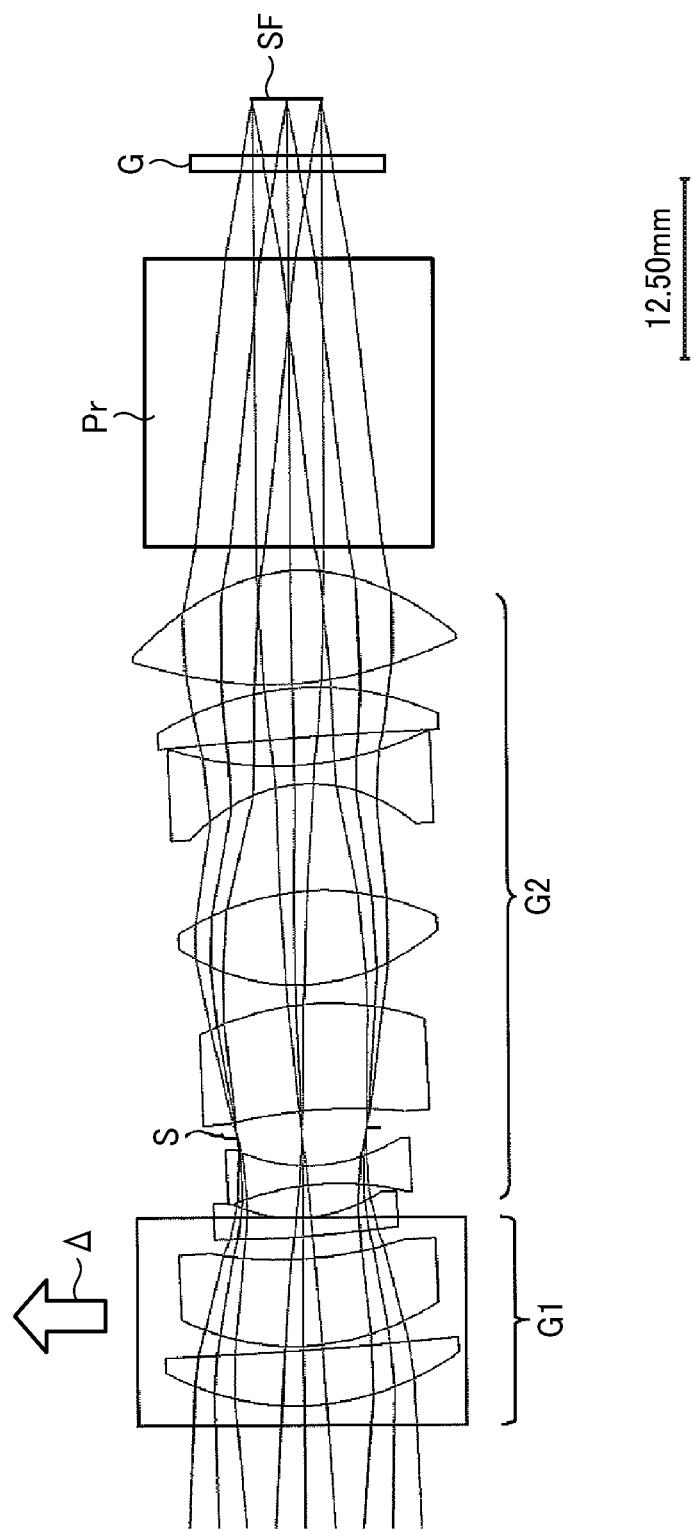
FIG. 16 is a diagram illustrating a lens configuration of a projection lens system according to a fourth example of the present disclosure.

FIG. 16 is a diagram illustrating the configuration or structure of a projection lens system on a shared plane, according to a fourth example of the present disclosure.

The prism Pr is a rectangular prism, and the object-light incident plane of the prism that faces the display surface SF faces the display surface SF and is parallel to the display surface SF.

The front group G1 includes three lenses of a positive meniscus lens, another positive meniscus lens and a negative meniscus lens that are arranged in this order listed from the projection-plane side toward the display-surface side, and has a positive refractive power. The front group G1 as a whole in the present example is shifted by +1.36 mm (=amount of shift Δ) to the upper side of FIG. 16 in a direction perpendicular to the front-group optical axis.

The rear group G2 includes six lenses of a double-concave lens, a positive meniscus lens, a double-convex lens, another double-concave lens, another positive meniscus lens, and another double-convex lens that are arranged in this order listed from the projection-plane side toward the display-surface side, and has a positive refractive power. The aperture stop S is arranged between the first double-concave lens and the first positive meniscus lens.

The optical axis of the rear group G2 is tilted at a tilt angle $\xi$ ($\xi$=3.04) with respect to the display surface SF in a counterclockwise direction. The aperture stop S in the present example is shifted to the upper side of FIG. 16 by +1.35 mm with reference to the rear-group optical axis.

In other words, the fourth example of the present disclosure falls under the first cases as described above.

FIG. 17A and FIG. 17B depict the data of the projection lens system according to the fourth example of the present disclosure, in a similar manner to FIG. 2.

In the fourth example of the present disclosure, an aspherical surface is used. FIG. 17A depicts the data of the projection lens system according to the fourth example of the present disclosure, and FIG. 17B depicts the aspherical data of the projection lens system according to the fourth example of the present disclosure. An aspherical surface is expressed by the known equation given below. In this equation, z denotes the size of an aspherical surface, and c denotes a paraxial curvature. Moreover, r denotes the distance from the optical axis, and k denotes the conic constant of the aspherical surface. Further, α1, α2, α3, and α4 denote second-order, fourth-order, sixth-order, and eighth-order aspherical coefficients.

$$z = cr^2/[1+\sqrt{(1-(1+k)c^2r^2)}] + \alpha 1 \cdot r^2 + \alpha 2 \cdot r^4 + \alpha 3 \cdot r^6 + \alpha 4 \cdot r^8$$

In the data of the projection lens system as depicted in FIG. 17B, for example, "−4.547277E-06" indicates "−4.547277×10⁻⁶."

Figure 18A:
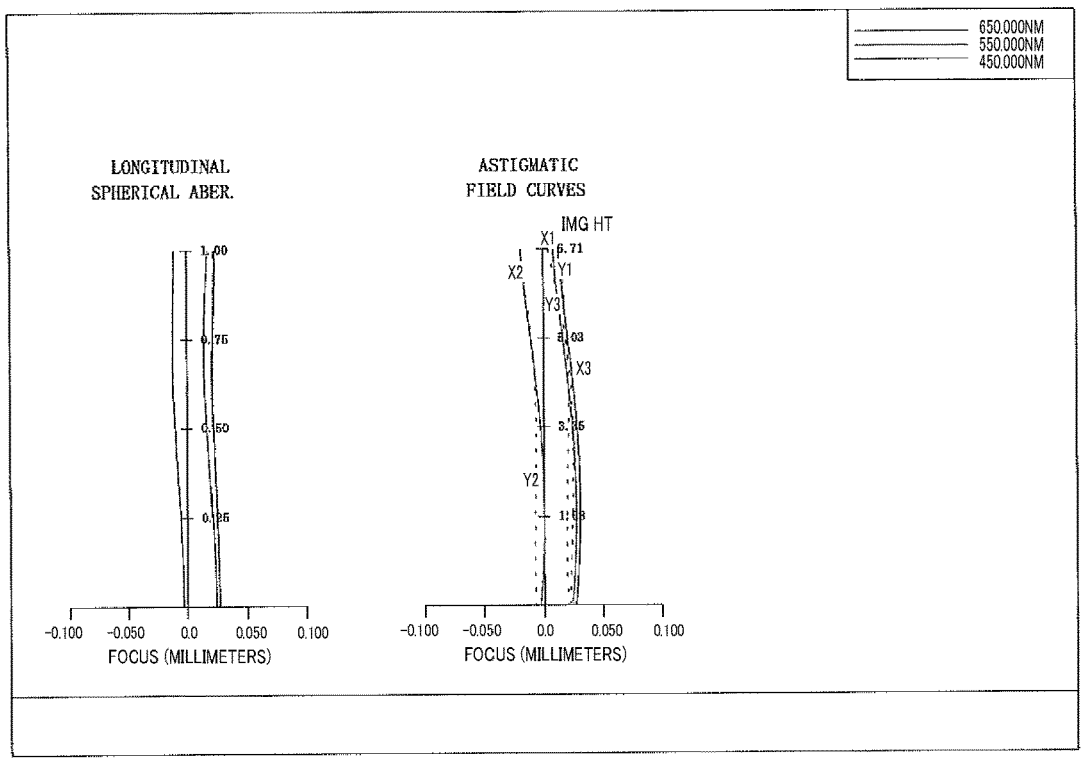
FIG. 18A and FIG. 18B are diagrams illustrating the spherical aberration and astigmatism of a lens system according to the fourth example of the present disclosure and a control sample of the fourth example, respectively.
Figure 18B:
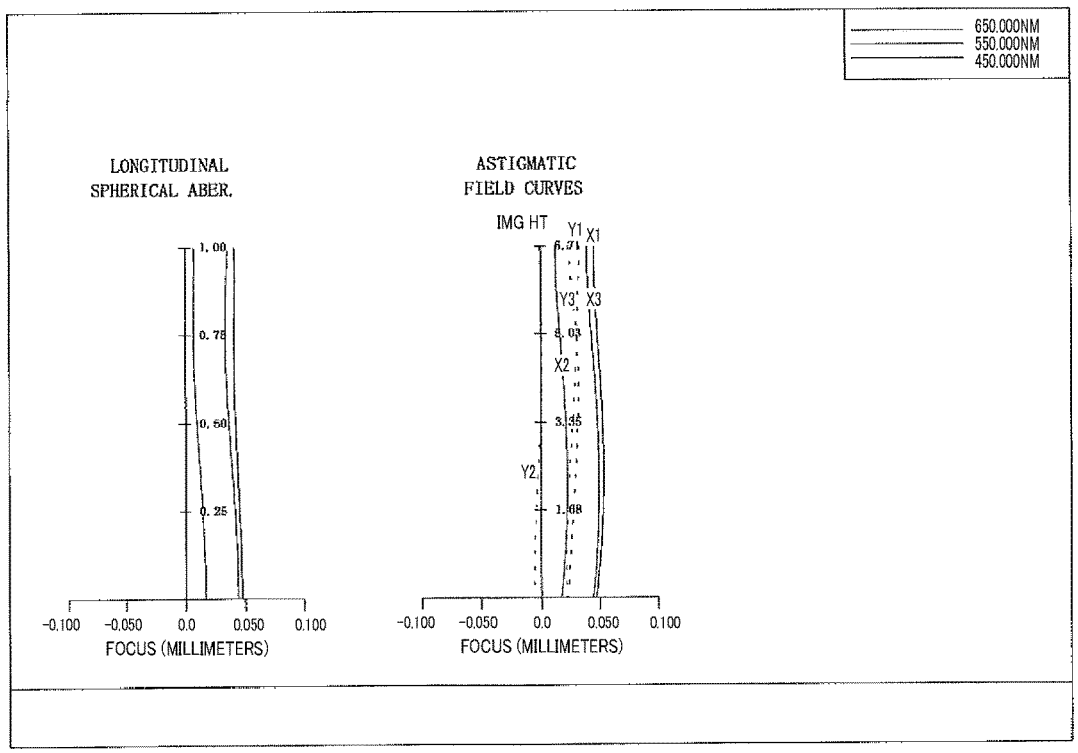

FIG. 18A and FIG. 18B are diagrams illustrating the spherical aberration and astigmatism of a lens system according to the fourth example of the present disclosure and a control sample of the fourth example, respectively.

In other words, FIG. 18A illustrates the aberrations in the fourth example of the present disclosure, and FIG. 18B illustrates the aberrations of a lens system according to the control sample of the fourth example of the present disclosure.

In the lens system according to the control sample of the fourth example of the present disclosure, the data of the projection lens system is equivalent to the data of the projection lens system according to the fourth example of the present disclosure. Moreover, the amount of shift Δ in the front group G1 is zero, and the amount of tilt is equivalent to the amount of tilt in the fourth example of the present disclosure.

As apparent from the comparison between the aberrations in the fourth example of the present disclosure as illustrated in FIG. 18A and the aberrations of a lens system according to the control sample of the fourth example of the present disclosure as illustrated in FIG. 18B, the performance that relates to the spherical aberration and astigmatism is substantially equivalent to each other between the fourth example of the present disclosure and the control sample of the fourth example.

Figure 19A:
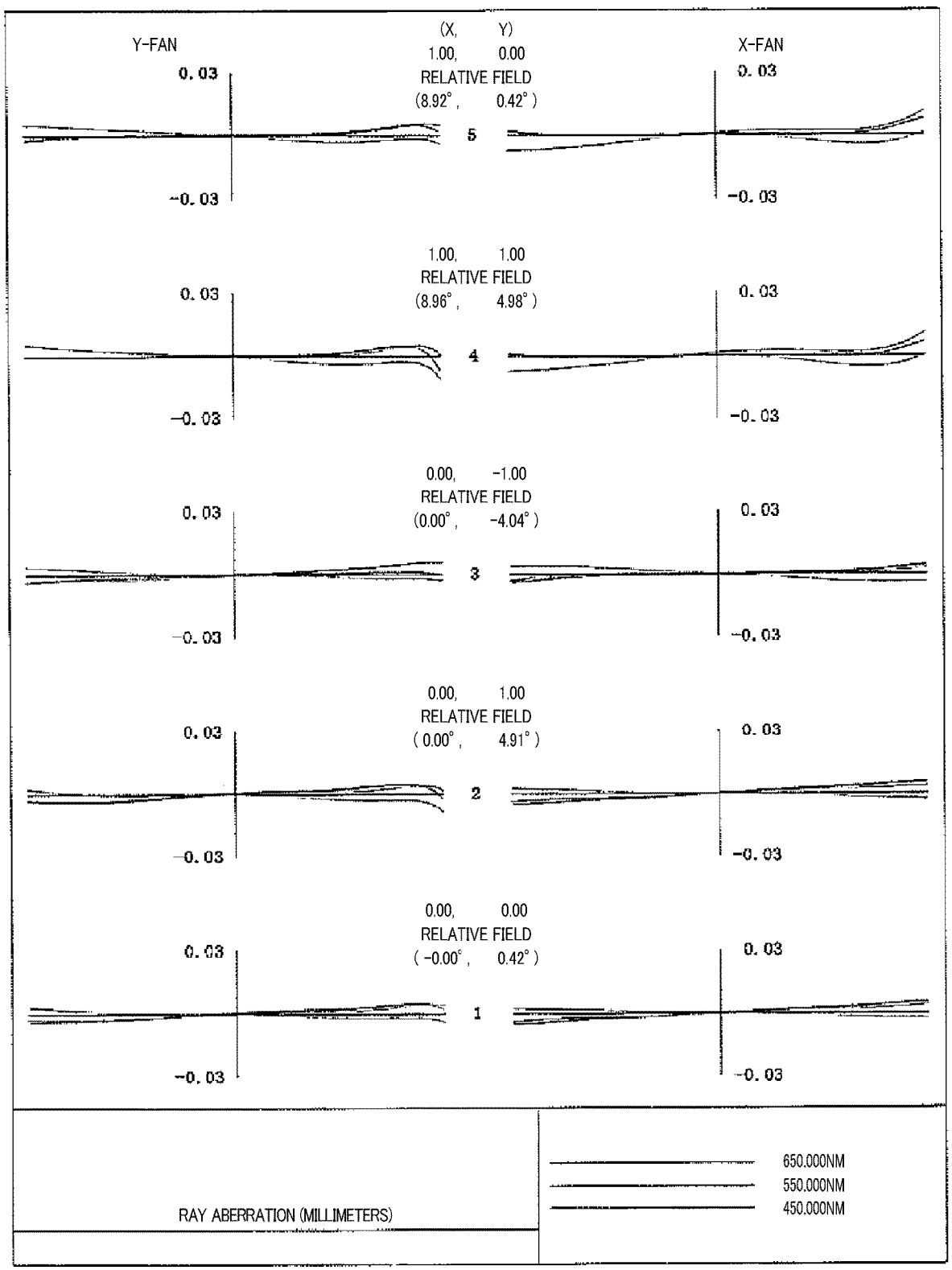
FIG. 19A and FIG. 19B are diagrams each illustrating the lateral aberrations of a lens system according to the fourth example of the present disclosure.
Figure 19B:
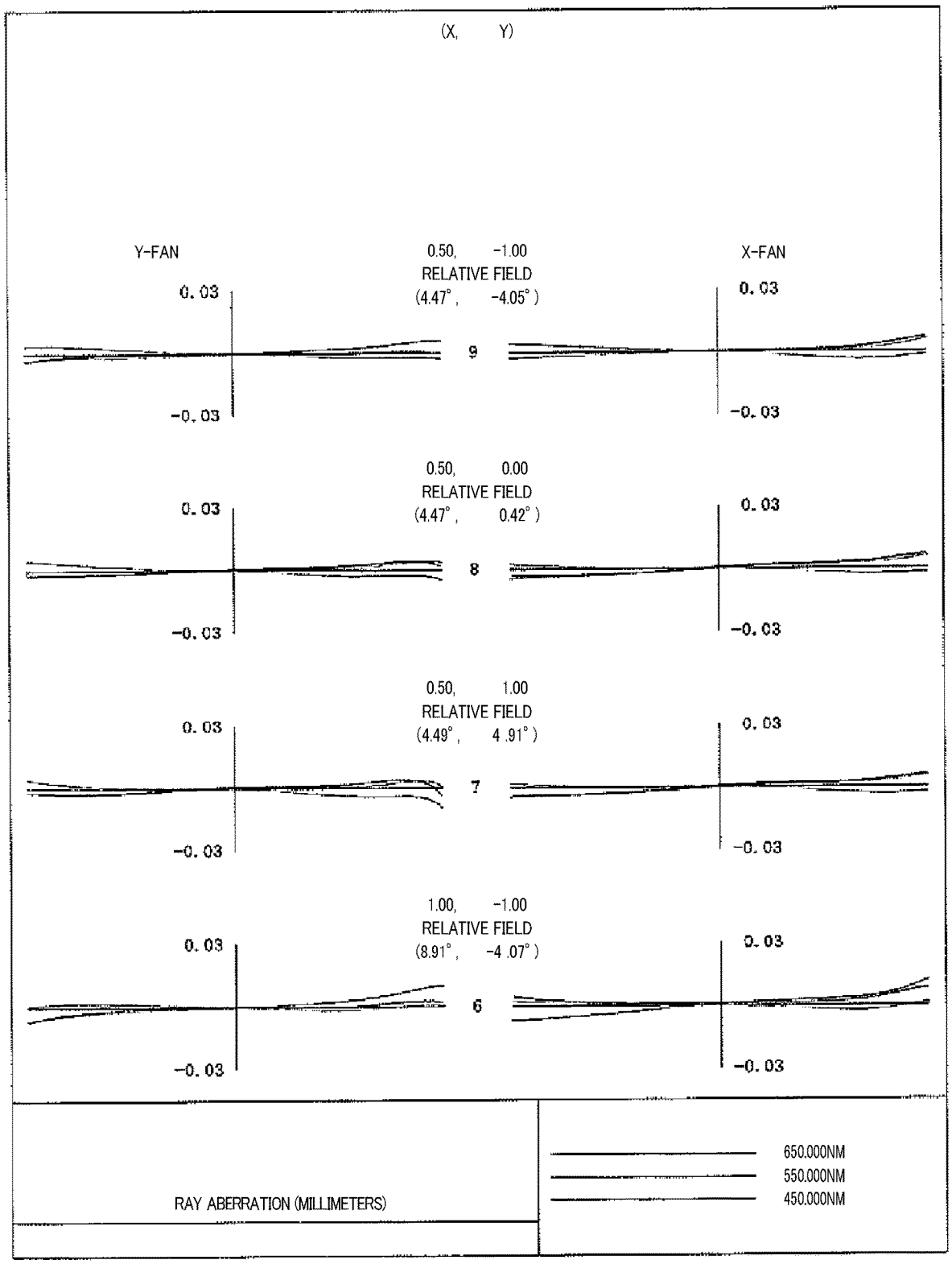

FIG. 19A and FIG. 19B are diagrams illustrating the ray aberrations of a lens system according to the fourth example of the present disclosure.

Figure 20A:
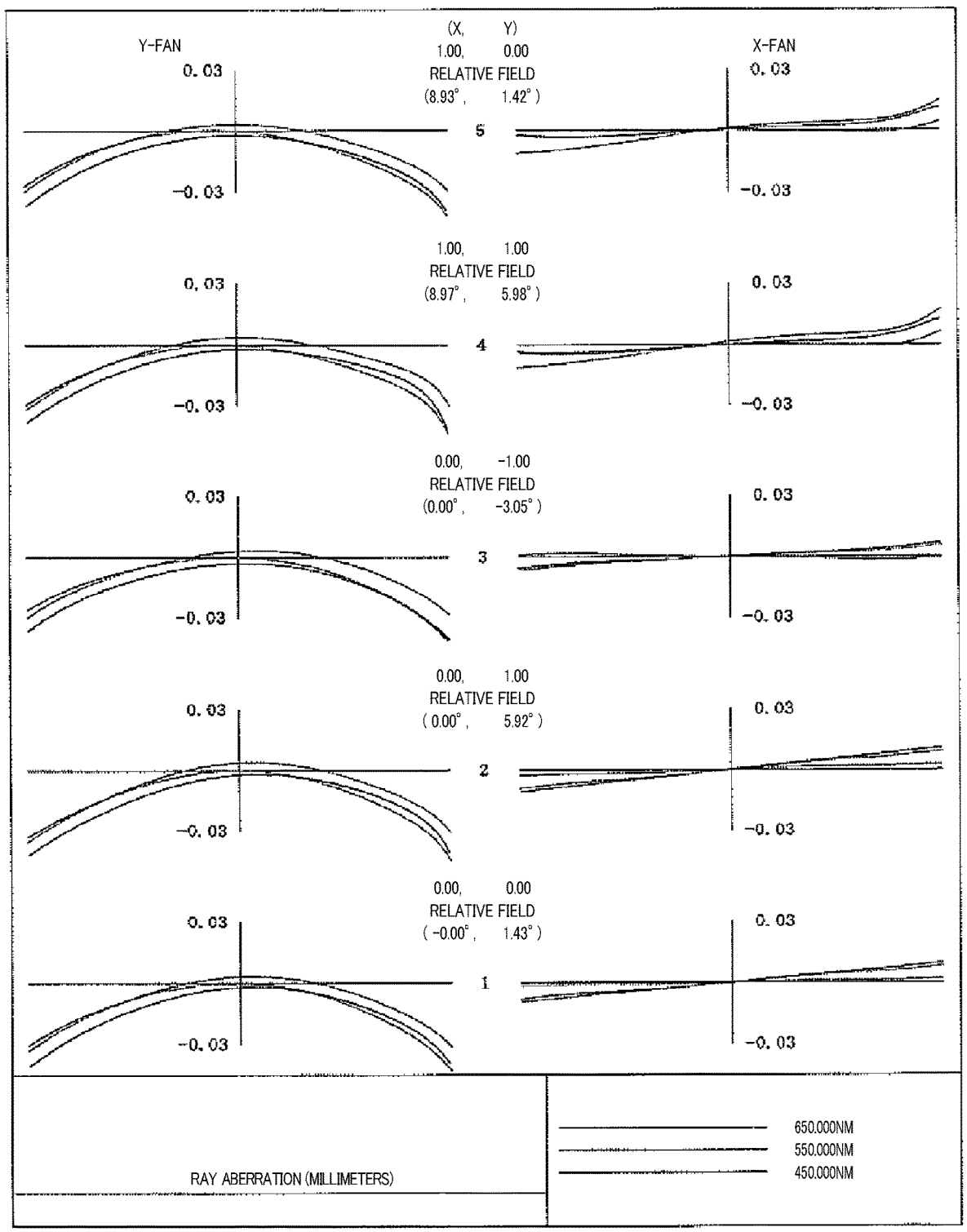
FIG. 20A and FIG. 20B are diagrams each illustrating the lateral aberrations of a lens system according to a control sample of the fourth example of the present disclosure.
Figure 20B:
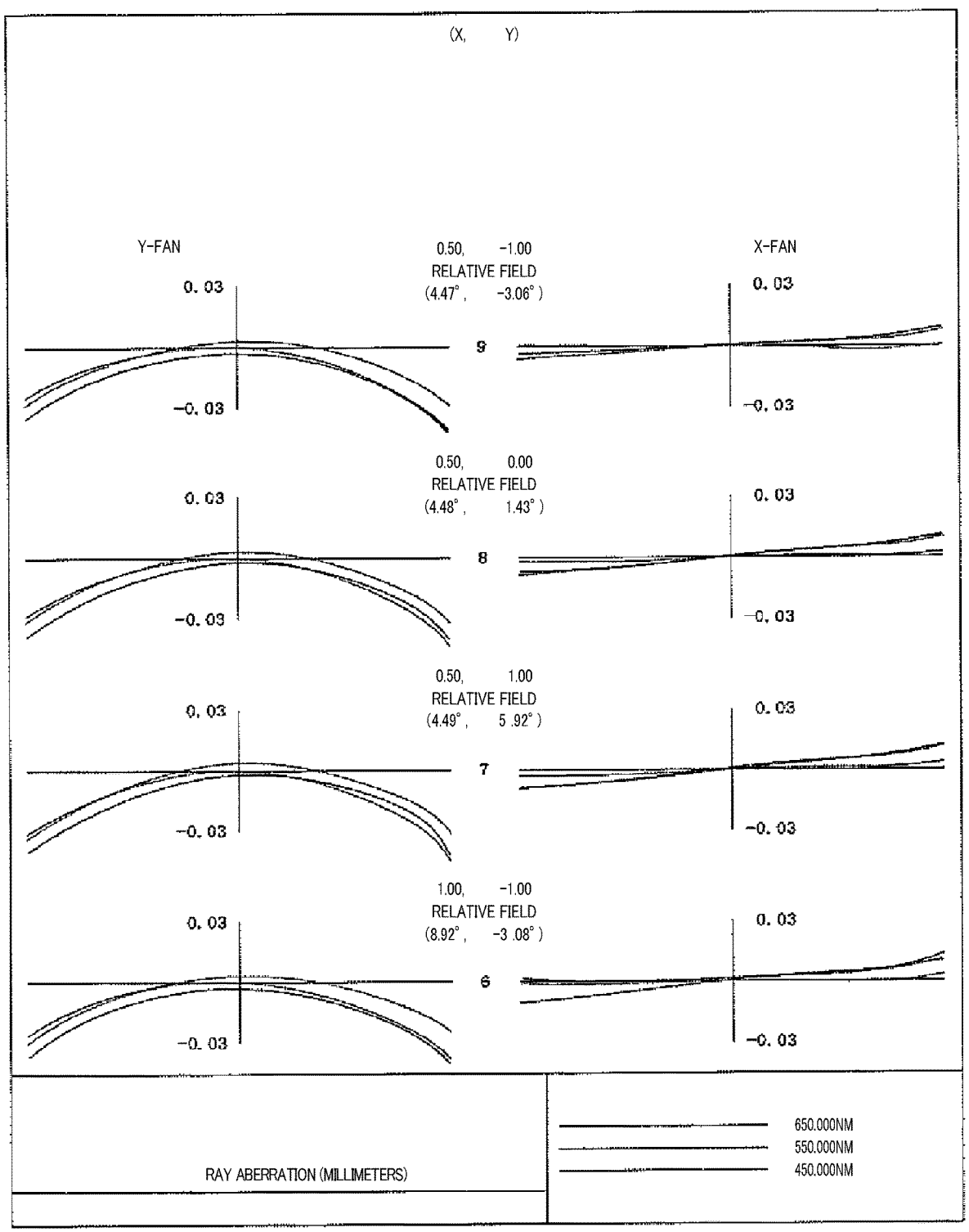

FIG. 20A and FIG. 20B are diagrams each illustrating the lateral aberrations of a lens system according to a control sample of the fourth example of the present disclosure.

As is apparent from the comparison of the lateral aberration in FIG. 19A and FIG. 19B with the lateral aberration in FIG. 20A and FIG. 20B, coma aberrations in the projection lens system according to the fourth example of the present disclosure are effectively reduced and improved compared with the lens system according to the control sample of the fourth example of the present disclosure.

As described above, in the fourth example of the present disclosure, the tilt angle ξ of the optical axis of the rear group G2 with respect to the display surface SF is 3.04 degrees.

The tilt angle ξs at which the lens system according to the control sample of the fourth example of the present disclosure satisfies the Scheimpflug principle can be obtained as follows. The tilt angle θB of the screen is 27 degrees, and the image-forming magnification power m is 8.221. As a result, the tilt angle ξs is obtained as follows.

$\theta A = \xi s = 3.547$

Accordingly, the parameter ξ/ξs in the first conditional expression is determined as follows.

$3.04/3.547 = 0.86$

Fifth Example

FIG. 21 is a diagram illustrating the configuration or structure of a projection lens system on a shared plane, according to a fifth example of the present disclosure.

The prism Pr is a rectangular prism, and the object-light incident plane of the prism that faces the display surface SF faces the display surface SF and is parallel to the display surface SF.

The front group G1 includes three lenses of a positive meniscus lens, another positive meniscus lens and a double-concave lens that are arranged in this order listed from the projection-plane side toward the display-surface side, and has a positive refractive power. The front group G1 as a whole in the present example is shifted by +1.40 mm (=amount of shift Δ) to the upper side of FIG. 21 in a direction perpendicular to the front-group optical axis.

The rear group G2 includes six lenses of a double-concave lens, a double-convex lens, another double-convex lens, another double-concave lens, another double-convex lens, and another double-convex lens that are arranged in this order listed from the projection-plane side toward the display-surface side, and has a positive refractive power. The aperture stop S is arranged between the first double-concave lens and the first double-convex lens.

The optical axis of the rear group G2 is tilted at a tilt angle ξ (ξ=3.05) with respect to the display surface SF in a counterclockwise direction. The aperture stop S in the present example is shifted to the upper side of FIG. 21 by +1.48 mm with reference to the rear-group optical axis.

In other words, the fifth example of the present disclosure falls under the first cases as described above.

FIG. 22A and FIG. 22B depict the data of the projection lens system according to the fifth example of the present disclosure, in a similar manner to FIG. 17A and FIG. 17B.

Also in the fifth example of the present disclosure, an aspherical surface is used. FIG. 22A depicts the data of the projection lens system according to the fifth example of the present disclosure, and FIG. 22B depicts the aspherical data of the projection lens system according to the fifth example of the present disclosure.

Figure 23A:
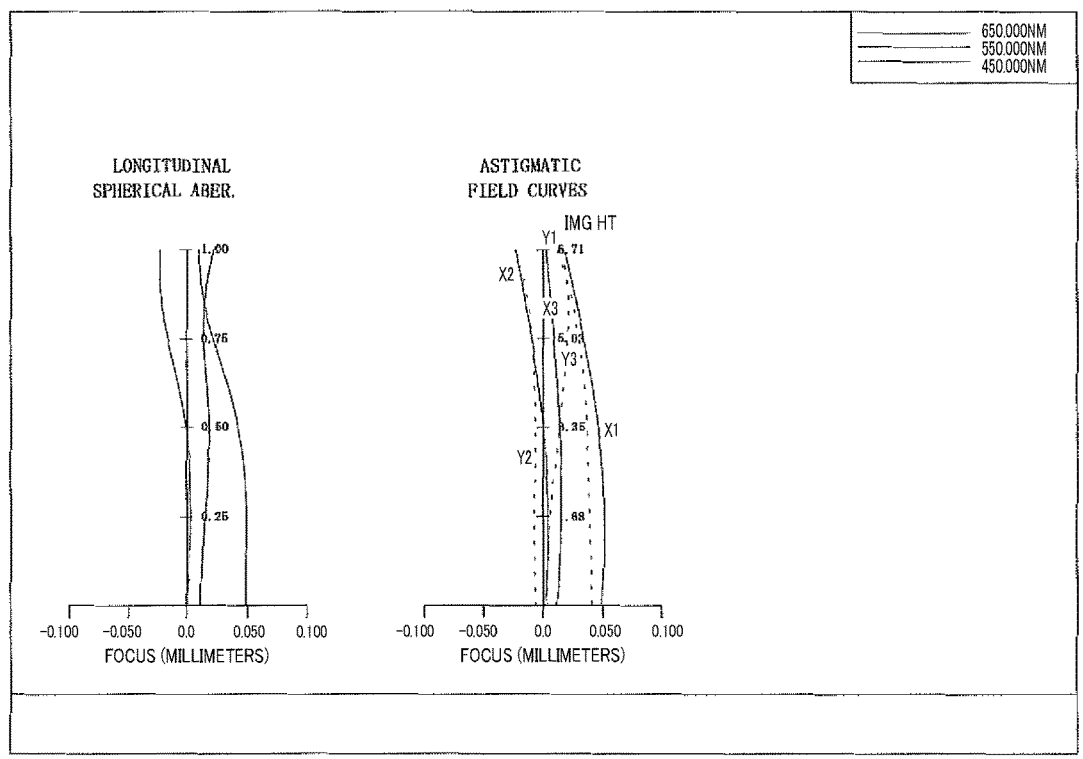
FIG. 23A and FIG. 23B are diagrams illustrating the spherical aberration and astigmatism of a lens system according to the fifth example of the present disclosure and a control sample of the fifth example, respectively.
Figure 23B:
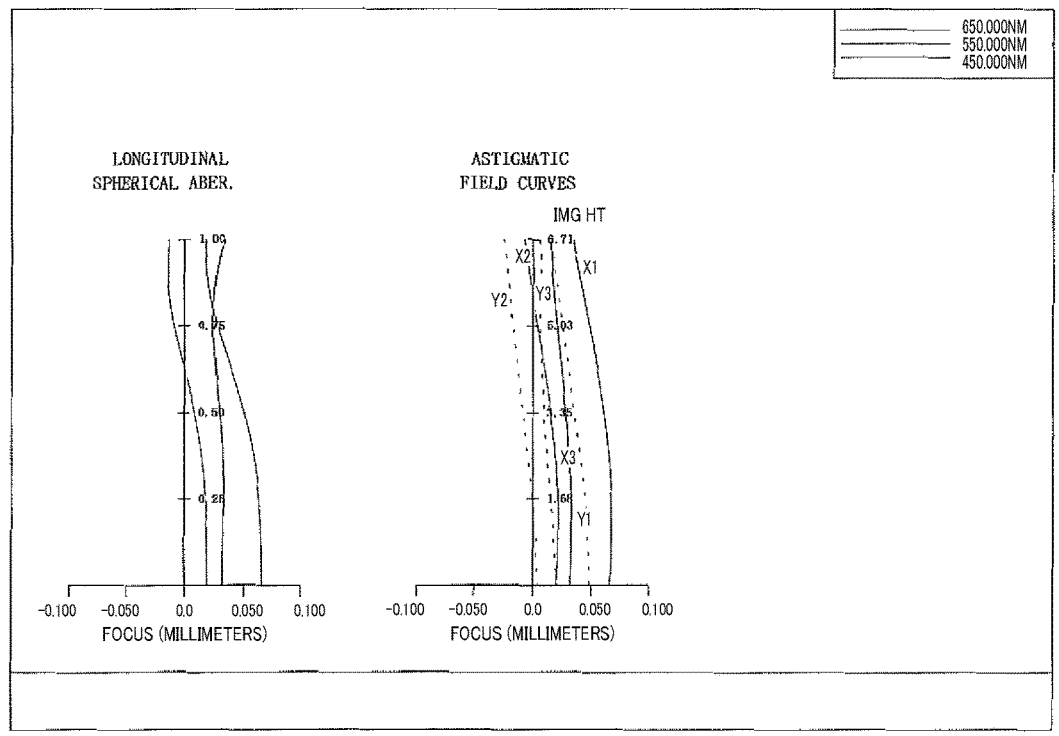

FIG. 23A and FIG. 23B are diagrams illustrating the spherical aberration and astigmatism of a lens system according to the fifth example of the present disclosure and a control sample of the fifth example, respectively.

In other words, FIG. 23A illustrates the aberrations in the fifth example of the present disclosure, and FIG. 23B illustrates the aberrations of a lens system according to the control sample of the fifth example of the present disclosure.

As apparent from the comparison between the aberrations in the fifth example of the present disclosure as illustrated in FIG. 23A and the aberrations of a lens system according to the control sample of the fifth example of the present disclosure as illustrated in FIG. 23B, the performance that relates to the spherical aberration and astigmatism is substantially equivalent to each other between the fifth example of the present disclosure and the control sample of the fifth example.

Figure 24A:
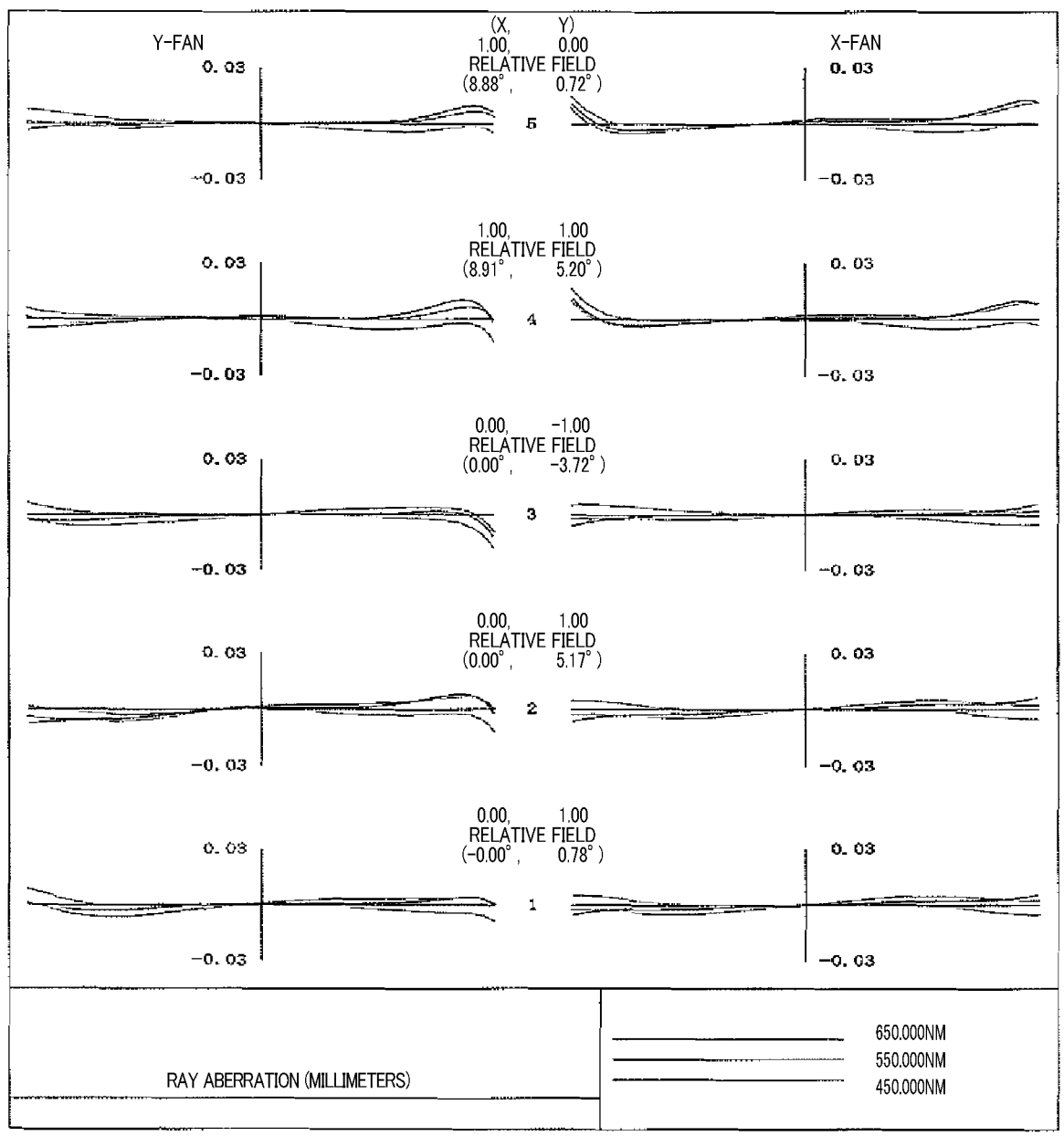
FIG. 24A and FIG. 24B are diagrams each illustrating the lateral aberrations of a lens system according to the fifth example of the present disclosure.
Figure 24B:
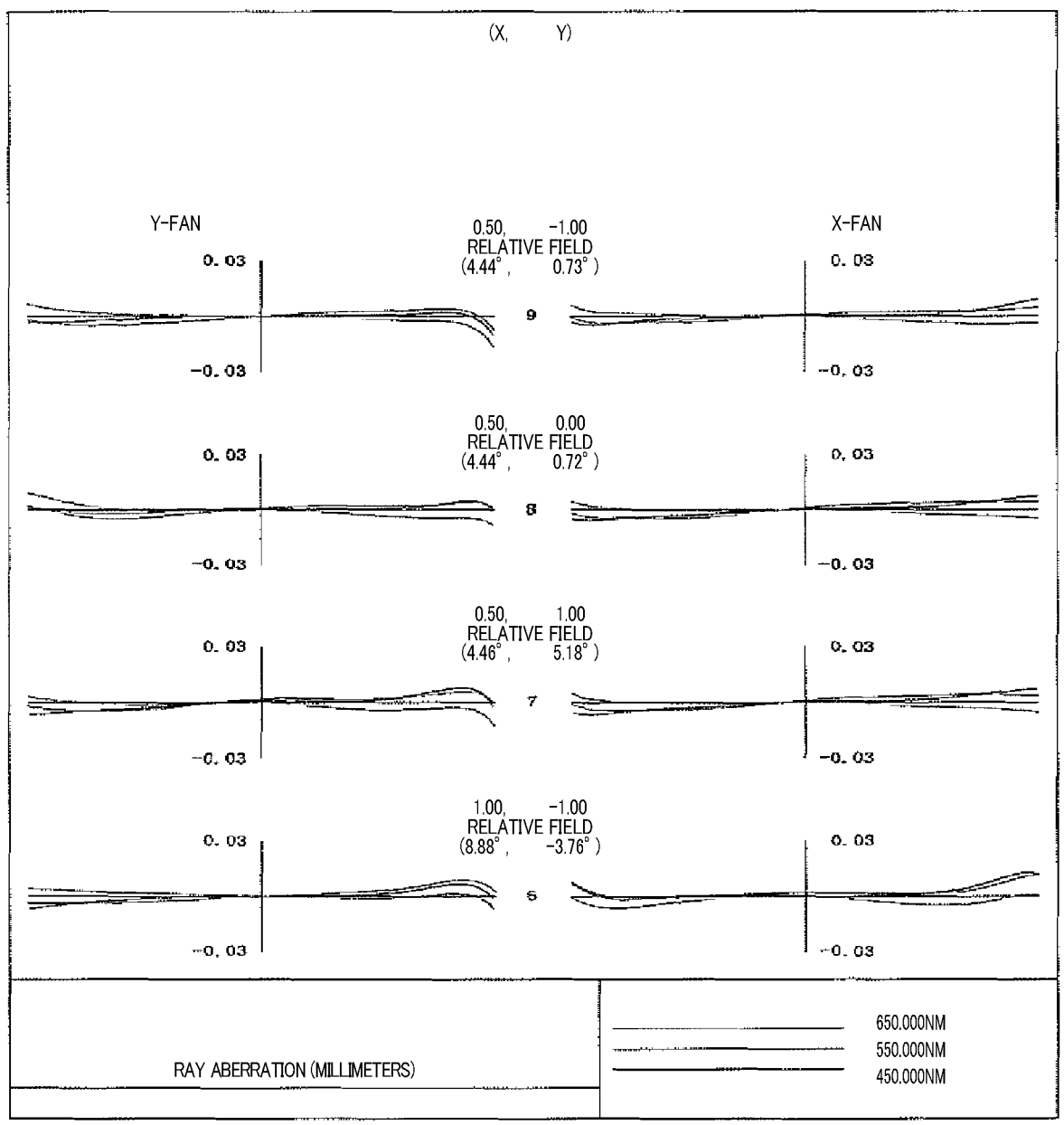

FIG. 24A and FIG. 24B are diagrams illustrating the ray aberrations of a lens system according to the fifth example of the present disclosure.

Figure 25A:
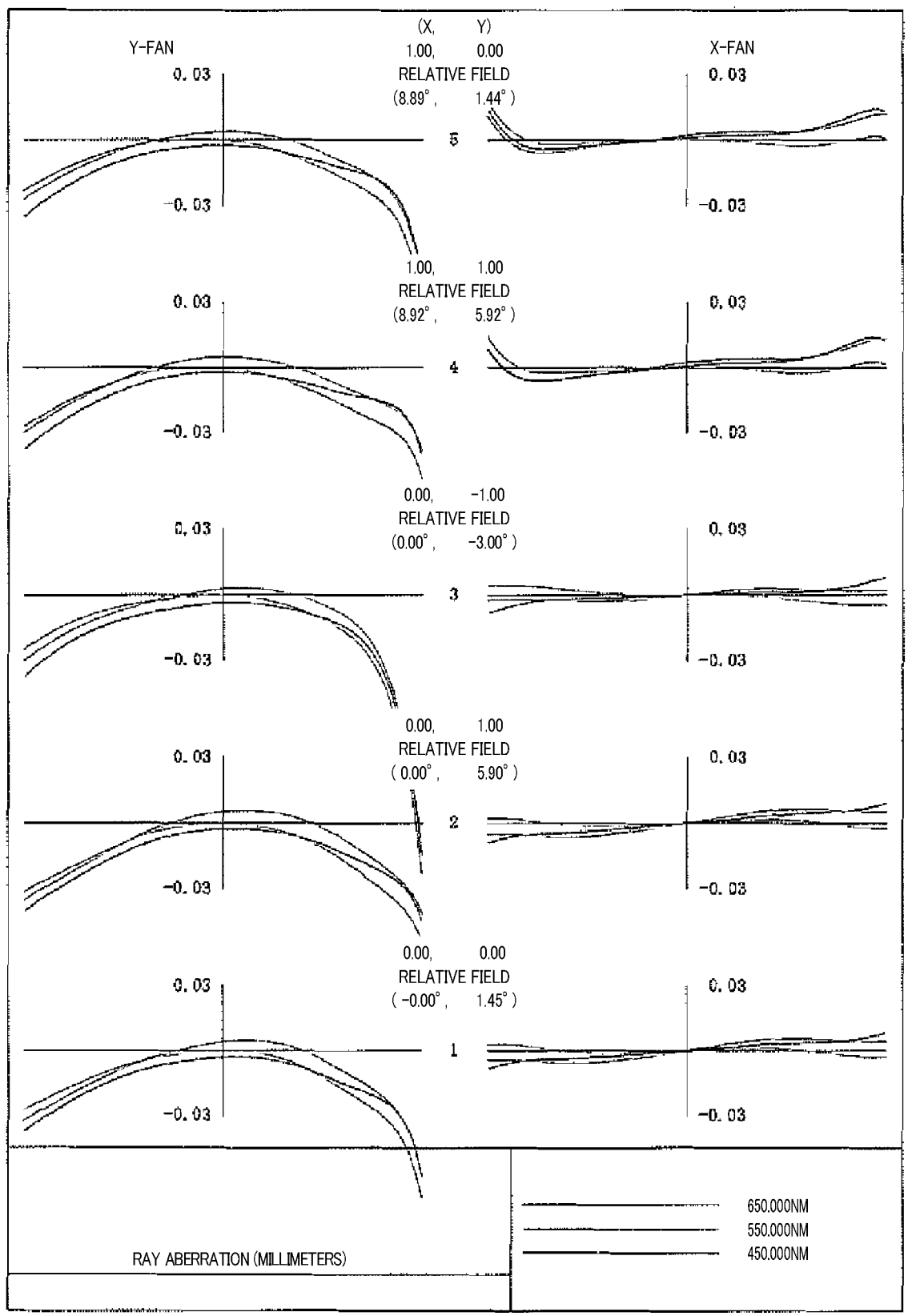
FIG. 25A and FIG. 25B are diagrams each illustrating the lateral aberrations of a lens system according to a control sample of the fifth example of the present disclosure.
Figure 25B:
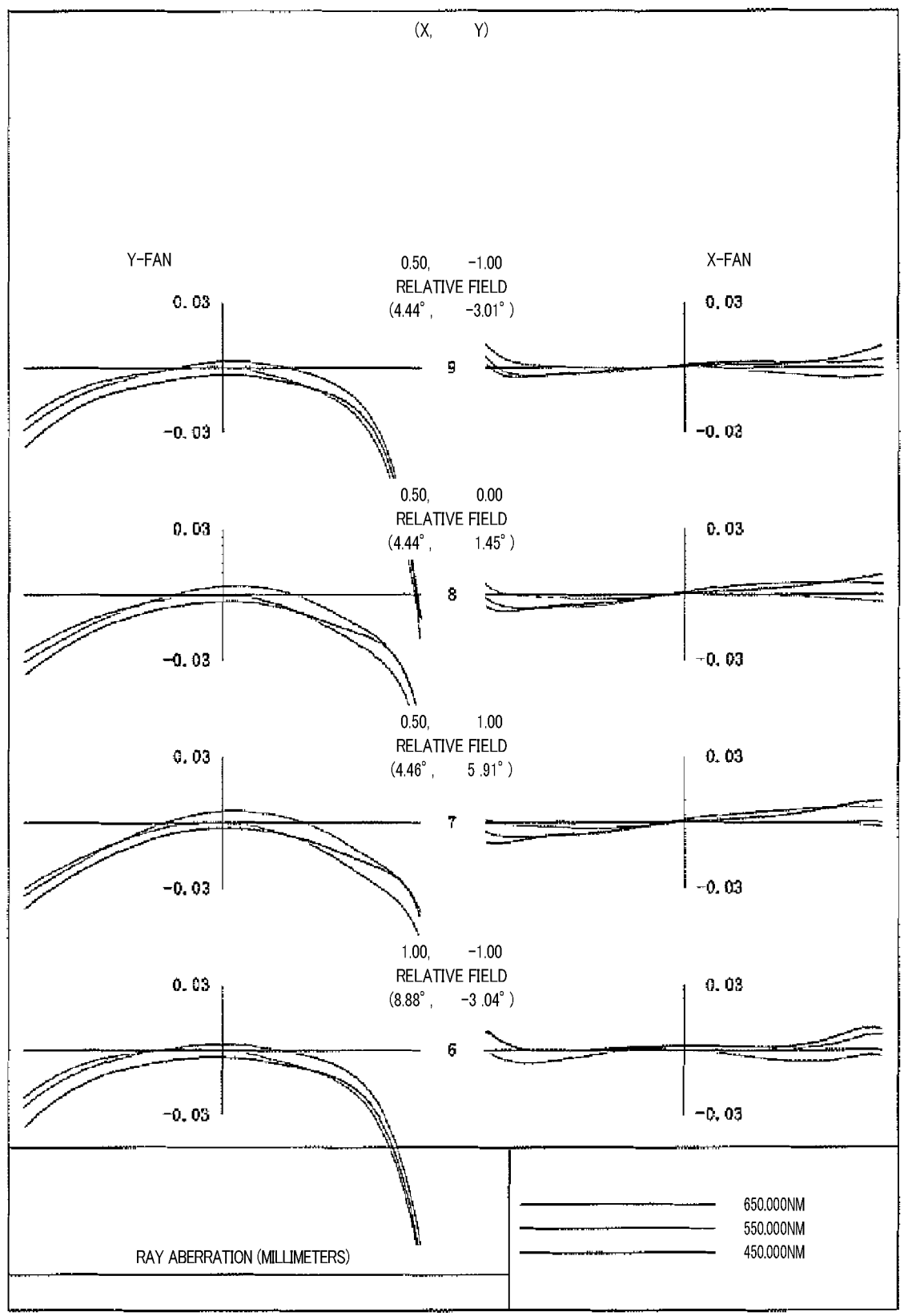

FIG. 25A and FIG. 25B are diagrams each illustrating the lateral aberrations of a lens system according to a control sample of the fifth example of the present disclosure.

As is apparent from the comparison of the lateral aberration in FIG. 24A and FIG. 24B with the lateral aberration in FIG. 25A and FIG. 25B, coma aberrations in the projection lens system according to the fifth example of the present disclosure are effectively reduced and improved compared with the lens system according to the control sample of the first example of the present disclosure.

As described above, in the fifth example of the present disclosure, the tilt angle ξ of the optical axis of the rear group G2 with respect to the display surface SF is 3.05 degrees.

The tilt angle ξs at which the lens system according to the control sample of the fifth example of the present disclosure satisfies the Scheimpflug principle can be obtained as follows. The tilt angle θB of the screen is 27 degrees, and the image-forming magnification power m is 8.219. As a result, the tilt angle ξs is obtained as follows.

$$\theta A = \xi s = 3.548$$

Accordingly, the parameter ξ/ξs in the first conditional expression is determined as follows.

$$3.05/3.548 = 0.86$$

Sixth Example

Figure 26:
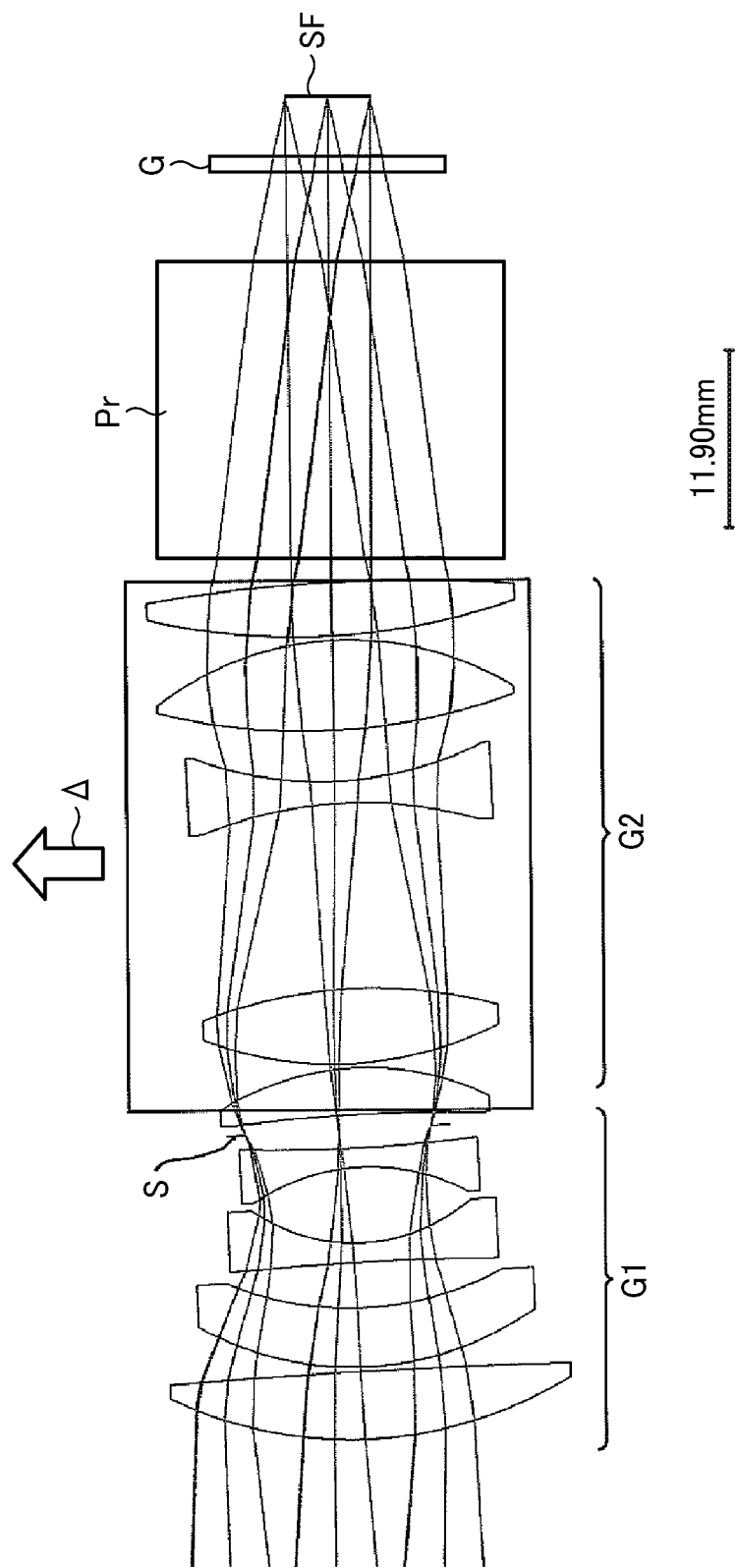
FIG. 26 is a diagram illustrating a lens configuration of a projection lens system according to a sixth example of the present disclosure.

FIG. 26 is a diagram illustrating the configuration or structure of a projection lens system on a shared plane, according to a sixth example of the present disclosure.

The prism Pr is a rectangular prism, and the object-light incident plane of the prism that faces the display surface SF faces the display surface SF and is parallel to the display surface SF.

The front group G1 includes four lenses of a double-convex lens, a positive meniscus lens, a double-concave lens, and another double-concave lens that are arranged in this order listed from the projection-plane side toward the display-surface side, and has a negative refractive power.

The rear group G2 includes five lenses of a positive meniscus lens, a double-convex lens, a double-concave lens, a double-convex lens, and a double-convex lens that are arranged in this order listed from the projection-plane side toward the display-surface side, and has a positive refractive power. The aperture stop S is arranged between the front group G1 and the rear group G2.

The rear group G2 as a whole in the present example is shifted by +0.13 mm (=amount of shift Δ) to the upper side of FIG. 26 in a direction perpendicular to the rear-group optical axis.

The optical axis of the rear group G2 is tilted at a tilt angle ξ (ξ=2.63) with respect to the display surface SF in a counterclockwise direction. The aperture stop S in the present example is shifted to the upper side of FIG. 26 by +1.45 mm with reference to the rear-group optical axis.

In other words, the sixth example of the present disclosure also falls under the second cases as described above.

FIG. 27 depicts the data of the projection lens system according to the sixth example of the present disclosure, in a similar manner to FIG. 2.

Figure 28A:
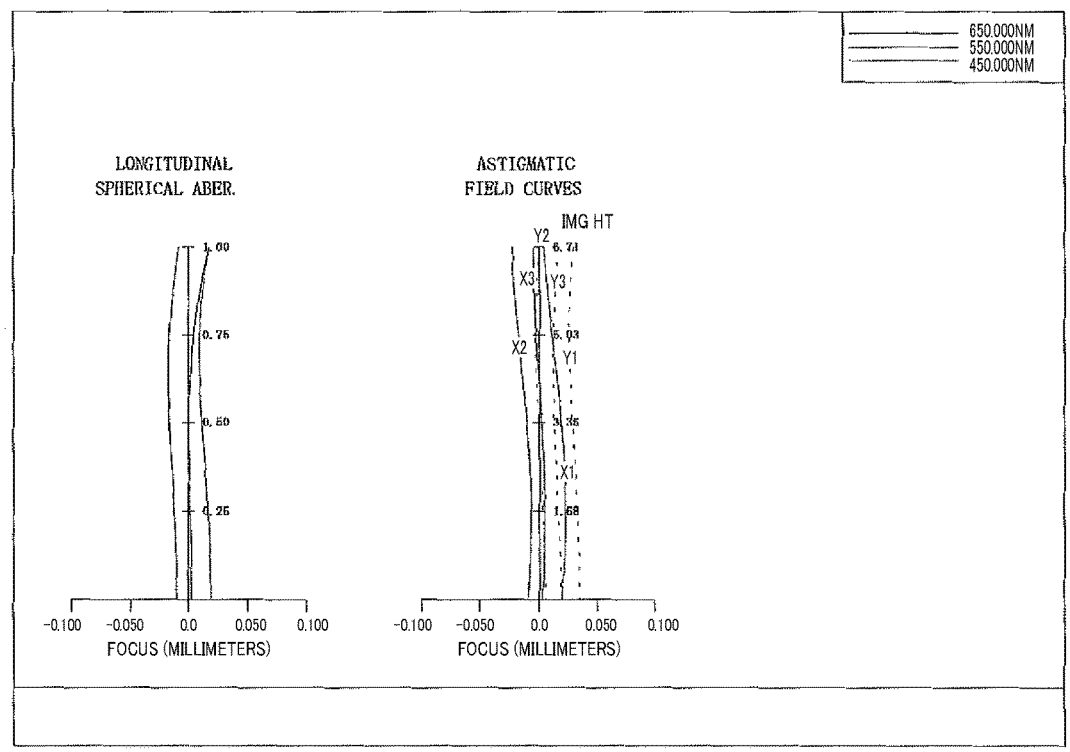
FIG. 28A and FIG. 28B are diagrams illustrating the spherical aberration and astigmatism of a lens system according to the sixth example of the present disclosure and a control sample of the sixth example, respectively.
Figure 28B:
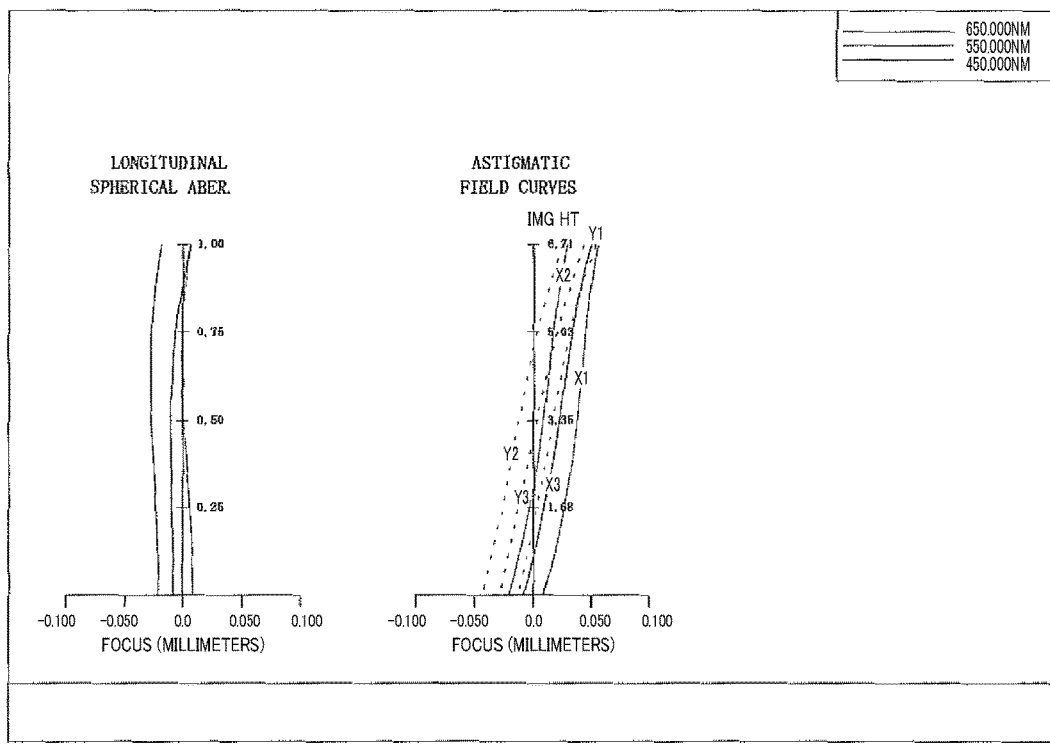

FIG. 28A and FIG. 28B are diagrams illustrating the spherical aberration and astigmatism of a lens system according to the sixth example of the present disclosure and a control sample of the sixth example, respectively.

In other words, FIG. 28A illustrates the aberrations in the sixth example of the present disclosure, and FIG. 28B illustrates the aberrations of a lens system according to the control sample of the sixth example of the present disclosure. As apparent from the comparison between the aberrations in the first example of the present disclosure as illustrated in FIG. 28A and the aberrations of a lens system according to the control sample of the sixth example of the present disclosure as illustrated in FIG. 28B, the performance that relates to the spherical aberration and astigmatism is substantially equivalent to each other between the sixth example of the present disclosure and the control sample of the sixth example.

Figure 29A:
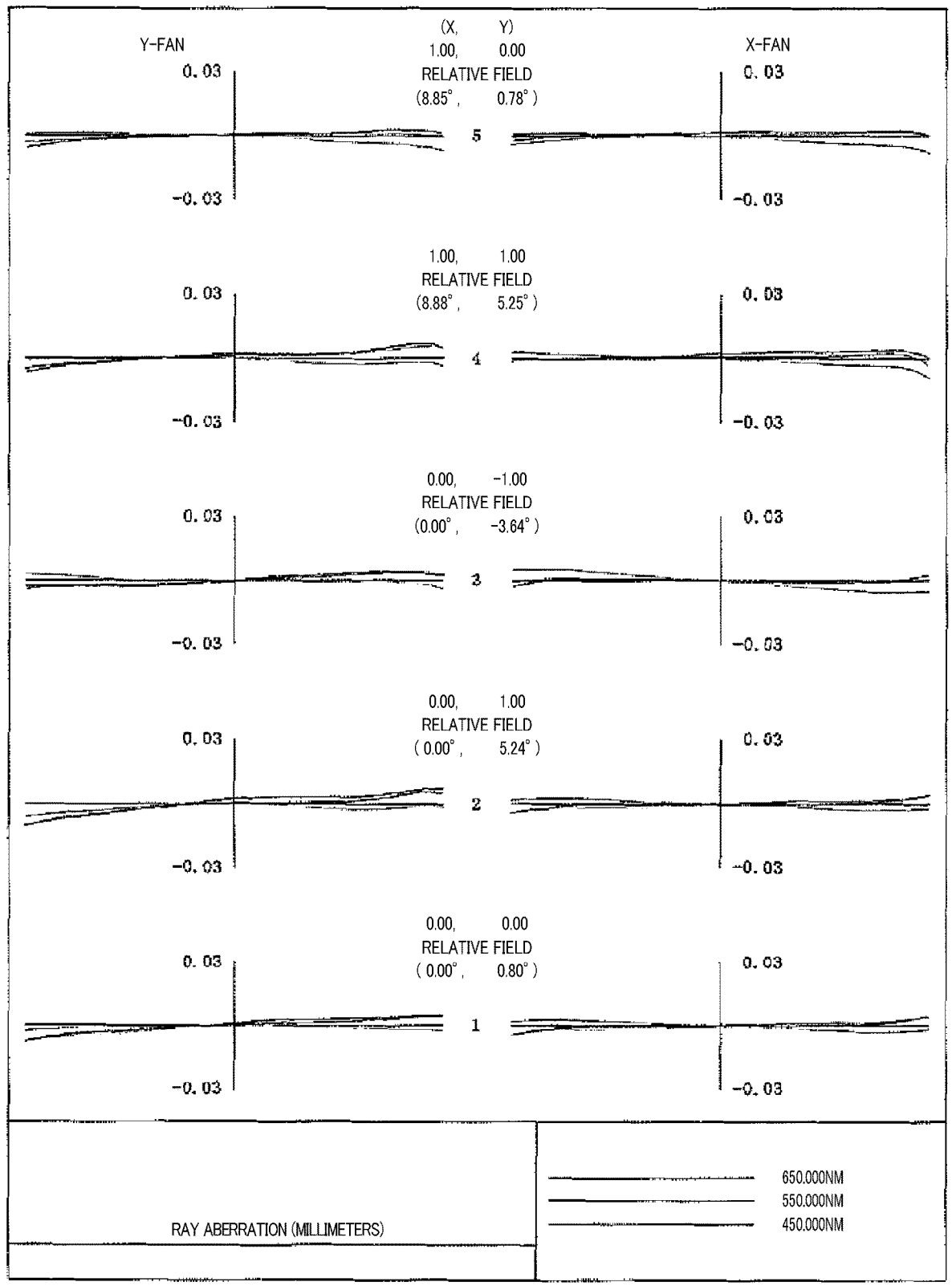
FIG. 29A and FIG. 29B are diagrams each illustrating the lateral aberrations of a lens system according to the sixth example of the present disclosure.
Figure 29B:
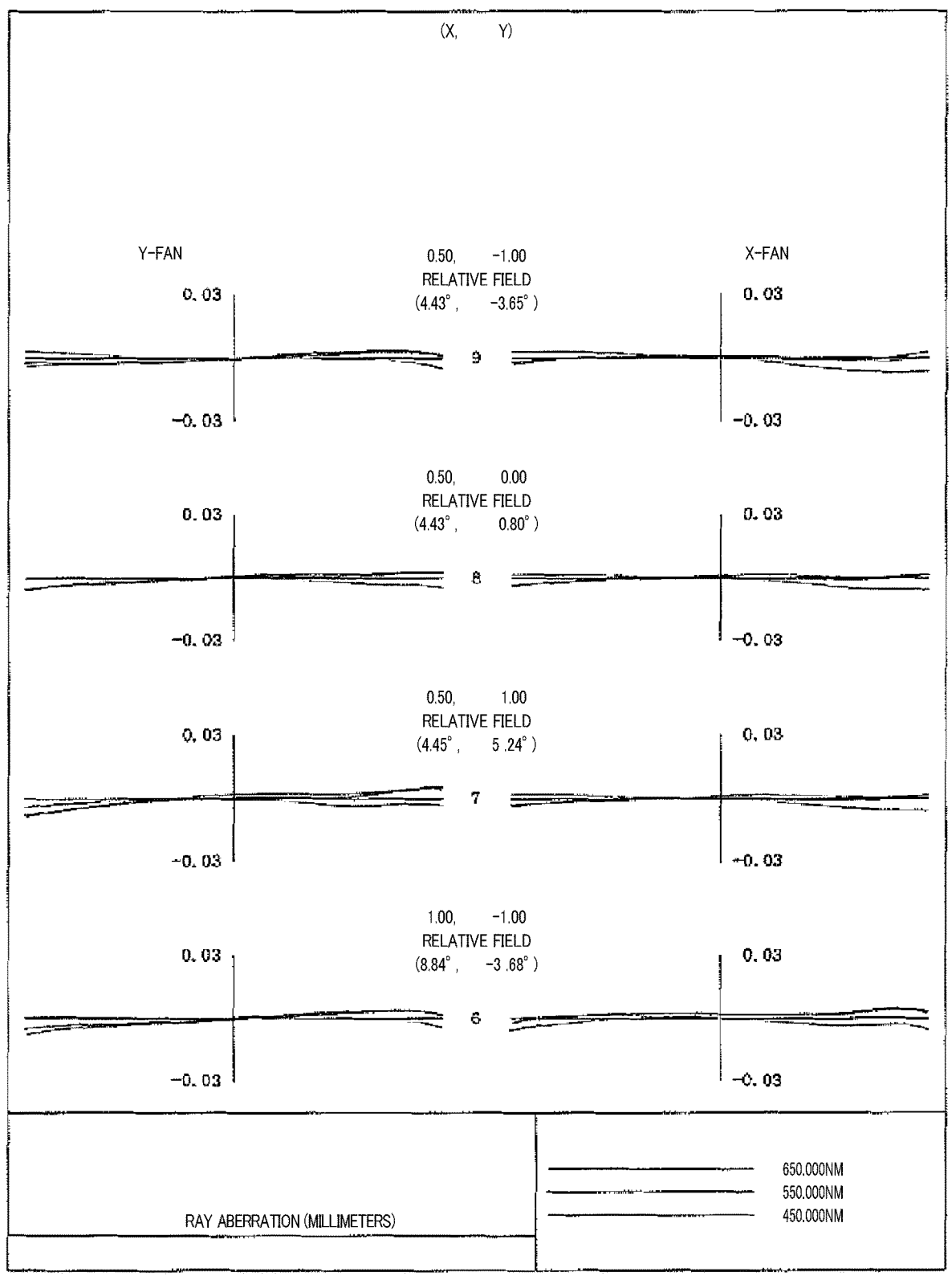

FIG. 29A and FIG. 29B are diagrams illustrating the ray aberrations of a lens system according to the sixth example of the present disclosure.

Figure 30A:
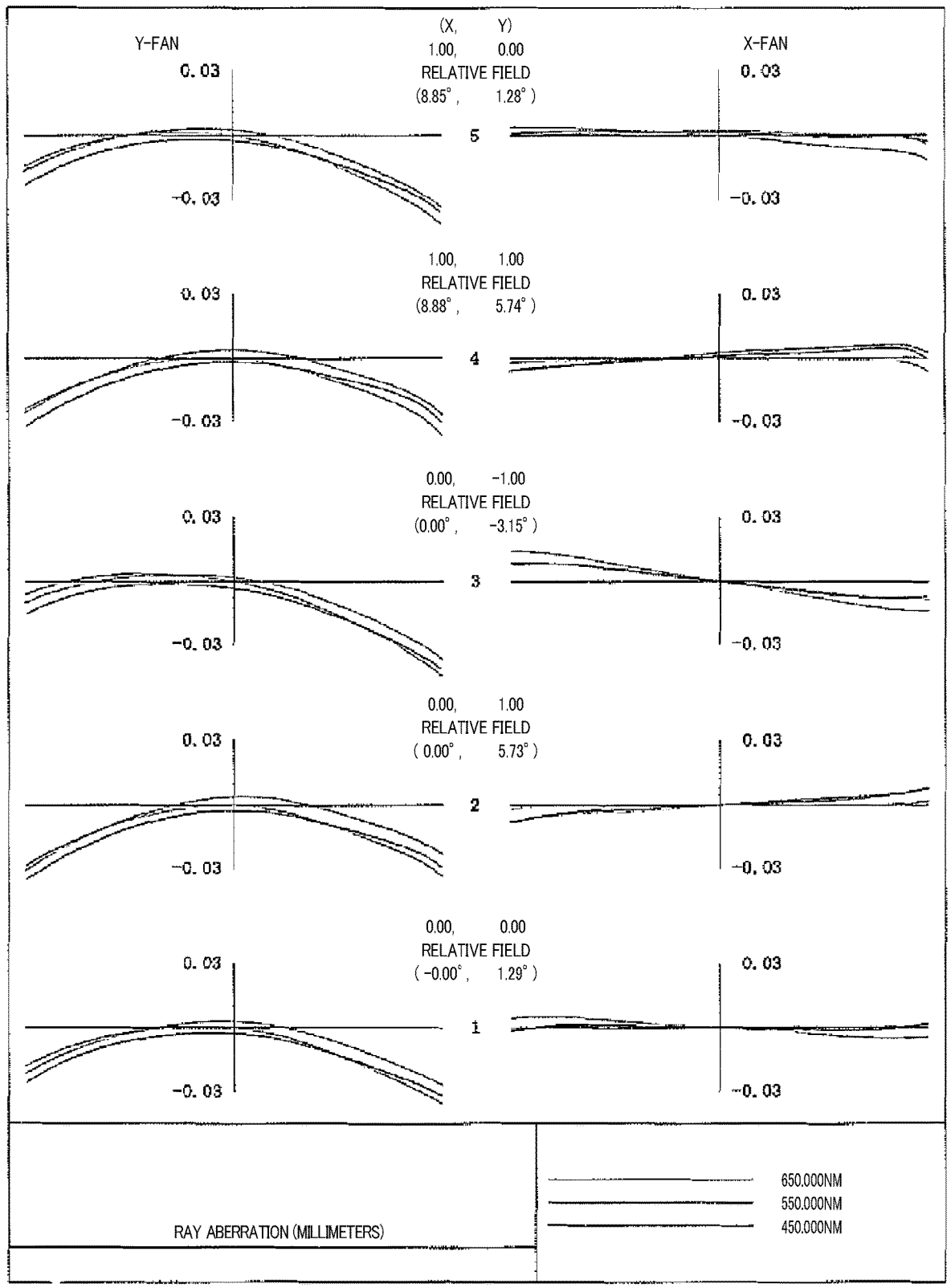
FIG. 30A and FIG. 30B are diagrams each illustrating the lateral aberrations of a lens system according to a control sample of the sixth example of the present disclosure.
Figure 30B:
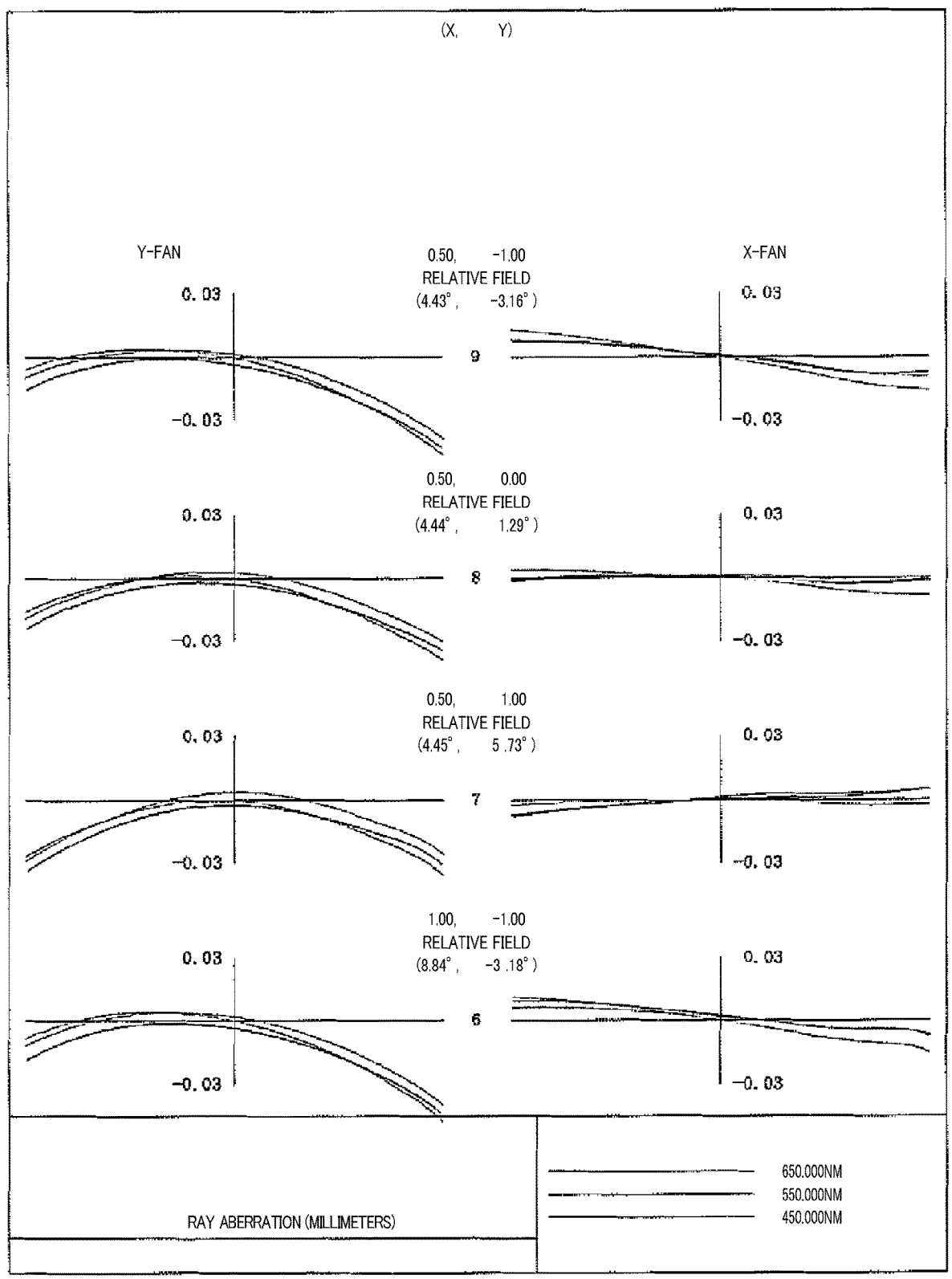

FIG. 30A and FIG. 30B are diagrams each illustrating the lateral aberrations of a lens system according to a control sample of the sixth example of the present disclosure.

As is apparent from the comparison of the lateral aberration in FIG. 29A and FIG. 29B with the lateral aberration in FIG. 30A and FIG. 30B, coma aberrations are effectively reduced and improved in the projection lens system according to the sixth example of the present disclosure compared with the lens system according to the control sample of the sixth example of the present disclosure.

As described above, in the sixth example of the present disclosure, the tilt angle ξ of the optical axis of the rear group G2 with respect to the display surface SF is 3.05 degrees.

The tilt angle ξs at which the lens system according to the control sample of the sixth example of the present disclosure satisfies the Scheimpflug principle can be obtained as follows. The tilt angle θB of the screen is 27 degrees, and the image-forming magnification power m is 8.229. As a result, the tilt angle ξs is obtained as follows.

$$\theta A = \xi s = 3.543$$

Accordingly, the parameter ξ/ξs in the first conditional expression is determined as follows.

$$3.05/3.543 = 0.86$$

FIG. 31A and FIG. 31B depict the optical data related to the lens systems according to the first to sixth examples of the present disclosure as described above.

More specifically, FIG. 31A depicts a magnifying power (i.e., the image-forming magnification power on the optical axis), a focal length (f: focal length of the entire optical system), f1: the focal length of the front-group focal length, f2: the focal length of the rear-group focal length, and the amount of tilt (i.e., the amount of projection tilt) of the front group and the rear group with reference to the display surface, and FIG. 31B depicts the amount of shift of the entire projection lens system according to the first and second examples of the present disclosure, the amount of front-group shift, the amount of rear-group shift, and the values of parameters in the second conditional expression and the third conditional expression.

As described above, the performance of the projection lens system according to the first to sixth examples of the present disclosure is very well. More specifically, the coma aberration can efficiently be corrected, and various kinds of aberrations other than the coma aberration are well controlled with reference to the display surface SF and the projection plane that are not parallel to each other.

Figure 33:
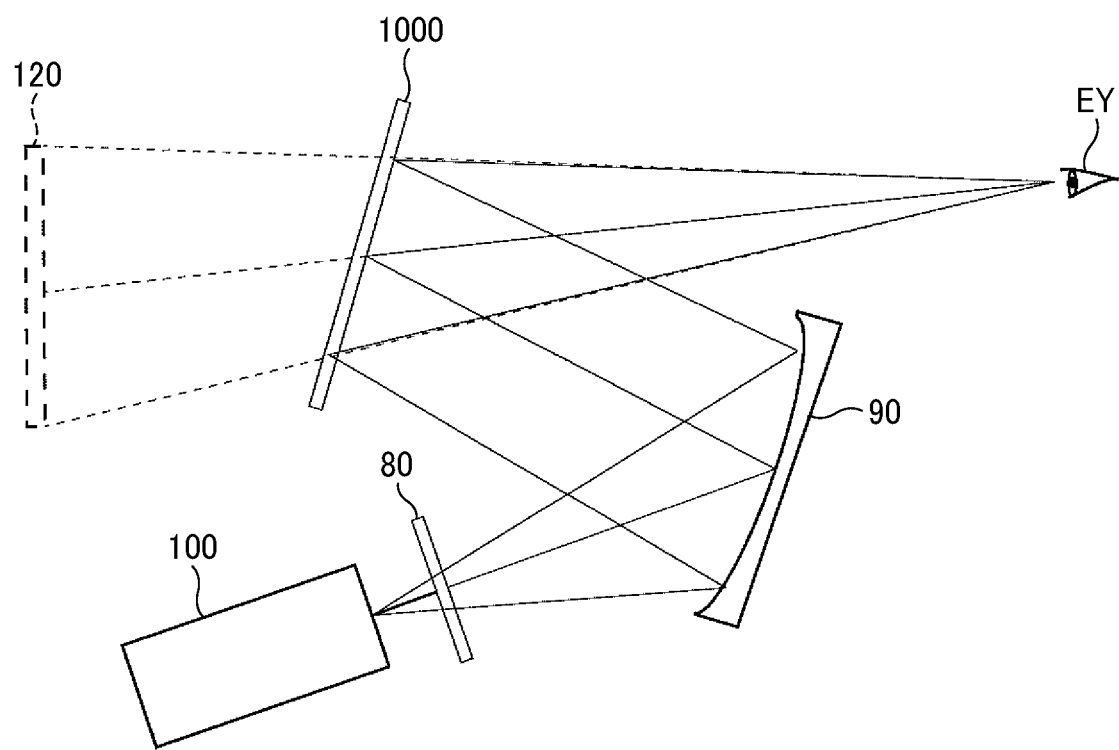
FIG. 33 is a diagram illustrating a projection optical device, according to embodiments of the present disclosure.

FIG. 33 is a diagram illustrating an image projection apparatus according to an embodiment of the present disclosure.

More specifically, FIG. 33 illustrates an embodiment according to the present disclosure in which an image projection apparatus is provided for a mobile object such as a vehicle to configure a heads-up display (HUD).

In FIG. 33, an image display element, a projection lens system, and an illumination optical system that irradiates the display surface of the image display element, which are elements of the image projection apparatus according to the present embodiment, are indicated by a reference sign 100.

Moreover, in FIG. 33, a diffuse-transmissive screen that serves as a projection plane is indicated by a reference sign 80. The screen 80 is inclined with reference to the display surface of an image display element. Any desired device or apparatus according to any one of the first to sixth examples of the present disclosure may be used for a portion indicated by a reference sign 100.

An image is displayed on the display surface of an image display element, and such an image indicates, for example, driver-assistance information. A projection lens system projects the image onto the screen 80 as a projection image. The light that is diffused by the screen 80 is reflected by a concave mirror 90, which is a virtual-image forming element, and forms a virtual image 120. The image-forming light flux that is reflected by a concave mirror 90 is reflected by a front windshield 1000 of the vehicle toward an eye EY of the driver, and a driver can visually check the virtual image 120 through the front windshield 1000.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

This patent application is based on and claims priority to Japanese Patent Application No. 2019-207843, filed on Nov. 18, 2019, in the Japan Patent Office, the entire disclosures of which are hereby incorporated by reference herein.

REFERENCE SIGNS LIST

G1 Front group
G2 Rear group
S Aperture stop
Pr Prism
G Cover glass to protect display surface of DMD that serves as image display element
SF Display surface

The invention claimed is:

1. A projection lens system, comprising:
a front group disposed on a projection-plane side;
a rear group disposed on a display-surface side of an image display element inclined with reference to the projection plane; and
an aperture stop disposed on the display-surface side with reference to the front group, wherein
the front group having a front-group optical axis, the rear group having a rear-group optical axis parallel to the front-group optical axis, the front-group optical axis and the rear-group optical axis being shifted by an amount of shift $\Delta$ relative to each other, in a direction perpendicular to the front-group optical axis and the rear-group optical axis,
the front-group optical axis and the rear-group optical axis being on a shared plane shared by a display-surface normal assumed on the display surface and a projection-plane normal line assumed on the projection plane to intersect with the display-surface normal,
the rear-group optical axis being tilted on the shared plane at a tilt angle $\xi$ with reference to the display-surface normal,
when the amount of shift $\Delta$ is zero, the tilt angle $\xi$ satisfies a first conditional expression as follows:

$0 < \xi/\xi s < 1$, where $\xi s$ denotes a tilt angle when Scheimpflug principle is satisfied with reference to the display surface and the projection plane, assuming that a straight line connecting a center of the projection plane and a center of the display surface is a reference line, the front-group optical axis is shifted in a direction perpendicular to the rear-group optical axis by an amount of shift $\Delta$, where $\Delta \neq 0$, with reference to a tilt-reference state where a common optical axis of the front group and the rear group is tilted around a point of intersection of the reference line and a lens surface of the front group on the projection-plane side by the tilt angle $\xi$ with reference to a non-shifted reference state in which the common optical axis matches the reference line,
the front-group optical axis is shifted by an amount of shift $\Delta 1$ with reference to the rear-group optical axis, and
a second conditional expression as follows is satisfied:

$0.000047$ (/mm) $< |\Delta 1/f1|/f < 0.001$ (/mm), where f1 denotes focal length of the front group, and
f denotes focal length of the front group and the rear group.

2. The projection lens system according to claim 1, wherein the aperture stop is disposed between the front group and the rear group.

3. The projection lens system according to claim 2, wherein the aperture stop is independently shifted on the shared plane in a direction perpendicular to the rear-group optical axis.

4. The projection lens system according to claim 2, wherein the aperture stop is independently shifted on the shared plane in a direction perpendicular to the rear-group optical axis.

5. The projection lens system according to claim 1, wherein the aperture stop is disposed within the rear group.

6. The projection lens system according to claim 1, wherein
the front group has a positive or negative refractive power, and
the rear group has a positive refractive power.

7. The projection lens system according to claim 1, wherein
each of the first group and the second group includes a plurality of lenses, and
at least one of the plurality of lenses is an aspherical lens.

8. The projection lens system according to claim 1, wherein
each of the first group and the second group includes a plurality of lenses,
at least one of the plurality of lenses is an aspherical lens, and
the aspherical lens is a plastic lens or a lens molded of glass.

9. An image projection apparatus, comprising:
the projection lens system according to claim 1.

10. The image projection apparatus according to claim 9, further comprising:
a prism disposed between the image display element and the rear group, the prism being configured to guide illumination light to the display surface of the image display element, wherein
the image display element is a digital micromirror device.

11. The image projection apparatus according to claim 10, wherein an object-light incident plane of the prism faces the display surface and is parallel to the display surface.

12. The image projection apparatus according to claim 10, wherein the display-surface normal is tilted on the shared plane with reference to an object-light incident plane of the prism.

13. The image projection apparatus according to claim 10, wherein the image projection apparatus is mounted on a mobile object.

14. The projection lens system according to claim 1, wherein the aperture stop is disposed between the front group and the rear group.

15. The projection lens system according to claim 1, wherein the aperture stop is disposed within the rear group.

16. The projection lens system according to claim 1, wherein
the front group has a positive or negative refractive power, and
the rear group has a positive refractive power.

17. The projection lens system according to claim 1, wherein
each of the first group and the second group includes a plurality of lenses, and
at least one of the plurality of lenses is an aspherical lens.

18. A projection lens system, comprising:
a front group disposed on a projection-plane side;
a rear group disposed on a display-surface side of an image display element inclined with reference to the projection plane; and
an aperture stop disposed on the display-surface side with reference to the front group, wherein
the front group having a front-group optical axis, the rear group having a rear-group optical axis parallel to the front-group optical axis, the front-group optical axis and the rear-group optical axis being shifted by an amount of shift Δ relative to each other, in a direction perpendicular to the front-group optical axis and the rear-group optical axis,
the front-group optical axis and the rear-group optical axis being on a shared plane shared by a display-surface normal assumed on the display surface and a projection-plane normal line assumed on the projection plane to intersect with the display-surface normal,
the rear-group optical axis being tilted on the shared plane at a tilt angle ξ with reference to the display-surface normal,
when the amount of shift Δ is zero, the tilt angle ξ satisfies a first conditional expression as follows:

$$0<\xi/\xi s<1,$$

where ξs denotes a tilt angle when Scheimpflug principle is satisfied with reference to the display surface and the projection plane,
assuming that a straight line connecting a center of the projection plane and a center of the display surface is a reference line, the rear-group optical axis is shifted in a direction perpendicular to the front-group optical axis, by an amount of shift Δ, where Δ≠0, with reference to a tilt-reference state where a common optical axis of the front group and the rear group is tilted around a point of intersection of the reference line and a lens surface of the front group on the projection-plane side by the tilt angle ξ with reference to a non-shifted reference state in which the common optical axis matches the reference line,
the front-group optical axis and the rear-group optical axis are shifted as a whole in a direction perpendicular to the front-group optical axis while maintaining the tilt angle ξ and the amount of shift Δ,
the front-group optical axis is shifted by an amount of shift Δ1 with reference to the rear-group optical axis, and
a second conditional expression as follows is satisfied:

$$0.000047 \text{ (/mm)}<|\Delta 1/f1|/f<0.001 \text{ (/mm), where}$$

f1 denotes focal length of the front group, and
f denotes focal length of the front group and the rear group.

19. A projection lens system, comprising:
a front group disposed on a projection-plane side;
a rear group disposed on a display-surface side of an image display element inclined with reference to the projection plane; and
an aperture stop disposed on the display-surface side with reference to the front group, wherein
the front group having a front-group optical axis, the rear group having a rear-group optical axis parallel to the front-group optical axis, the front-group optical axis and the rear-group optical axis being shifted by an amount of shift Δ relative to each other, in a direction perpendicular to the front-group optical axis and the rear-group optical axis,
the front-group optical axis and the rear-group optical axis being on a shared plane shared by a display-surface normal assumed on the display surface and a projection-plane normal line assumed on the projection plane to intersect with the display-surface normal,
the rear-group optical axis being tilted on the shared plane at a tilt angle ξ with reference to the display-surface normal,
when the amount of shift Δ is zero, the tilt angle ξ satisfies a first conditional expression as follows:

$$0<\xi/\xi s<1,$$

where ξs denotes a tilt angle when Scheimpflug principle is satisfied with reference to the display surface and the projection plane,
assuming that a straight line connecting a center of the projection plane and a center of the display surface is a reference line, the rear-group optical axis is shifted in a direction perpendicular to the front-group optical axis, by an amount of shift Δ, where Δ≠0, with reference to a tilt-reference state where a common optical axis of the front group and the rear group is tilted around a point of intersection of the reference line and a lens surface of the front group on the projection-plane side by the tilt angle ξ with reference to a non-shifted reference state in which the common optical axis matches the reference line,
the rear-group optical axis is shifted by an amount of shift Δ2 with reference to the front-group optical axis, and
a second conditional expression as follows is satisfied:

$$0.000047 \text{ (/mm)}<|\Delta 2/f2|/f<0.001 \text{ (/mm), where}$$

f2 denotes focal length of the rear group, and
f denotes focal length of the front group and the rear group.

20. A projection lens system, comprising:
a front group disposed on a projection-plane side;
a rear group disposed on a display-surface side of an image display element inclined with reference to the projection plane; and
an aperture stop disposed on the display-surface side with reference to the front group, wherein
the front group having a front-group optical axis, the rear group having a rear-group optical axis parallel to the front-group optical axis, the front-group optical axis and the rear-group optical axis being shifted by an amount of shift Δ relative to each other, in a direction perpendicular to the front-group optical axis and the rear-group optical axis, the front-group optical axis and the rear-group optical axis being on a shared plane shared by a display-surface normal assumed on the display surface and a projection-plane normal line assumed on the projection plane to intersect with the display-surface normal, the rear-group optical axis being tilted on the shared plane at a tilt angle $\xi$ with reference to the display-surface normal, when the amount of shift Δ is zero, the tilt angle $\xi$ satisfies a first conditional expression as follows:

$0 < \xi/\xi s < 1$, where $\xi s$ denotes a tilt angle when Scheimpflug principle is satisfied with reference to the display surface and the projection plane, assuming that a straight line connecting a center of the projection plane and a center of the display surface is a reference line, the front-group optical axis is shifted in a direction perpendicular to the rear-group optical axis, by an amount of shift Δ, where Δ≠0, with reference to a tilt-reference state where a common optical axis of the front group and the rear group is tilted around a point of intersection of the reference line and a lens surface of the front group on the projection-plane side by the tilt angle $\xi$ with reference to a non-shifted reference state in which the common optical axis matches the reference line, the front-group optical axis and the rear-group optical axis are shifted as a whole in a direction perpendicular to the front-group optical axis while maintaining the tilt angle $\xi$ and the amount of shift Δ, the rear-group optical axis is shifted by an amount of shift Δ2 with reference to the front-group optical axis, and a second conditional expression as follows is satisfied:

$0.000047$ (/mm) $< |\Delta 2/f2|/f < 0.001$ (/mm), where f2 denotes focal length of the rear group, and f denotes focal length of the front group and the rear group.

* * * * *